United States Patent
Puri

(10) Patent No.: US 9,955,176 B2
(45) Date of Patent: Apr. 24, 2018

(54) EFFICIENT AND SCALABLE INTRA VIDEO/IMAGE CODING USING WAVELETS AND AVC, MODIFIED AVC, VPX, MODIFIED VPX, OR MODIFIED HEVC CODING

(71) Applicant: Intel Corporation, Santa Clara, CA (US)

(72) Inventor: Atul Puri, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 14/954,715

(22) Filed: Nov. 30, 2015

(65) Prior Publication Data

US 2017/0155906 A1    Jun. 1, 2017

(51) Int. Cl.
| | |
|---|---|
| *H04N 19/13* | (2014.01) |
| *H04N 19/122* | (2014.01) |
| *H04N 19/129* | (2014.01) |
| *H04N 19/159* | (2014.01) |
| *H04N 19/63* | (2014.01) |
| *H04N 19/169* | (2014.01) |
| *H04N 19/119* | (2014.01) |
| *H04N 19/124* | (2014.01) |

(52) U.S. Cl.
CPC ....... *H04N 19/1883* (2014.11); *H04N 19/119* (2014.11); *H04N 19/122* (2014.11); *H04N 19/63* (2014.11)

(58) Field of Classification Search
None
See application file for complete search history.

(56) References Cited

U.S. PATENT DOCUMENTS

| | | | | |
|---|---|---|---|---|
| 6,078,617 | A * | 6/2000 | Nakagawa | F16B 31/00 375/240 |
| 6,771,695 | B1 * | 8/2004 | Banerjea | H04L 25/05 375/222 |
| 2006/0008006 | A1 * | 1/2006 | Cha | H04N 19/176 375/240.16 |
| 2006/0013313 | A1 | 1/2006 | Han et al. | |
| 2007/0171971 | A1 | 7/2007 | Francois et al. | |
| 2008/0095235 | A1 * | 4/2008 | Hsiang | H04N 19/63 375/240.13 |
| 2008/0152011 | A1 | 6/2008 | Zhang et al. | |
| 2008/0310506 | A1 * | 12/2008 | Xu | H04N 19/63 375/240.12 |

(Continued)

OTHER PUBLICATIONS

International Search Report and Written Opinion for International Patent Application No. PCT/US2016/050553, dated Dec. 20, 2016.
International Search Report and Written Opinion for International Patent Application No. PCT/US2016/052709, dated Jan. 4, 2017.
International Search Report and Written Opinion for International Patent Application No. PCT/US2016/053568, dated Jan. 16, 2017.

(Continued)

*Primary Examiner* — Frederick D Bailey
(74) *Attorney, Agent, or Firm* — Green, Howard & Mughal LLP.

(57) ABSTRACT

Techniques related to intra video frame or image coding using wavelets and (Advanced Video Coding) AVC, modified AVC, VPx, modified VPx, or modified High Efficiency Video Coding (HEVC) are discussed. Such techniques may include wavelet decomposition of a frame or image to generate subbands and coding the subbands using compliant and/or modified coding techniques.

49 Claims, 53 Drawing Sheets

(56) References Cited

U.S. PATENT DOCUMENTS

| | | | |
|---|---|---|---|
| 2009/0003440 A1* | 1/2009 | Karczewicz | H04N 19/00 375/240.11 |
| 2009/0219994 A1 | 9/2009 | Tu et al. | |
| 2010/0208795 A1 | 8/2010 | Hsiang | |
| 2011/0200097 A1 | 8/2011 | Chen et al. | |
| 2012/0224027 A1* | 9/2012 | Takada | H04N 19/597 348/46 |
| 2012/0230411 A1 | 9/2012 | Shan et al. | |
| 2013/0107950 A1 | 5/2013 | Guo et al. | |
| 2013/0121423 A1* | 5/2013 | Gamei | H04N 19/00 375/240.26 |
| 2013/0177066 A1* | 7/2013 | Ye | H04N 19/36 375/240.02 |
| 2015/0010048 A1 | 1/2015 | Puri et al. | |
| 2015/0172661 A1* | 6/2015 | Dong | H04N 19/51 375/240.03 |
| 2015/0237350 A1 | 8/2015 | Gordon et al. | |
| 2017/0142418 A1* | 5/2017 | Li | H04N 19/159 |

OTHER PUBLICATIONS

J.M. Shapiro, "Embedded Image Coding Using Zerotrees of Wavelet Coefficients," IEEE Transactions on Signal Processing, pp. 3445-3462, vol. 41, No. 12, Dec. 1993.

A. Said et al., "A New Fast and Efficient Image Codec Based on Set Partitioning in Hierarchical Trees," IEEE Transactions on Circuits and Systems for Video Technology, pp. 243-250, vol. 6, No. 3, Jun. 1996.

C. Christopoulos et al., "The JPEG2000 Still Image Coding System: An Overview", IEEE Transactions on Consumer Electronics, pp. 1103-1127, vol. 46, No. 4, Nov. 2000.

A. Puri et al., "Video Coding Using the H.264/MPEG-4 AVC compression standard," Signal Processing: Image Communication, vol. 19, pp. 793-849, 2004.

A. Puri, "Enabling HEVC: Intel Media Server Studio 2015," White paper, vol. 1.5, Jun. 24, 2015.

* cited by examiner

1401

| LL₂ | HL₂ |       |
|-----|-----|  HL₁  |
| LH₂ | HH₂ |       |
|  LH₁      |  HH₁  |

FIG. 14A

1801 block width = 4

0 1 2 3 block height = 4

0
1
2
3

Scanning of
wavelet LL
band, 4x4 block

FIG. 18A

1802 block width = 4

0 1 2 3 block height = 4

0
1
2
3

Scanning of
wavelet HL
band, 4x4 block

EFFICIENT AND SCALABLE INTRA VIDEO/IMAGE CODING USING WAVELETS AND AVC, MODIFIED AVC, VPX, MODIFIED VPX, OR MODIFIED HEVC CODING

CROSS-REFERENCE TO RELATED APPLICATIONS

This application contains subject matter related to U.S. patent application Ser. No. 14/954,710, titled "EFFICIENT INTRA VIDEO/IMAGE CODING USING WAVELETS AND VARIABLE SIZE TRANSFORM CODING" filed on Nov. 30, 2015, and U.S. patent application Ser. No. 14/954,837, titled "EFFICIENT, COMPATIBLE, AND SCALABLE INTRA VIDEO/IMAGE CODING USING WAVELETS AND HEVC CODING" filed on Nov. 30, 2015.

BACKGROUND

An image or video encoder compresses image or video information so that more information can be sent over a given bandwidth. The compressed signal may then be transmitted to a receiver having a decoder that decodes or decompresses the signal prior to display.

This disclosure, developed in the context of advancements in image/video processing, addresses problem associated with performing improved coding of images and Intra frames of video. Such improved coding may include a combination of efficient coding as well as coding that supports basic scalability. For example, the term efficient coding refers to encoding that provides higher compression efficiency allowing either more images or Intra frames of video of certain quality to be stored on a computer disk/device or to be transmitted over a specified network or the same number (e.g., of images or Intra frames of video) but of higher quality to be stored or transmitted. Furthermore, the term scalable coding here refers to encoding of image or Intra frames of video such that from a single encoded bitstream subsets of it can then be decoded resulting in images or Intra frames of different resolutions. For example, the term basic scalability as it applies to this disclosure refers to the capability of decoding a subset of the bitstream resulting in lower resolution layer image or Intra frames in addition to the capability of decoding a full resolution version from the same bitstream.

With ever increasing demand for capture, storage, and transmission of more images and videos of higher quality with the added flexibility of scalability, it may be advantageous to provide improved compression techniques for images and Intra frames of video. It is with respect to these and other considerations that the present improvements have been needed.

BRIEF DESCRIPTION OF THE DRAWINGS

The material described herein is illustrated by way of example and not by way of limitation in the accompanying FIG.s. For simplicity and clarity of illustration, elements illustrated in the FIG.s are not necessarily drawn to scale. For example, the dimensions of some elements may be exaggerated relative to other elements for clarity. Further, where considered appropriate, reference labels have been repeated among the FIG.s to indicate corresponding or analogous elements. In the FIG.s:

FIG. 14A illustrates a two level dyadic decomposition process of an image;

FIG. 18A illustrates, for LL band 4×4 blocks of samples that are transformed to 4×4 blocks of transform coefficients, zigzag scanning direction for the transform coefficients;

FIG. 18B illustrates, for HL band 4×4 blocks of samples that are transformed to 4×4 blocks of transform coefficients, zigzag scanning direction for the transform coefficients;

DETAILED DESCRIPTION

Figure 1A:
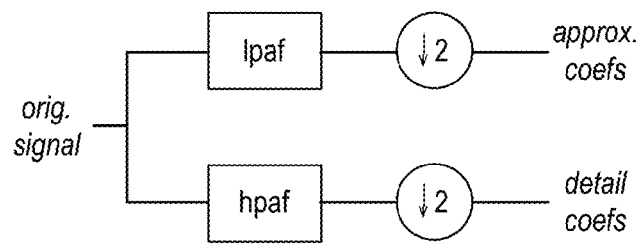
FIG. 1A illustrates an example application of an analysis filter.

One or more embodiments or implementations are now described with reference to the enclosed FIG.s. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", (or "embodiments", "examples", or the like), etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to efficient intra video/ image coding using wavelets and Advanced Video Coding (AVC), modified AVC, or modified High Efficiency Video Coding (HEVC) coding.

Before discussing the details of various embodiments, the disclosure provides a discussion of wavelet based image coding. For example, the process of wavelet filtering of digital signals can be thought of as including two complementary processes, one, that decomposes the signal into low-pass and high-pass sub-set signals, and the reverse process that combines (re-composes) the low-pass and high-pass sub-set signals back into the original (or near-original) signal. The filters used for decomposition may be called analysis filters may be are applied first, and the filters used for re-composition may be called synthesis filters and may be applied to decomposed signal (other operations can be inserted between the analysis and synthesis filters). In some examples, the analysis and synthesis filters may be a complementary pair and may be required to satisfy certain mathematical properties to enable a final reconstruction of the signal to be similar to the original signal and of good quality. As an example of different classes/types of filters and properties they possess, the properties of orthogonal filter and bi-orthogonal filter classes as well as examples of specific filters or types of filters that fall into aforementioned classes are provided.

In some examples, orthogonal filters may be utilized. For example, orthogonal filters may include synthesis filters that are time reversed versions of their associated analysis filters, high pass filters that may be derived from low pass filters, and analysis filters that satisfy the orthogonally constraint. In other examples, bi-orthogonal filters may be utilized. For example, bi-orthogonal filters may include a Finite Impulse Response (FIR), a linear phase, and perfect reconstruction. However, bi-orthogonal filters may not be orthogonal.

An example bi-orthogonal class of wavelet filters include Haar wavelet filters, but higher quality filters of the same class include Cohen-Daubechies-Feauveau CDF 5/3, LeGall 5/3 filters, and CDF 9/7 filters. For example, CDF 5/3 or CDF 9/7 filters may be bi-orthogonal (e.g., providing FIR, linear phase, and perfect reconstruction but not being orthogonal), symmetrical, and may have an odd length.

An example of orthogonal wavelet filters include Quadrature Mirror filters (QMF) of various sizes. For example, QMF filters may provide FIR, linear phase, alias-free but not perfect reconstruction, and may be orthogonal.

In the following discussion, the abbreviations or terms lpaf, hpaf, lpsf, and hpsf respectively in Tables 1A-3, which illustrate example filters, and elsewhere herein represent low pass analysis filter, high pass analysis filter, low pass synthesis filter, and high pass synthesis filter, respectively.

Table 1A provides example coefficients of a 5 tap low pass analysis filter such that the filter is symmetric around the center coefficient 0.75 and coefficients of a 3 tap high pass analysis filter such that the filter is symmetric around the center coefficient 1.0.

TABLE 1A

Example CDF or LeGall 5/3 Analysis Filters

| lpaf | 0.75 | 0.25 | −0.125 |
|------|------|------|--------|
| hpaf | 1.00 | −0.50 | |

Table 1B provides example coefficients of a 3 tap low pass synthesis filter such that the filter is symmetric around the center coefficient 1.0 and coefficients of a 5 tap high pass synthesis filter such that the filter is symmetric around the center coefficient 0.75.

TABLE 1B

Example CDF or LeGall 5/3 Synthesis Filters

| lpsf | 1.00 | 0.50 | |
|------|------|------|--------|
| hpsf | 0.75 | −0.25 | −0.125 |

The example filter sets of Table 1A and Table 1B may be referred to as either Daubechies 5/3, CDF 5/3, or LeGall 5/3 filters.

FIG. 1A illustrates an example application 101 of an analysis filter, arranged in accordance with at least some implementations of the present disclosure. As shown in FIG. 1A, an original 1D signal may undergo low pass analysis filtering (lpaf) resulting in a low pass 1D signal that is a downsampled by 2 subband of the input signal (e.g., approx. coefficients). In parallel, for example, the original 1D signal may also undergo high pass analysis filtering (hpaf) resulting in a high pass 1D signal that is a downsampled by 2 subband of the input signal (e.g., detail coefficients). In some examples, the analysis filter applied in FIG. 1A may be the analysis filter of Table 1A.

Figure 1B:
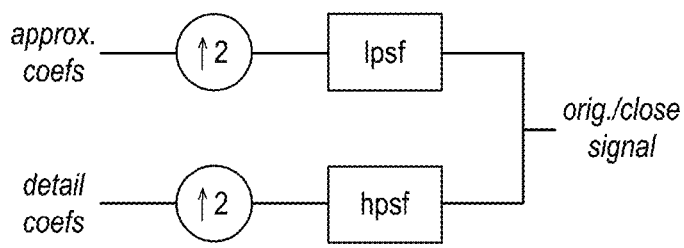
FIG. 1B illustrates an example application of a synthesis filter.

FIG. 1B illustrates an example application 102 of a synthesis filter, arranged in accordance with at least some implementations of the present disclosure. As shown in FIG. 1B, a synthesis filter that is complimentary with respect to the analysis filter applied in FIG. 1A may be applied. For example, the two downsampled signals (low pass and high pass subbands; e.g., approx. coefficients and detail coefficients) from analysis filtering may be filtered by a pair of synthesis filters referred to as low pass synthesis filter and high pass synthesis filter. The two outputs may be combined resulting in a reconstruction signal that is same (or nearly identical) as the 1D original signal at the input (e.g., orig./close signal). In some examples, the syntheses filter applied in FIG. 1B may be the syntheses filter of Table 1B. In the example of application of the 5/3 filters of Tables 1A and 1B, the output can be precisely identical as coefficients are powers of 2. However, in the application of other example filters, the output, due to slight rounding differences, may be very close if not exactly the same. In some examples, after analysis filtering, the resulting low pass and high pass subband pixels (also referred to as filtered coefficients) may be, during encoding, selectively reduced in precision by quantization and then entropy encoded resulting in compression. A decoder may then reverse the encoding process by performing entropy decoding and inverse quantization followed by synthesis filtering.

The discussed analysis/synthesis filtering process is not limited to the use of 5/3 filtering such as the filters of Tables 1A and 1B. For example, the discussed analysis/synthesis filtering process may be applicable to any analysis and synthesis filters such as those discussed herein. For example, Tables 2A and 2B provide example CDF 9/7 filters. The low pass analysis filter of CDF 9/7 filters may be a 9 tap filter symmetric around the center coefficient 0.602949 and the high pass analysis filter may be a 7 tap filter symmetric around center coefficient 1.115087. Example complimentary low pass synthesis and high pass synthesis filters are provided in Table 2B with low pass synthesis filter of length 7 taps and high pass synthesis filter of length 9 taps.

TABLE 2A

Example CDF 9/7 Analysis Filters

| lpaf | 0.602949018 | 0.266864118 | −0.078223266 | −0.01686411 | 0.026748757 |
|---|---|---|---|---|---|
| hpaf | 1.115087052 | −0.591271763 | −0.057543526 | 0.091271763 | |

TABLE 2B

Example CDF 9/7 Synthesis Filters

| lpsf | 1.115087052 | 0.591271763 | −0.057543526 | −0.091271763 | |
|---|---|---|---|---|---|
| hpsf | 0.602949018 | −0.266864118 | −0.078223266 | 0.01686411 | 0.026748757 |

The previously discussed filter sets (e.g., the CDF (or LeGall) 5/3 filters and the CDF 9/7 filters) are examples of bi-orthogonal filters. However, the techniques discussed herein are also applicable to orthogonal filters such as QMF filters. For example, Table 3 provides example coefficients of a 13 tap QMF low pass and high pass analysis filters. The complimentary synthesis filters may be generated as time reversed versions of analysis filters.

TABLE 3

Example QMF 13 Analysis Filters (Synthesis Filters are time reversed versions of the Analysis Filters)

| lpaf | hpaf |
|---|---|
| 0.7737113 | 0.7737113 |
| 0.42995453 | −0.42995453 |
| −0.057827797 | −0.057827797 |
| −0.0980052 | 0.0980052 |
| 0.039045125 | 0.039045125 |

TABLE 3-continued

Example QMF 13 Analysis Filters (Synthesis Filters are time reversed versions of the Analysis Filters)

| lpaf | hpaf |
|---|---|
| 0.021651438 | −0.021651438 |
| −0.014556438 | −0.014556438 |

The described techniques may provide 1D filtering of signals. Discussion now turns to 2D filtering as images are 2D signals and video can be thought of as composed of 2D frames plus a time dimension. For example, the 1D filtering techniques discussed so far may be extended to derive 2D filtering techniques as discussed further herein.

For example, wavelet filtering may decompose a 2D signal such as an image (or video frame) into subbands by different decomposition techniques including uniform band decomposition, octave band decomposition, and wavelet packet decomposition. For example, octave band decomposition may provide a non-uniform splitting technique that decomposes low frequency band into narrower bands such that the high frequency bands are left without further decomposition.

Figure 1C:
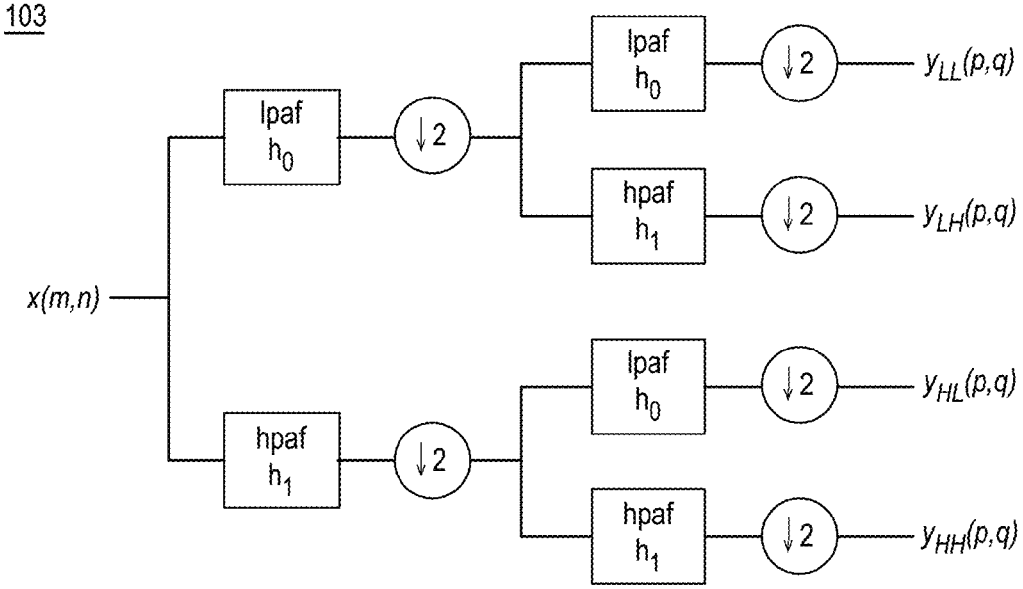
FIG. 1C illustrates an example analysis filtering of a 2D signal.

FIG. 1C illustrates an example analysis filtering 103 of a 2D signal, arranged in accordance with at least some implementations of the present disclosure. As shown in FIG. 1C, analysis filtering of 2D signals may include two stages, the first stage to perform filtering in one dimension (e.g., vertical) and the second stage to perform filtering in the second dimension (e.g., horizontal) to the output of the first stage. For example, analysis filtering 103 may provide analysis filtering of a 2D signal (e.g., an image or Intra frame). The analysis filters used in the first stage (e.g., a low analysis pass filter and a high analysis pass filter) and in the second stage may be the same. For example, in the first stage they may be applied on rows while in second stage they may be applied on columns. The entire 2 stage decomposition/analysis filtering process for 2D signals illustrated in FIG. 1C may provide filtering and subsampling by 2 operations and may result in 4 subbands referred to as Low-Low (LL), Low-High (LH), High-Low (HL), and High-High (HH). For example, FIG. 1C illustrates decomposing a 2D signal, $x(m,n)$, into 4 subbands having samples represented by $y_{LL}(p,q)$, $y_{LH}(p,q)$, $y_{HL}(p,q)$, and $y_{HH}(p,q)$. In the example decomposition of FIG. 1C, each subband includes one-quarter of the number of samples (coefficients) of the original signal $x(m,n)$.

Figure 1D:
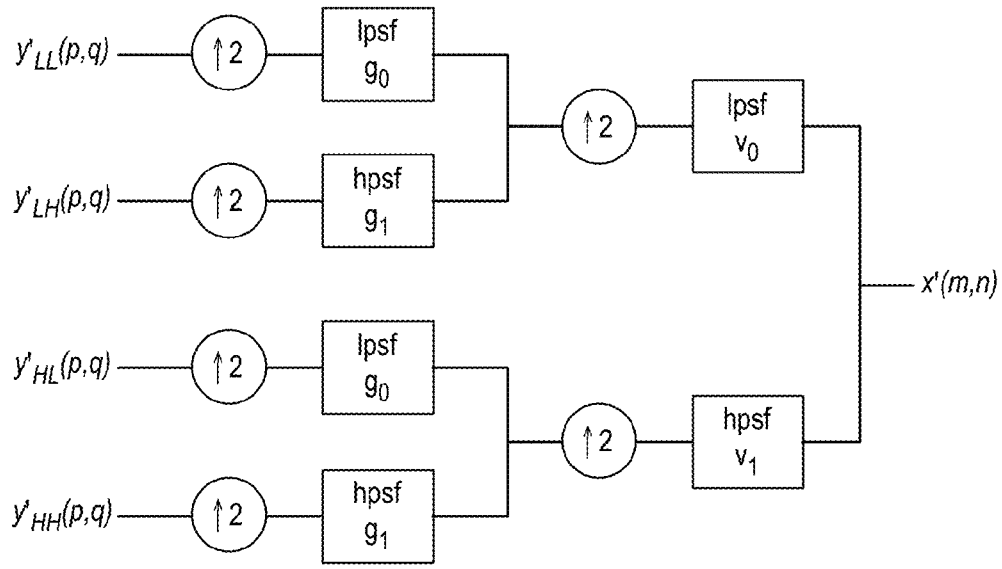
FIG. 1D illustrates an example synthesis filtering.

FIG. 1D illustrates an example synthesis filtering 104, arranged in accordance with at least some implementations of the present disclosure. As shown in FIG. 1D, synthesis filtering 104 may include operations of interpolation by 2 and filtering applied on samples (e.g., coefficients) $y'_{LL}(p,q)$, $y'_{LH}(p,q)$, $y'_{HL}(p,q)$, and $y'_{HH}(p,q)$ representing each of four subbands to provide a re-composed version of the original signal (e.g., x'(m,n)). In examples where perfect filters with no quantization of subband coefficients, the final (e.g., re-composed) signal (e.g., x'(m,n)) may be exactly the same as the input signal provided to analysis filtering 103 (e.g., x(m,n); please refer to FIG. 1C).

Figure 2A:
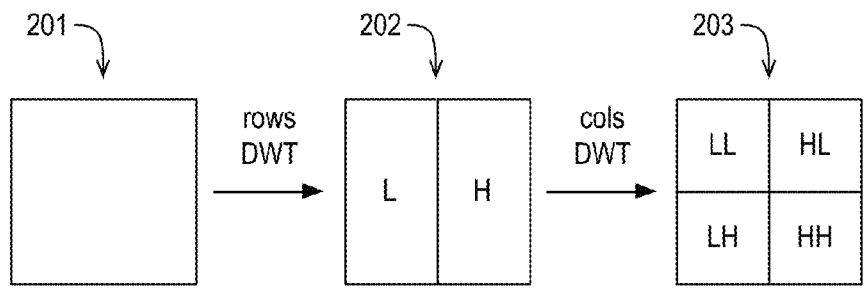
FIG. 2A illustrates an example results of applying wavelet filtering to an image or video frame.

FIG. 2A illustrates an example results 202, 203 of applying wavelet filtering to an image or video frame 201, arranged in accordance with at least some implementations of the present disclosure. As shown in FIG. 2A, wavelet filtering may be applied applied on the rows of image or video frame 201 resulting in decomposition of image or video frame 201 into results 202, which may include 2 subbands: a low frequency subband L and a high frequency subband H, which may each be of half size horizontally but full size vertically with respect to image or video frame 201. Wavelet filtering may be applied to columns of results 202 (e.g., to each of the two subbands, L and H) to decompose each subband further into two subbands each for a total of 4 subbands (e.g., LL, HL, LH, and HH subbands) as shown with respect to results 203. The process illustrated with respect to FIG. 2A may be referred to as a one level decomposition of image or video frame 201. For example, FIG. 2A may provide a one level discrete wavelet transform (DWT) decomposition.

Figure 2B:
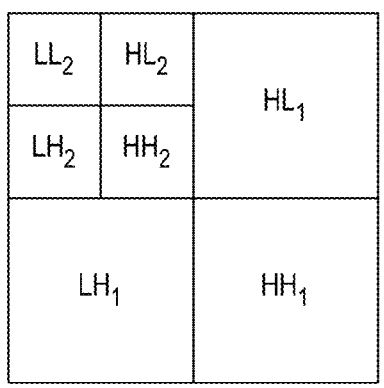
FIG. 2B illustrates an example two level decomposition of an image or video frame.

FIG. 2B illustrates an example two level decomposition 204 of an image or video frame, arranged in accordance with at least some implementations of the present disclosure. As shown in FIG. 2B, the process of one level decomposition may be extended to two levels (e.g., which may be referred to as two level decomposition). The process of providing two level decomposition 204 may include performing a one level decomposition resulting in the 4 subbands discussed with respect to FIG. 2A and referred to in FIG. 2B as $LL_1$ (not shown in FIG. 2B due to subsequent decomposition), $HL_1$, $LH_1$, and $HH_1$ subbands. Furthermore, the low-low ($LL_1$) subband may be decomposed further by, in some embodiments, an identical process used for the one level decomposition. In other embodiments, the first and second decompositions may include different decompositions (e.g., filter types or the like). Such processing may provide for the decomposition of $LL_1$ subband further into 4 subbands that are referred to as $LL_2$, $HL_2$, $LH_2$, and $HH_2$, with $LL_2$ now being the low-low subband.

In some examples, such decomposition processing may be continued further with each iteration performing a quad-split of the low-low band from the previous iteration, which may provide in higher levels of decomposition.

Figure 3A:
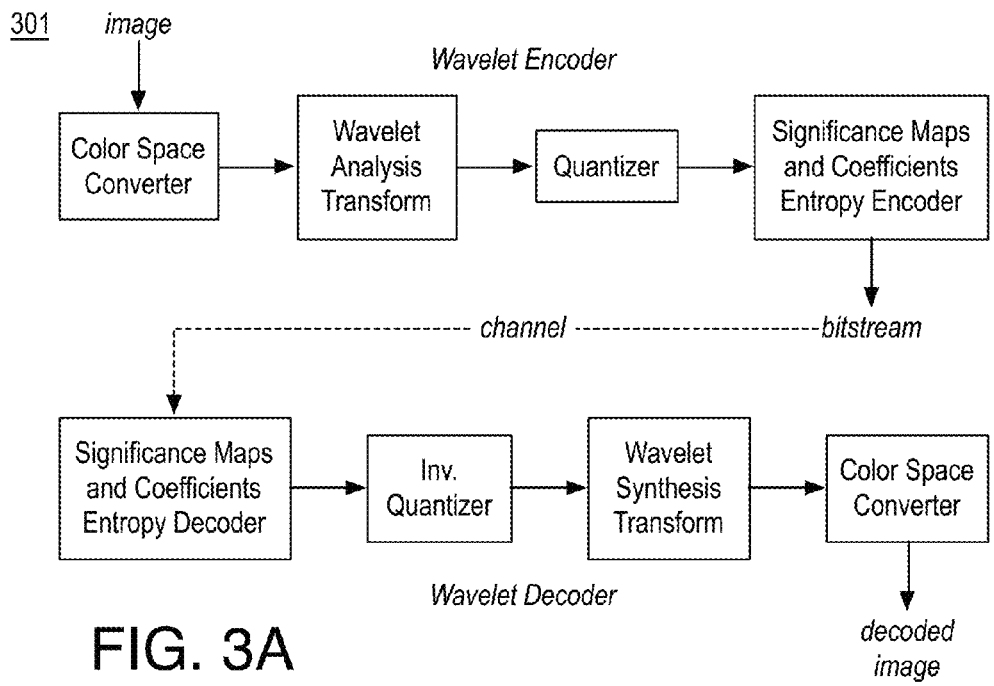
FIG. 3A is a block diagram wavelet based encoder/decoder system.

Discussion now turns to a wavelet based coder for coding of images or Intra frames of video. FIG. 3A is a block diagram wavelet based encoder/decoder system 301, arranged in accordance with at least some implementations of the present disclosure. As shown in FIG. 3A, an image to be encoded by a Wavelet Encoder of system 301 may be input to a Color Space Converter, which may, for example, convert an RGB image/frame to a YUV image/frame, which may be input to a Wavelet Analysis Transform module that may decompose the YUV image/frame into wavelet (e.g., subband) coefficients that may be quantized by a Quantizer, which may be followed by entropy coding of a map of a location of significant quantized coefficients and the quantized coefficients themselves by a Significance Maps and Coefficients Entropy Encoder to produce a coded bitstream for storage or transmission over a channel.

The coded bitstream from storage or transmission may, at a Wavelet Decoder of system 301, undergo entropy decoding of the significance maps as well as the coefficient themselves at a Significance Maps and Coefficients Entropy Decoder, followed by inverse quantization of quantized coefficients at an Inverse Quantizer, which may be input to a Wavelet Synthesis Transform module that may re-constitute from wavelet (e.g., subband) coefficients, the YUV image/frame, which may be converted by a Color Space Inverter to the desired (e.g., often, RGB) format to generate a decoded image.

Without any loss of generality it can be said that if the image to be coded is already in the color format used by the encoder, color space conversion is not necessary. Furthermore, the decoded image, if it can be consumed in the format decoded, may not require color space inversion. The encoding/decoding process discussed with respect to system 301 may be applied to images or frame(s) of video, which are referred to as Intra frame(s) herein.

Wavelet coders may provide different quality/complexity tradeoffs functionality/flexibility. For example, the wavelet decomposition where only the LL band is split into a quad such that each coefficient in a lower/coarser band has 4 coefficients corresponding to its spatial location in the next higher band. Thus there is unique spatial relationship between coefficients of one band with that of coefficients in a previous band. Furthermore, wavelet coders may exploit the unique structure of wavelet coefficients to provide additional functionality such as image decoding scalability or random access into the bitstream.

Example wavelet coders include an Embedded Zero-tree Wavelet (EZW) coder, a Set Partitioning in Hierarchical Trees (SPIHT) coder, a Set Partitioned Embedded BloCK (SPECK) coder, and an Embedded Block Coding with Optimized Truncation (EBCOT) coder. Table 3 provides examples of significance map coding and entropy coding techniques employed by such wavelet image coders.

TABLE 3

Wavelet based image coders and their coefficient encoding strategies

| Wavelet Image Coder | Significance map coding | Coefficient structures, and Entropy coding |
| --- | --- | --- |
| EZW, SPIHT | Zero-trees | Cross scale trees of coefficients and arithmetic coding |
| SPECK | Set Partitioning | Splitting of a set into subsets and arithmetic coding |
| EBCOT, JPEG2000 | Conditional Coding | Multi-context arithmetic coding of small coefficient blocks. Arithmetic coding. Optimal block truncation |

For example, EZW may be based on the principles of embedded zero tree coding of wavelet coefficients. One of the beneficial properties of wavelet transform is that it compacts the energy of input signal into small number of wavelet coefficients, such as for natural images, most of the energy is concentrated in $LL_k$ band (where k is level of decomposition) as well as remaining energy in High frequency bands ($HL_i$, $LH_i$, $HH_i$) is also contracted in small number of coefficients. For example, after wavelet transformation, there may be few higher magnitude coefficients that are sparse but most coefficients are relatively small (and carry relatively small amount of energy) and thus such coefficients after quantization quantize to zero. Also, co-located coefficients across different bands are related. EZW exploits these properties by using two main concepts, coding of significance maps using zero-trees and successive approximation quantization. For example, EZW may exploit the multi-resolution nature of wavelet decomposition.

Figure 3B:
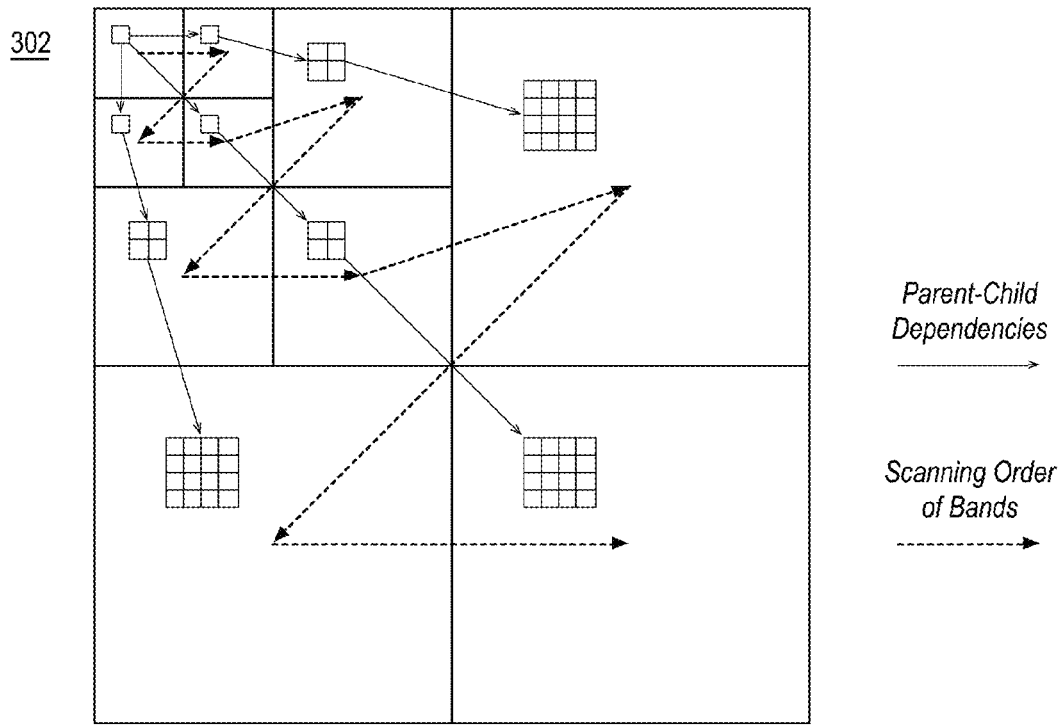
FIG. 3B illustrates a wavelet 3-level octave decomposition into 10 subbands.

FIG. 3B illustrates a wavelet 3-level octave decomposition 302 into 10 subbands, arranged in accordance with at least some implementations of the present disclosure. For example, wavelet 3-level octave decomposition 302 is one more level of decomposition than discussed earlier. As shown in FIG. 3B, a spatial structural relationship between coefficients may be provided in each subband level. For example, each subband coefficient shown by a square in $HL_3$, $LH_3$, and $HH_3$ bands may correspond to a co-located square of 2×2 coefficients in $HL_2$, $LH_2$, and $HH_2$ bands and/or a co-located square of 4×4 subband coefficients in $HL_1$, $LH_1$, and $HH_1$ bands. One way of benefiting from such a structure, for example, is that if a wavelet subband coefficient in a coarser scale (e.g. level 3) is insignificant or zero with respect to a threshold, wavelet coefficients of a same orientation in finer scales (e.g. levels 2 and 1) may also be likely to be insignificant or zero with respect to the same threshold. This allows for forming zero trees (e.g., trees of zero symbols represented by end-of-block indicating zero coefficients across subband scales) that can be very efficiently represented. Such relationships are shown in FIG. 3B as parent-child dependencies between solid line arrows. FIG. 3B also shows (by thick dashed line arrows) an example order of zigzag scanning of subband coefficients across different scales. For example, a zero tree structure may allow for many small coefficients across finer resolution subbands (smaller level number) to be discarded, which may provide significant savings as the tree grows by powers of 4. Furthermore, EZW coding may encodes the obtained tree structure producing bits in order of their importance resulting in embedded coding where an encoder can terminate encoding at any point to meet an encoding target bitrate or the decoder may stop the decoding at any point resulting in a viable but lower quality decoded image at lower than full bitrate.

Furthermore, SPIHT may be based on the principles of set partitioning in hierarchical trees. For example, SPIHT may take advantages of coding principles such as partial ordering by magnitude with a set partitioning sorting algorithm, ordered bitplane transmission, and exploitation of self similarity across different image scales. In some implementations, SPIHT coding may be more efficient than EZW coding. In SPIHT coding, an image may be decomposed by wavelet transform resulting in wavelet transform coefficients that may be grouped into sets such as spatial orientation trees. Coefficients in each spatial orientation tree may be coded progressively from most significant bit planes to least significant bit planes starting with coefficients of highest magnitude. As with EZW, SPIHT may involve two passes: a sorting pass and a refinement pass. After one sorting pass and one refinement pass, which forms a scan pass, the threshold may be halved and the process repeated until a desired bitrate is reached.

Figure 3C:
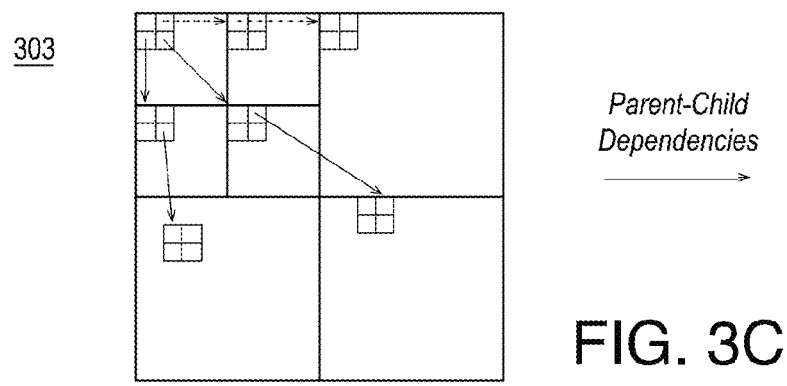
FIG. 3C illustrates a spatial orientation tree.

Due to spatial similarity between subbands, coefficients are better magnitude ordered when one moves down in the pyramid. For example, a low detail area may be likely to be identifiable at the highest level of the pyramid and may be replicated in lower levels at the same spatial location. FIG. 3C illustrates a spatial orientation tree 303, arranged in accordance with at least some implementations of the present disclosure. For example, spatial orientation tree 303 may be a tree structure that defines spatial relationships on the hierarchical tree. In some examples, a spatial orientation tree may be defined in a pyramid created with recursive four band splitting such that each node of a tree defines a pixel and its descendants correspond to pixels of the same spatial orientation in next finer level of pyramid. For example, the tree may be defined in a manner that each node has either no child or four children that form a group of 2×2 adjacent pixels.

Additionally, SPECK coding may be based on the principle of coding sets of pixels in the form of blocks that span wavelet subbands. For example, SPECK may differ from EZW or SPIHT, which instead use trees. SPECK may perform wavelet transformation of an input image or Intra frame and code in 2 phases including a sorting pass and a refinement pass that may be iteratively repeated. In addition to the 2 phases, SPECK may perform an initialization phase. In some examples, SPECK may maintain two linked lists: a list of insignificant sets (LISs) and a list of significant pixels (LISPs).

Figure 3D:
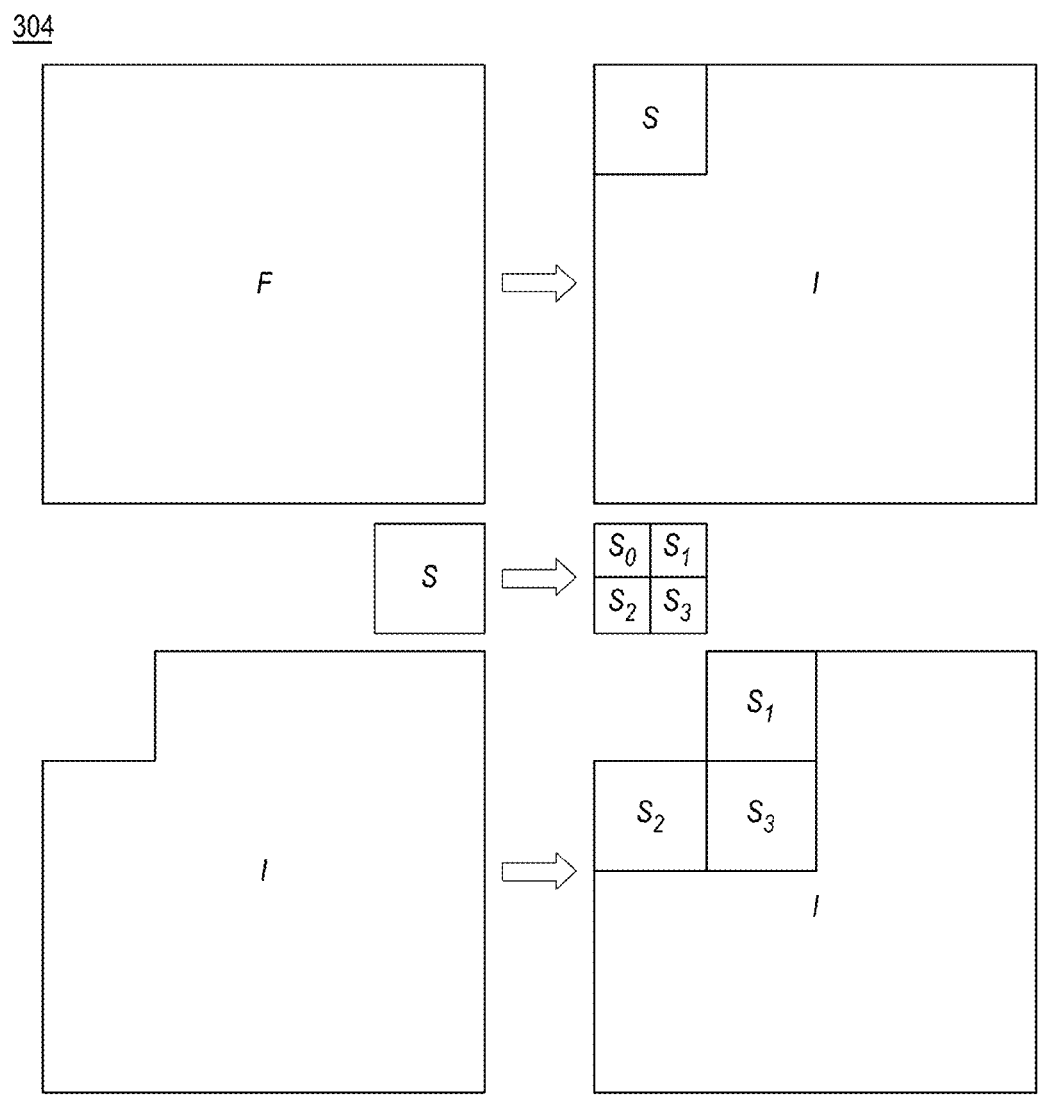
FIG. 3D illustrates an example SPECK encoding process.

FIG. 3D illustrates an example SPECK encoding process 304, arranged in accordance with at least some implementations of the present disclosure. As shown in FIG. 3D, in an initialization phase an input image (e.g., F) may be partitioned into two sets, a set S, and a set I. Set S may represent the root and may be added to LIS. Set I may represent the remaining portion (e.g., F-S). In the sorting pass phase, a significance test may be performed against a current threshold to sort each block of type S in LIS. If S block is significant, it is divided by quadtree partitioning into four subsets, and each subset is treated as a set of type S and processed recursively until the pixel level is reached. The insignificant sets are moved to LIS for further processing. Once the processing of set S is achieved, a significance test is performed against I blocks using the same threshold. If an I block is significant it is divided into four sets, one set having the same type I, and the other sets having the type S. A refinement pass is performed for LSP pixels such that the $n^{th}$ most significant bit is output except for pixels that have been added during the last sorting pass. Furthermore, the threshold may be halved and the coding process may be repeated until an expected bitrate is reached.

Furthermore, EBCOT may include embedded block coding of wavelet subbands that may support features such as spatial scalability (e.g., the ability to decode pictures of various spatial resolutions) and SNR scalability (e.g., the ability to decode pictures of various qualities) from a single encoded bitstream. While the requirement for SNR scalability can also be addressed by EZW and SPIHT coding which do successive approximation or bit plane encoding, both EZW and SPIHT if required to provide spatial scalability would have to modify encoding/bitstream but the resulting bitstream would then not be SNR scalable due to downward inter dependencies between subbands. In some examples, EBCOT addresses these shortcomings by coding each band independently. Furthermore, the coding is made more flexible by partitioning subband samples into small blocks referred to as code blocks with the size of code blocks determining the coding efficiency achievable. For example, independent processing of code blocks may provide for localization and may be useful for hardware implementation.

Figure 3E:
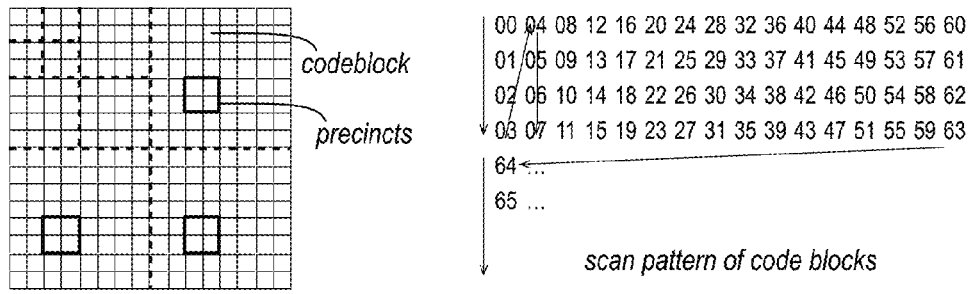
FIG. 3E illustrates an example division of an image or Intra frame.

FIG. 3E illustrates an example division 305 of an image or Intra frame, arranged in accordance with at least some implementations of the present disclosure. As shown in FIG. 3E, an image or Intra frame to be coded may be divided into tiles with each tile wavelet transformed and partitioned into packet partition locations called precincts such that each precinct contains three spatially consistent rectangles one from each subband at each resolution level. Each precinct may be further divided into code blocks that form input to an entropy coder. Within a stripe (e.g., a stripe may be 4 consecutive rows of pixel bits in code block bit plane), samples may be scanned column by column. FIG. 3E also shows, for code blocks that are 16 wide by n high, an example code block scanning process. Starting from top left, a first four bits of a first column may be scanned until the width of the code block is covered. Then, the second four bits of the first column of a next strip may be scanned, and so on.

Figure 4:
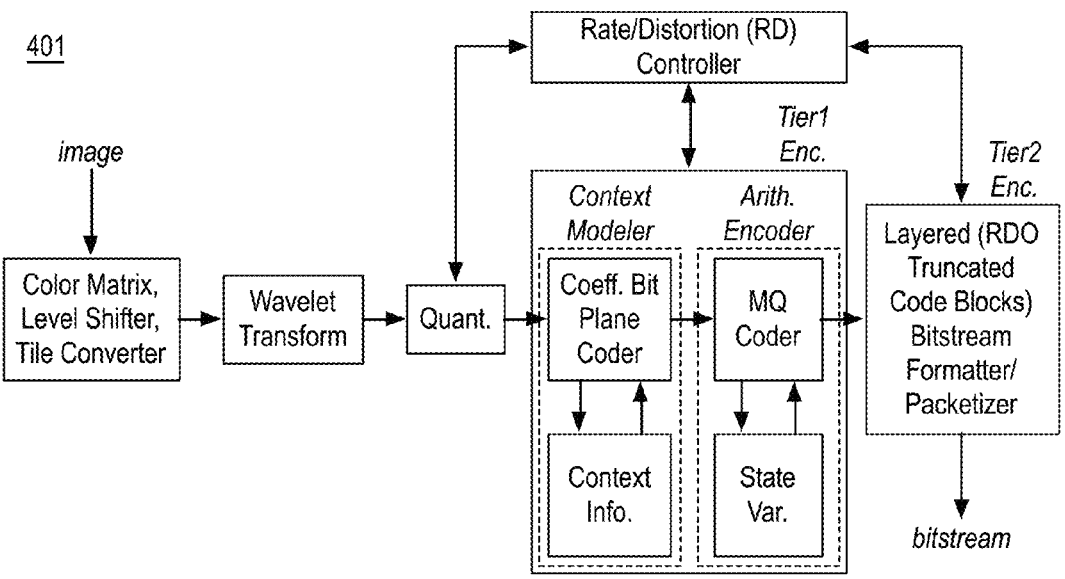
FIG. 4 is a block diagram of an example JPEG2000 encoder.

FIG. 4 is a block diagram of an example JPEG2000 encoder 401, arranged in accordance with at least some implementations of the present disclosure. In some examples, JPEG2000 encoder 401 may be based on EBCOT techniques discussed herein. As shown in FIG. 4, an image or Intra frame (image) to be encoded may undergo preprocessing in a Color Matrix, Level Shifter, Tile Converter" module that may shift pixel values by 128, perform color format conversion, and partition the image into fixed size tiles. Furthermore, a "Wavelet (Analysis) Transform" module may perform 2D wavelet decomposition into bands and coefficients of each subband may be quantized by a "Quantizer" and entropy encoded and layered using a 2 tier encoder. For example, a "Tier 1 Encoder" may include a "Context Modeler" (e.g., including a "Coefficient Bit Plane Coder" and a "Context Information" module) followed by an "Arithmetic Encoder" (e.g., including an "MQ Coder" and a "State Variable" module) and "Tier 2 Encoder" may include a "Layered (RDO Truncated Code Blocks) Bitstream Formatter/Packetizer" that may generate an embedded/scalable bitstream that is then packetized.

An example JPEG 2000 decoder (not shown) may reverse the order of operations of the encoder, starting with a bitstream to be decoded input to "Tier 2 Decoder" including a "DePacketizer and Bitstream Unformatter" followed by entropy decoding in a "Tier 1 (Arithmetic) Decoder", the output of which may be provided to an "Inverse Quantizer" and then to a "Wavelet (Synthesis) Transform" module and then to a "Tiles Unformatter, Level Unshifter, and Color Inverse Matrix" postprocessor that may output the decoded image.

JPEG2000 was finalized in 2000 by the ISO/WG1 committee. The original JPEG image coding standard was developed in 1992 as ITU-T Rec. T.81 and later adopted in 1994 by the same ISO committee. While the JPEG2000 standard provided significant improvements over the original JPEG standard, it may include shortcomings such as complexity, limited compression performance, difficulties in hardware implementation, and scalability at the expense of compression efficiency. Furthermore, the original JPEG standard that uses fixed block size transform coding is still the prevalent image coding standard in use to this day. However, the original JPEG standard has shortcomings such as limited compression performance.

The techniques discussed herein may provide a new intra coding approach that is efficient in bitrate efficiency and scalable such that from a single encoded stream subsets may be independently decoded. Furthermore, a subset or subsets of an encoded stream (e.g., coding of the LL subband) may be either fully or partially compatible with the AVC or partially compatible with HEVC video intra coding standard. The advantages of such compatibility may include interoperability with an established standard and benefits of scale from readily available hardware implementations. The new coding approaches discussed herein may include improved wavelet and transform coding such that global redundancies are exploited by wavelet processing and local redundancies are exploited by adaptive transform coding. In terms of compression efficiency the discussed techniques may be about 22% higher than the JPEG2000 standard and the discussed techniques may offer several other advantages over JPEG2000.

Earlier discussion included details of wavelet analysis/synthesis filtering. Discussion now turns to techniques associated with AVC video high (profile) I/Intra encoding/decoding.

Figure 5A:
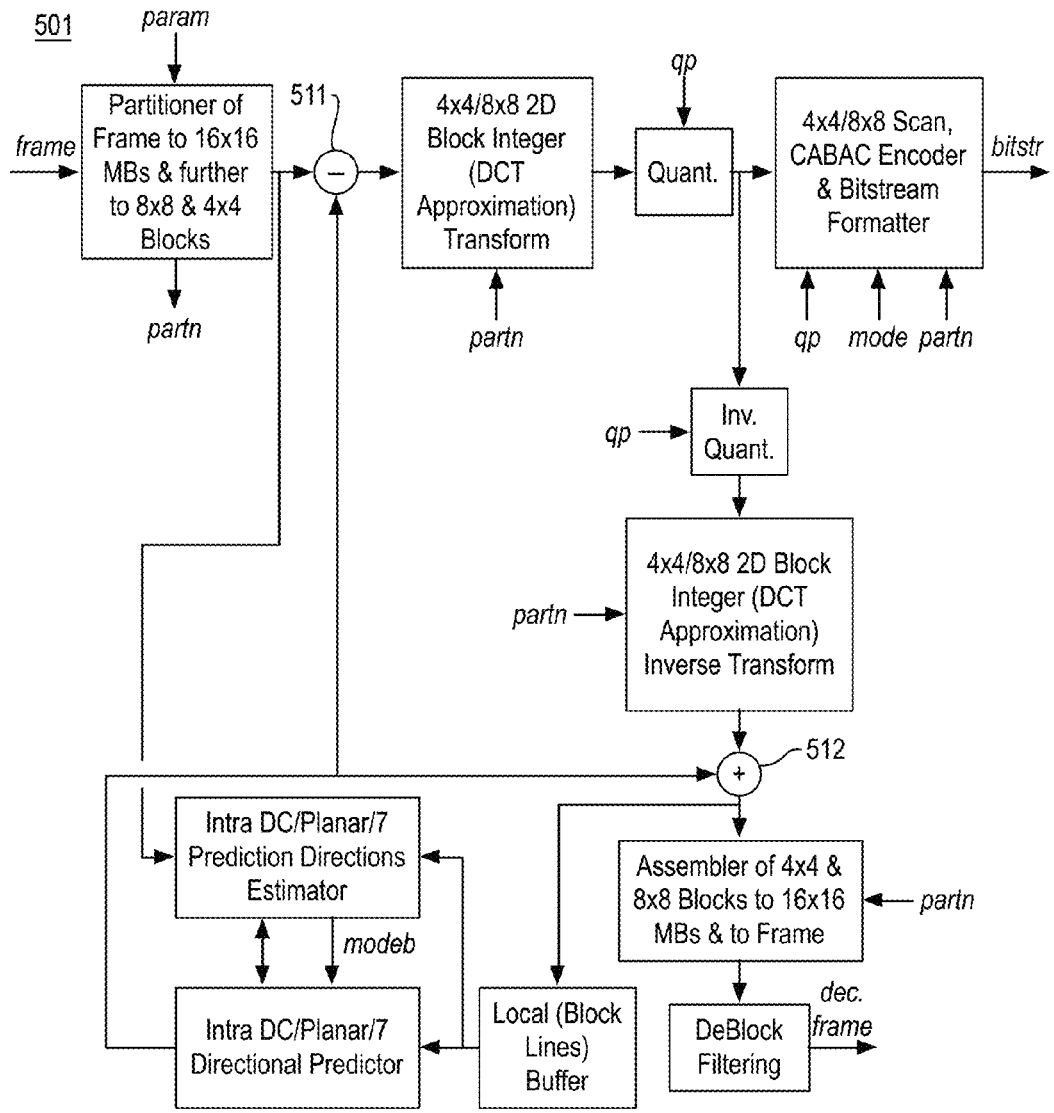
FIG. 5A is a block diagram of an example encoder system illustrating an example intra-block/I-frame coding subset of an AVC video High profile encoder.

FIG. 5A is a block diagram of an example encoder system 501 illustrating an example intra-block/I-frame coding subset of an AVC video High profile encoder, referred to above as AVC video High I/Intra frame encoder, arranged in accordance with at least some implementations of the present disclosure. For example, FIG. 5A may illustrate an AVC video High (or High 10) Intra Encoder that may be used for transform encoding of blocks of pixels (or transform encoding of blocks of a wavelet LL subband). As shown, an input video frame (frame) may be partitioned into fixed 16×16 size Macroblocks (MBs) and then into 8×8 blocks and further, as needed, into 4×4 blocks for intra prediction by a "Partitioner of Frame to 16×16 MBs & further to 8×8 & 4×4 Blocks". The decision on whether to use 4×4 or 8×8 blocks for prediction may be locally adaptive in a frame and may be decided based on a content analysis by a "Preprocessor" or a "Rate Distortion Optimization (RDO)" module or both during coding (such modules and/or operations are not shown for the sake of simplicity).

For example, the result of the content analysis preprocessor or RDO process may be the determination of whether a 16×16 luma block of a Macroblock can be predicted or if it needs to partitioned into 8×8 blocks, and further if any one or all of 8×8 blocks need to be partitioned into 4×4 blocks for prediction. Such partitioning may be locally adaptive and certain MBs may be predicted at 16×16 level, while others may be partitioned into 8×8 for prediction, and yet others in which certain 8×8's may be further partitioned into 4×4 blocks for prediction. In any case, for an input partitioned block, prediction block of the same size may be formed (e.g., predicted) from decoded neighboring blocks. The prediction may be block based and may be determined from 9 choices: DC (average), planar, or 7 possible directions. For example, the prediction block may be generated by a "Intra DC/Planar/7 Directional Predictor" based on a mode decision made by a "Intra DC/Planar/7 Prediction Directions Estimator". Each residual signal block of 16×16 or 8×8 or 4×4 size after prediction may be determined by a differencer 511. Each residual signal block may then be transformed by an orthogonal integer transform of basis 8 (for 16×16 or 8×8 prediction) or basis 4 (for 4×4 prediction) by a "4×4/8×8 2D Block Integer (DCT Approximation) Transform" module into transform coefficient blocks of 8×8 size/4×4 size which may then be quantized by a "Quantizer" and the quantized coefficients may be entropy encoded by a Context Adaptive Binary Arithmetic Coder (CABAC) as implemented by a "4×4/8×8 Scan, CABAC Encoder & Bitstream Formatter" generating an encoded bitstream (bitstr). The entropy coder may also encode partitioning information (partn), quantizer (qp), and intra prediction direction (mode) information. The Encoder block diagram also shows the feedback loop that generates a locally decoded frame at the encoder. In this loop, encoded quantized coefficients may be dequantized at an "Inverse Quantizer" and inverse transformed at a "4×4/8×8 2D Block Integer (DCT Approximation) Inverse Transform" module and added to the previously discussed prediction blocks at an adder 512 to regenerate decoded blocks that may then be both assembled at an "Assembler of 4×4 & 8×8 Blocks to 16×16 MBs & to Frame" to form MBs that may be deblock filtered at a "DeBlock Filtering" module to generate a decoded frame (dec. frame) and buffered at a "Local (Block Lines) Buffer" for use for generating directional prediction.

Figure 5B:
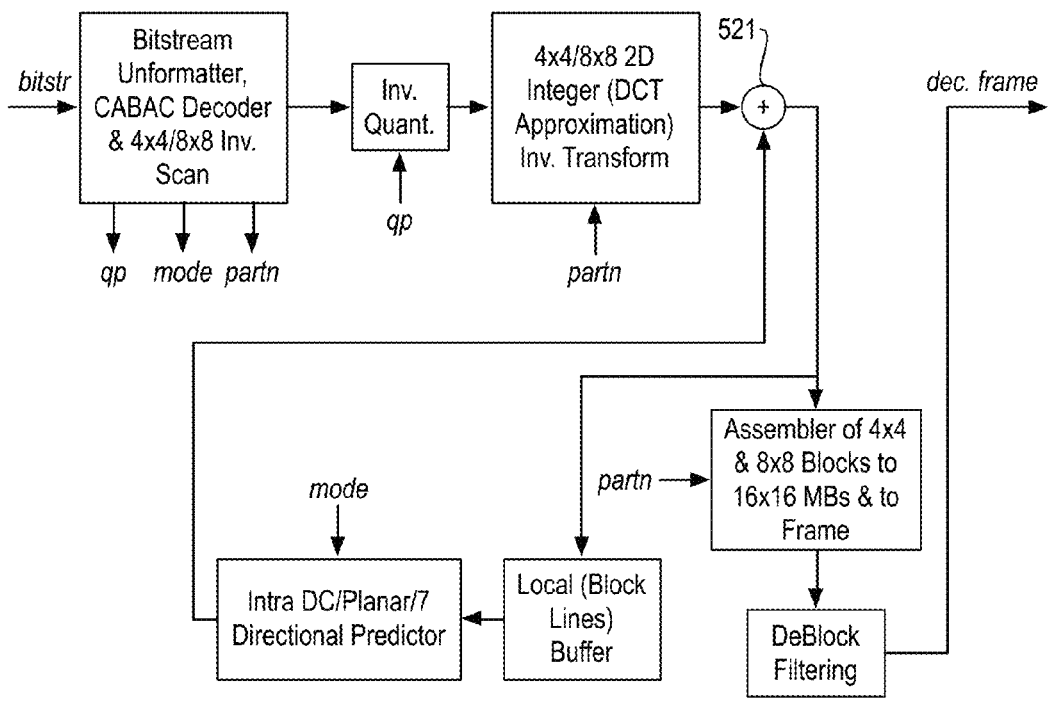
FIG. 5B is a block diagram of an example decoder system illustrating an intra-block/I-frame coding subset of an AVC video decoder referred to herein as an AVC video High I/Intra frame decoder capable of decoding AVC video High I/Intra encoded bitstreams.

FIG. 5B is a block diagram of an example decoder system 502 illustrating an intra-block/I-frame coding subset of an AVC video decoder referred to herein as an AVC video High I/Intra frame decoder capable of decoding AVC video High I/Intra encoded bitstreams, arranged in accordance with at least some implementations of the present disclosure. For example, FIG. 5b may illustrate an AVC video High Intra Decoder that may be used to decode corresponding AVC video High (or High 10) Intra encoded bitstreams. As shown, an input bitstream (bitstr) may be decoded based on CABAC decoding by a "Bitstream Unformatter, CABAC Decoder & 4×4/8×8 Inv. Scan" module resulting in decoded coefficients, partition information (partn), quantizer (qp), and prediction direction (mode). Transform coefficient blocks may be dequantized by an "Inverse Quantizer" resulting in dequantized coefficients that may then be inverse transformed by a "4×4/8×8 2D Integer (DCT Approximation) Inverse Transform" module resulting in decoded residual blocks to which a chosen prediction may be added by adder 521. For example, the prediction blocks may be determined by an "Intra DC/Planar/7 Directional Predictor" using past decoded neighboring blocks and mode information (e.g., one of the 9 values representing either dc, or planar, or one of the 7 directions) for the block being decoded. The resulting of sum of the block residuals and the corresponding block predictions may be the decoded blocks that may be assembled into MBs by an "Assembler of 4×4 & 8×8 Blocks to 16×16 MBs & to Frame" and block filtered by a "DeBlock Filtering" to generate a final decoded frame (dec. frame).

In some examples, an AVC video standard (or its AVC video High Intra subset) may address coding of 8-bit input video. Using techniques discussed herein, the encoder/decoder corresponding may be applied to encoding of LL and other (e.g., HL, LH, and HH) bands that result from one level (or even 2 level or more level) wavelet decomposition. When an AVC standard is used without modification for coding of wavelet bands, instead of using AVC video High profile Intra subset of the standard, a higher (10 bit) bit-depth version that can encode higher bit-depth pixels (such as that resulting from subband decomposition) called AVC video High10 (profile) Intra may be used. Discussion now turns to a modified version of the AVC standard for higher (e.g., HL, LH, HH) bands.

Figure 6A:
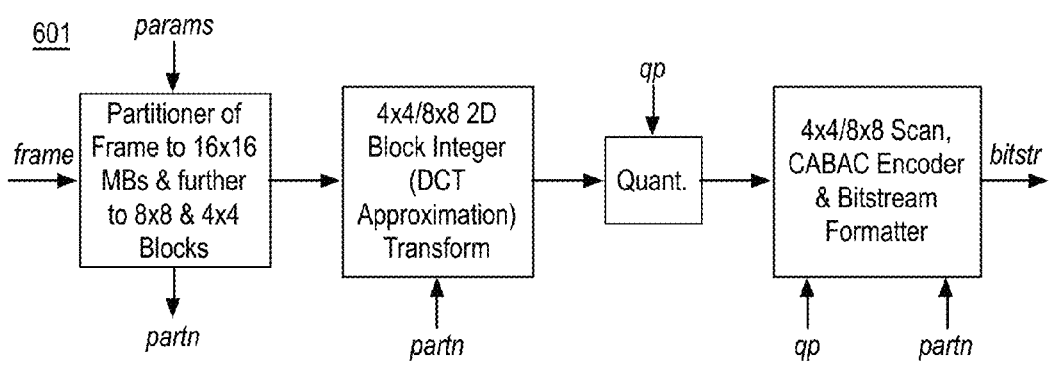
FIG. 6A illustrates an AVC High (or High 10) I/Intra Encoder with removed intra prediction and including scan starting location and scan direction information characterized herein as an AVC video High* I/Intra encoder.

FIG. 6A illustrates an AVC High (or High 10) I/Intra Encoder 601 with removed intra prediction and including scan starting location and scan direction information characterized herein as an AVC video High* I/Intra encoder, arranged in accordance with at least some implementations of the present disclosure. For example, FIG. 6A may illustrate an AVC High* (or High 10*) Intra Encoder. The encoder illustrated in FIG. 6A may provide higher efficiency by allowing adaptation of coefficient scanning in AVC encoding to be customized to characteristics of individual higher wavelet bands such as HL, LH, and HH bands, for example.

As shown, a higher subband resulting from wavelet decomposition (frame) may be input to a "Partitioner of Frame to 16×16 MBs & further to 8×8 & 4×4 Blocks" (e.g. a partitioner) that may partition the frame into 16×16 MBs and may use either content analysis or RDO or both (e.g., as provided by a "Preprocessor" or a "Rate Distortion Optimization (RDO)" module or both, not shown) to determine per MB if each MB needs further partitioning or not. If further partitioning is needed, the partitioner may divide the MB into 8×8 blocks, and again determines if an 8×8 block needs further partitioning into 4×4 blocks (and perform partitioning as needed). For transform coding either 8×8 blocks (when partitioning was 16×16 or 8×8) or 4×4 blocks (when partitioning was 4×4 block size) may be used by a "4×4/8×8 2D Block Integer (DCT Approximation) Transform" module and the transform coefficients may be quantized by a "Quantizer" with a quantizer (qp) and the quantized transform coefficients may be CABAC entropy encoded along with partitioning info (partn) and quantizer (qp) by a "4×4/8×8 Scan, CABAC Encoder & Bitstream Formatter" to generate a bitstream (bitstr).

Figure 6B:
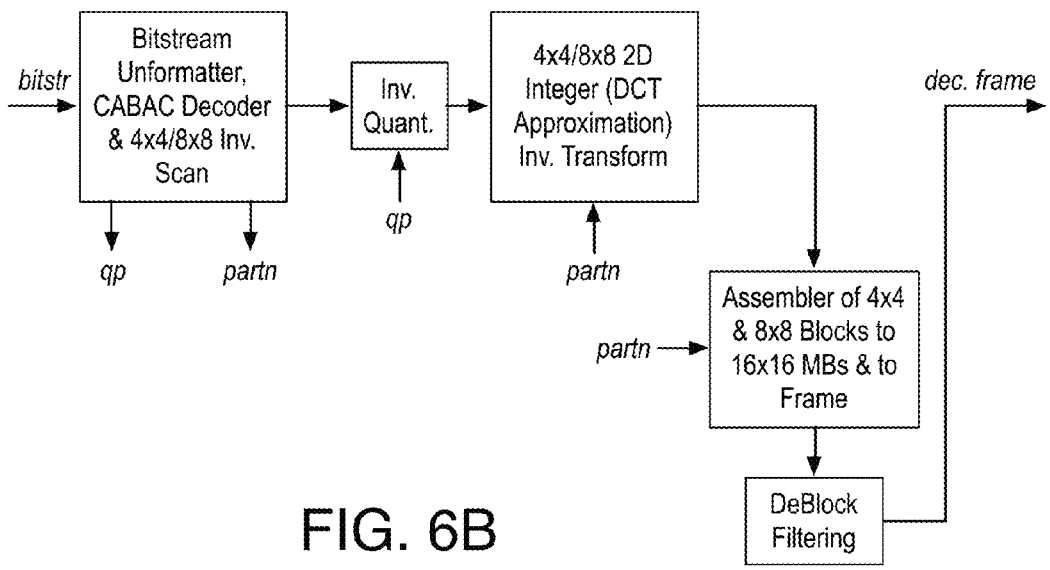
FIG. 6B is a block diagram of an example decoder characterized herein as an AVC video High* I/Intra decoder that may decode bitstreams generated by an AVC video High* I/Intra encoder.

FIG. 6B is a block diagram of an example decoder 602 characterized herein as an AVC video High* I/Intra decoder that may decode bitstreams generated by an AVC video High* I/Intra encoder, arranged in accordance with at least some implementations of the present disclosure. For example, FIG. 6B may illustrate an AVC High* (or High 10*) Intra Decoder that may decode AVC High* (High 10*) Intra encoded streams corresponding to wavelet bands such as HL, LH, HH or the like. For example, the AVC video High* I/Intra decoder may not use intra prediction but may use a scan starting location and direction adaptation depending on the wavelet band being decoded (e.g., HL, LH, HH etc.). As shown, an AVC High* I/Intra encoded bitstream (bitstr) may be input to a CABAC entropy decoder such as a "Bitstream Unformatter, CABAC Decoder & 4×4/8×8 Inverse Scan" module that may decode transform coefficients, partition (partn) info and quantizer (qp) values. The decoded coefficients may be inverse quantized by an "Inverse Quantizer" and input to a "4×4/8×8 2D Integer (DCT Approximation) Inverse Transform" module (e.g., an inverse transform unit) that may perform an inverse transform of size 4×4/8×8 resulting in blocks (e.g., subband blocks) that may be assembled into MBs and frames by an "Assembler of 4×4 & 8×8 Blocks to 16×16 MBs & to Frame" and deblock filtered by a "DeBlock Filtering" module to generate a decoded band (dec. frame).

For example, with the support of encoder 6012 and other techniques discussed herein, wavelet decomposition may be performed on an original image or frame to generate multiple wavelet subbands, a non-LL wavelet subband of the original image or frame may be received for coding, the received wavelet subband may be partitioned into multiple transform partitions, a transform on at least a first transform partition of the multiple transform partitions may be performed to generate a block transform coefficients, the block transform coefficients may be quantized, the quantized block of transform coefficients of the first transform partition may be scanned such that a direction of the scanning is based on a type of the received wavelet subband, and the scanned quantized transform coefficients may be entropy coded with an Advanced Video Coding (AVC) compliant entropy encoder into a bitstream. For example, the type of the received wavelet subband and the direction of scanning the quantized block of transform coefficients may be at least one of an LH subband and from a top-right corner to a bottom-left corner, an HL subband and from a bottom-left corner to a top-right corner, or an HH subband and from a top-left corner to a bottom-right corner. In an embodiment, the partitioning and the transform are Advanced Video Coding (AVC) compliant. Furthermore, a second subband of the plurality of subbands may be encoded with an AVC compliant encoder into a second bitstream and the bitstream and the second bitstream may be multiplexed to generate a scalable bitstream such at least a portion of the scalable bitstream is AVC compliant, as is discussed further herein. For example, the second subband may be an LL subband and the received wavelet subband may be at least one of an LH, an HL, or an HH subband. In some embodiments, as discussed further herein, third through seventh subbands of the plurality of subbands may be encoded using scanning directions based on a type of the third through seventh subbands. For example, the second subband may be an $LL_2$ subband and the wavelet subband may be at least one of an $HH_1$, an $LH_1$, an $HL_1$, an $HH_2$, an $LH_2$, or an $HL_2$ subband.

Furthermore, with the support of decoder 602 and other techniques discussed herein, a scalable bitstream may be demultiplexed to provide multiple bitstreams each corresponding to a subband of a plurality of wavelet subbands, a bitstream corresponding to a first subband of a wavelet subbands may be entropy decoded, via an Advanced Video Coding (AVC) compliant decoder, the decoded bitstream may be inverse scanned to generate decoded transform coefficients such that a direction of scanning of the inverse scanning is based on a type of the first subband, and an inverse quantization, an inverse transform, and a block assembly may be performed based at least in part on the decoded transform coefficients to generate a reconstructed wavelet subband block. For example, the type of the wavelet subband and the direction of scanning may include at least one of an LH subband and generating a block from a bottom-left corner to a top-right corner, an HL subband and generating a block from a top-right corner to a bottom-left corner, or an HH subband and generating a block from a bottom-right corner to a top-left corner. In an embodiment, the decoding, the inverse quantization, the inverse transform, and the block assembly are AVC compliant. Furthermore, a second bitstream of the multiple bitstreams may be decoded with an AVC compliant decoder to generate a second subband of the multiple subbands and an image or frame may be reconstructed based on the second subband and the reconstructed wavelet subband block. For example, there may be 4 subbands and the third and fourth bitstreams corresponding to third and fourth subbands of the subbands may be decoded using inverse scanning directions based on a type of the third and fourth subbands. For example, the second subband may be an LL subband and the wavelet subband may be at least one of an LH, an HL, or an HH subband. In another example, there may be 7 subbands and third through seventh bitstreams may be decoded corresponding to third through seventh subbands of the subbands using inverse scanning directions based on a type of the third through seventh subbands. For example, second subband may be an $LL_2$ subband and the wavelet subband may be at least one of an $HH_1$, an $LH_1$, an $HL_1$, an $HH_2$, an $LH_2$, or an $HL_2$ subband.

Figure 6C:
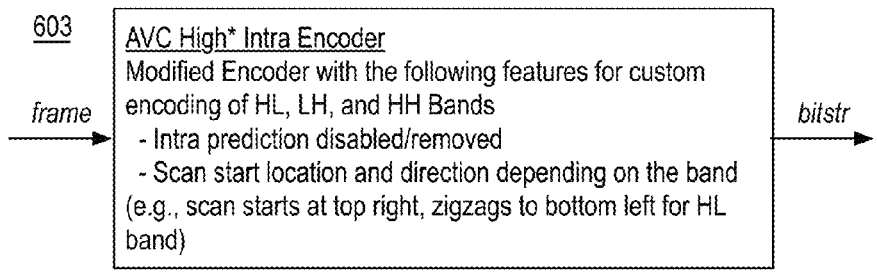
FIG. 6C illustrates a block diagram of example features of an AVC video High*(or High 10*) Intra Encoder.

FIG. 6C illustrates a block diagram of example features 603 of an AVC video High*(or High 10*) Intra Encoder, arranged in accordance with at least some implementations of the present disclosure. For example, FIG. 6C may provide an abstraction of an AVC High* (or High 10*) Intra Encoder showing which encoding features are either disabled (such as intra prediction) or modified (such as scan starting location and scan direction) depending on the wavelet subband. As shown in FIG. 6C, an AVC High* (or High 10*) Intra Encoder may be modified with the following features for custom encoding of HL, LH, and HH bands: Intra prediction may be disabled/removed and quantized coefficient scanning may have a scan start location and direction depending on the band being encoded (e.g., scan starts at top right, zigzags to bottom left for the HL band).

Figure 6D:
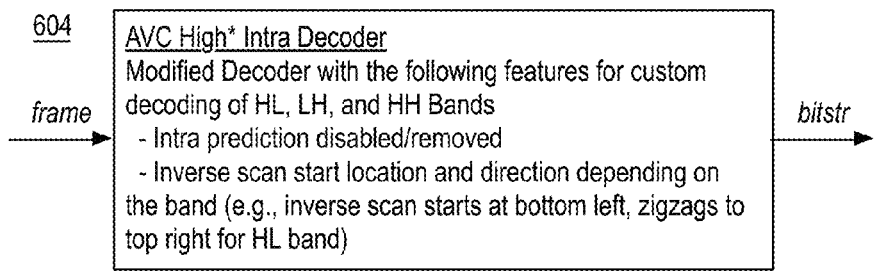
FIG. 6D illustrates a block diagram of example features of an AVC video High*(or High 10*) Intra Decoder.

FIG. 6D illustrates a block diagram of example features 604 of an AVC video High*(or High 10*) Intra Decoder, arranged in accordance with at least some implementations of the present disclosure. For example, FIG. 6D may provide an abstraction of an AVC High* (or High 10*) Intra Decoder showing decoding features that may be either disabled (such as intra prediction) or modified (such as scan starting location and scan direction) depending on the wavelet subband. As shown in FIG. 6D, an AVC High* (or High 10*) Intra Decoder may be modified with the following features for custom decoding of HL, LH, and HH bands: Intra prediction may be disabled/removed and inverse scanning of a bitstream to determine quantized coefficient may have a scan start location and direction depending on the band being decoded (e.g., inverse scan starts may generate quantized coefficients for a block from a bottom left to a top right for the HL band).

Figure 7A:
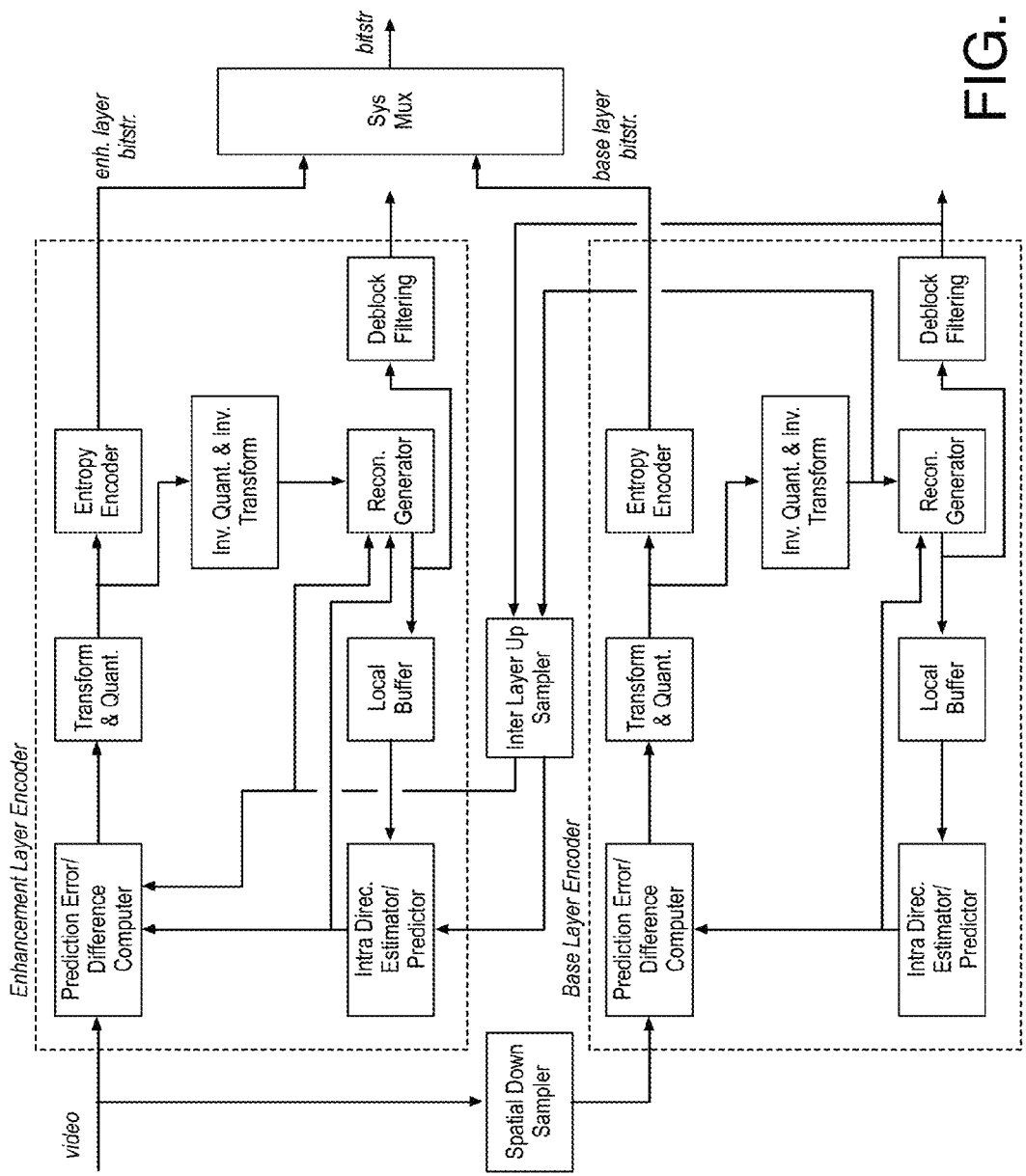
FIG. 7A is a block diagram of an example encoder for providing a 2 layer scalable AVC (e.g., scalable video coding (SVC)) encoder capable of spatial/SNR scalable coding of image/intra frames.

FIG. 7A is a block diagram of an example encoder 701 for providing a 2 layer scalable AVC (e.g., scalable video coding (SVC)) encoder capable of spatial/SNR scalable coding of image/intra frames, arranged in accordance with at least some implementations of the present disclosure. For example, FIG. 7A illustrates an example Two layer Scalable AVC (SVC) Encoder for Spatial/SNR scalable coding of intra frames or images. As shown, for encoding by a "Base Layer Encoder", an input image/video frame (video) may be downsampled by a "Spatial Down Sampler" that may filter and down sample the input image/video frame. The downsampled image/video frame may then be intra predicted (e.g., using directional prediction by an "Intra Directional Estimator/Predictor") on a block basis and its original blocks may be differenced (by a "by a "Transform & Quantization" module") with prediction blocks resulting in prediction error blocks that may be encoded with transform encoding. The prediction error blocks may be transformed (by a "Transform & Quantization" module), quantized (by the "Transform & Quantization" module), and encoded (by a "Entropy Encoder") with block size of 4×4/8×8 with the best block size selected by local content analysis or based on rate distortion optimization (RDO) (not shown) to generate a base layer bitstream (base layer bitstr). The encoded blocks may be locally decoded at the encoder by an "Inverse Quantization & Inverse Transform" module that may inverse quantize and inverse transform the quantized error block coefficients resulting in decoded prediction error blocks to which corresponding prediction blocks may be added by a "Reconstruction Generator" unit resulting in locally decoded image/video frame blocks that may be buffered (at a "Local Buffer") and neighboring blocks may be used for prediction of a current block being coded. Furthermore, the locally decoded image/video frame blocks may be deblock filtered at a "Deblock Filtering" module. Both the decoded prediction error blocks (at the output of the "Inverse Quantization & Inverse Transform" module) and final reconstructed blocks (e.g., at the output of the "Reconstruction Generator" or the "Deblock Filtering" module) may be (after upsampling by an "Inter Layer Up Sampler") available for use for prediction of the higher layer at an "Enhancement Layer Encoder".

As shown, full resolution video frames (video, without downsampling) may be input to an "Enhancement Layer Encoder" and converted to macroblocks and blocks and then, block-by-block, may undergo intra prediction by an "Intra Directional Estimator/Predictor". One input to the "Intra Directional Estimator/Predictor" may be decoded neighboring region-of-blocks for use as reference for computing intra prediction of current block and another input may be an upsampled co-located block from the lower layer (e.g., from the "Inter Layer Up Sampler") that may serve as an alternate prediction. Each original block and its best chosen prediction block basis and upsampled decoded prediction error from lower layer may be sent to a "Prediction Error/Difference Computer" that may determine block based prediction error and, in some cases, even predict prediction error from lower layer prediction error signal. The prediction error difference signal may be transformed (e.g., by 4×4/8×8 transforms) at a "Transform & Quantization" module, quantized at the "Transform & Quantization" module, and entropy coded by a (CABAC) Entropy Encoder at an "Entropy Encoder". The feedback loop at the encoder may include determining quantized transform coefficients (of prediction error or prediction error difference), performing inverse quantization at an "Inverse Quantization & Inverse Transform" module, and then performing an inverse transform at the "Inverse Quantization & Inverse Transform" module resulting in a decoded prediction error or prediction error difference signal that may be input to a "Reconstruction Generator", at the other inputs of which are the (best) prediction signal and upsampled lower layer prediction error (in cases when a current block prediction error difference is coded). The output of the "Reconstruction Generator" are decoded blocks that may be stored in a "Local Buffer" to form neighbors that may be used in prediction of the next block. Furthermore, decoded blocks may be deblocked by a "Deblock Filtering" module to generate a local decoded frame. The bitstreams at the output of the base and enhancement layer "Entropy Encoders", respectively, may be characterized as a base layer bitstream (base layer bitstr.) and an enhancement layer bitstream (enh. layer bitstr.), which may be multiplexed by a "System Multiplexer" into a single scalable encoded bitstream (bitstr.).

Figure 7B:
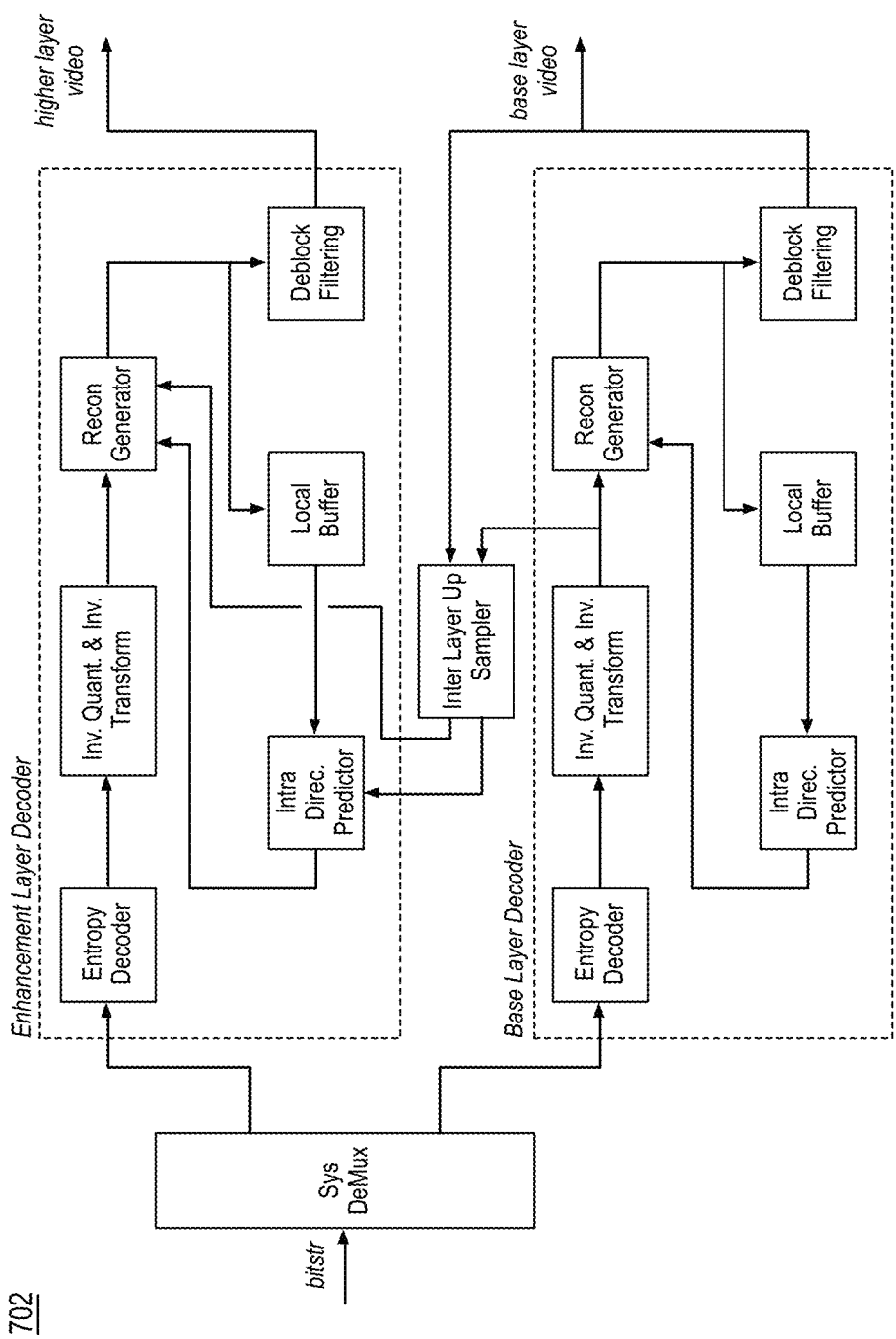
FIG. 7B is a block diagram of an example decoder for providing a 2 layer scalable AVC (e.g., scalable video coding (SVC)) decoder capable of decoding spatial/SNR scalable intra encoded streams generated by the encoder of FIG. 7A.

FIG. 7B is a block diagram of an example decoder 702 for providing a 2 layer scalable AVC (e.g., scalable video coding (SVC)) decoder capable of decoding spatial/SNR scalable intra encoded streams generated by the encoder of FIG. 7A, arranged in accordance with at least some implementations of the present disclosure. For example, FIG. 7B illustrates an example Two layer Scalable AVC (SVC) Intra Decoder for Spatial/SNR scalable decoding of intra frames or images. The decoder of FIG. 7B may operate in the same manner as the local decoding loop at the encoder of FIG. 7A. As shown, a scalable encoded bitstream (bitstr) such as a bitstream from the encoder of FIG. 7A may be demultiplexed into a base layer bitstream and an enhancement layer bitstream so that depending on decoder capabilities, either the base layer bitstream (resulting in a lower resolution decoded frame/image) or both the base and the enhancement layer bitstreams may be decoded (resulting in a full resolution decoded frame/image). Discussion now turns to the operation of the "Base Layer Decoder" and the "Enhancement Layer Decoder" of decoder 702.

For example, a received bitstream (bitstr) may be demultiplexed by a "System DeMultiplexer" and, as shown, a base layer bitstream may be input to an "Entropy Decoder" of the "Base Layer Decoder". Decoded quantized coefficients from the "Entropy Decoder" may be inverse quantized (by an "Inverse Quantizer and Inverse Transform" module) and then inverse transformed (by the "Inverse Quantizer and Inverse Transform" module) resulting in decoded intra prediction error blocks that may be input block-by-block to a "Reconstruction Generator", at the other input to which is the corresponding intra prediction for each block. Decoded blocks at the output of the "Reconstruction Generator" may be stored in a "Local Buffer" and may provide reference block region for intra prediction by an "Intra Directional Predictor". Decoded blocks may also undergo deblock filtering by a "Deblock Filtering" module resulting in decoded lower resolution/quality frame (base layer video). Furthermore, an enhancement layer bitstream may be input to an "Entropy Decoder" of the "Enhancement Layer Decoder" and the resulting decoded quantized coefficients may be inverse quantized (by an "Inverse Quantizer and Inverse Transform" module) and then inverse transformed (by the "Inverse Quantizer and Inverse Transform" module) resulting in decoded intra prediction error blocks or in some cases decoded intra prediction difference blocks that may be input on a block-by-block basis to a "Reconstruction Generator". There are two other possible inputs to the "Reconstruction Generator": one from an "Intra Directional Predictor" (which also includes prediction from the upsampled base layer, if necessary, for a particular block) and another corresponding to upsampled decoded lower layer prediction error from an "Inter Layer Up Sampler" (which for certain blocks may be used to derive prediction difference block/s by adding it to prediction difference error blocks). The resulting output blocks from the "Reconstruction Generator" may be stored in a Local Buffer (and form neighboring region-blocks for prediction of blocks being decoded) and/or deblock filtered by a "Deblock Filtering" module and output to provide a full resolution/quality decoded frame/image (higher layer video).

For the sake of clarity of presentation, in describing FIGS. 7A and 7B, discussion did not include control signals/mode information carried by the base and enhancement layer bitstreams that may be used for correctly decoding these bitstreams resulting in decoded lower resolution/quality and full resolution/quality frames/images. For example, the base layer bitstream may carry per block intra prediction mode info to signal the best prediction mode, and this information may be extracted and used by the base layer decoder to generate predictions per block as needed to generate decoded frame/image. Furthermore, in the enhancement layer bitstream intra prediction information and information as to whether a block can be predicted from an upsampled co-located base layer block, and further, if further information about whether a prediction error block in enhancement layer can be predicted from upsampled prediction error block from base layer, may be carried for use by enhancement layer decoder for proper decoding of higher resolution/quality frame. Furthermore, the two layer system of FIG. 7A and FIG. 7B without loss of generality may be extended to three or more layers. For example, a 2 layer system may include the base and enhancement layer (as in the 2 layer system discussed) and a second enhancement layer that may use the first enhancement layer generated image for prediction in the same way that the first enhancement layer uses base layer frame as prediction.

Discussion now turns to a wavelet based intra video/image coder.

Figure 8A:
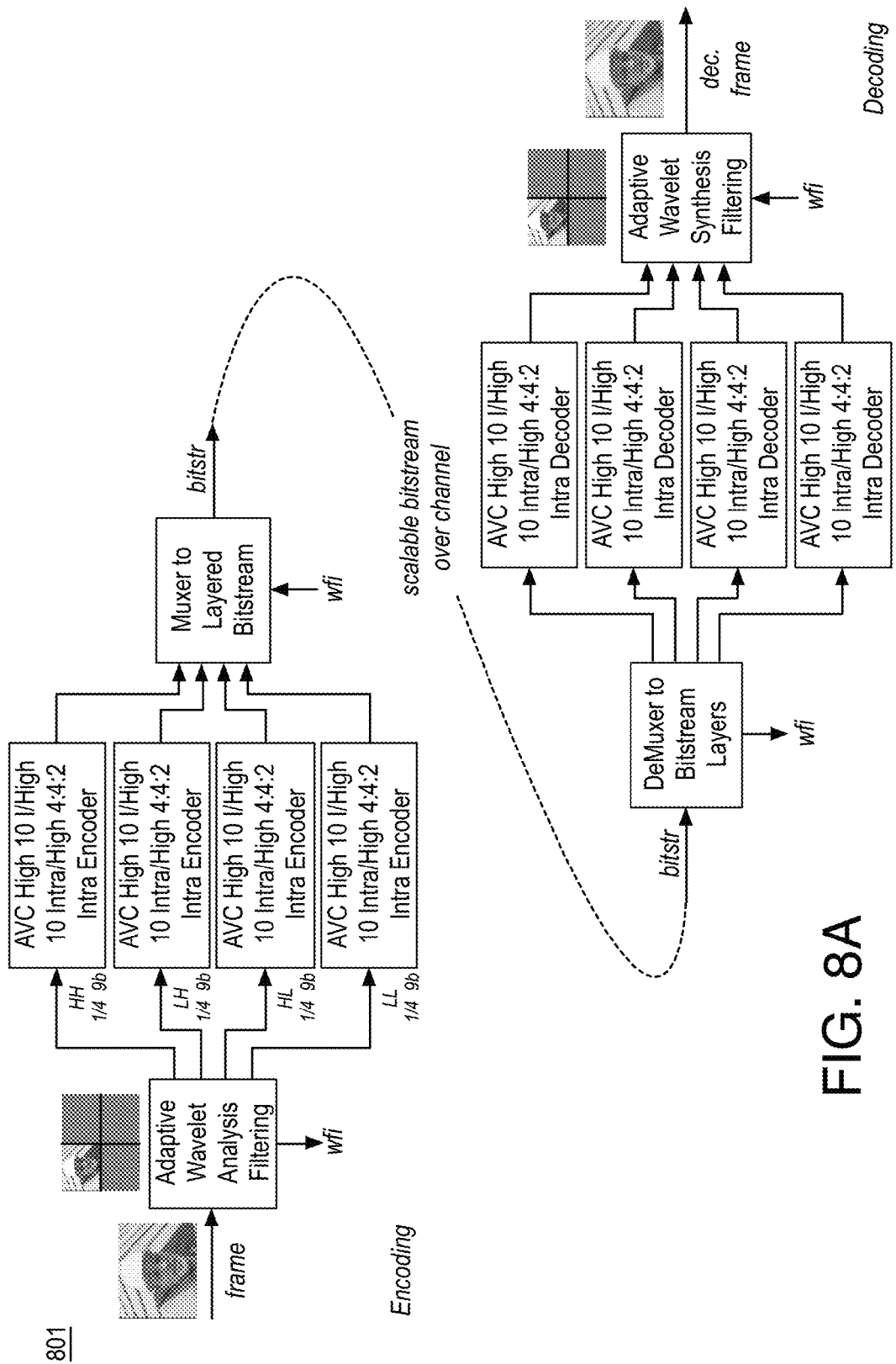
FIG. 8A is a block diagram of an example combined adaptive wavelet AVC (AWAVC) coder.

FIG. 8A is a block diagram of an example combined adaptive wavelet AVC (AWAVC) coder 801, arranged in accordance with at least some implementations of the present disclosure. For example, FIG. 8A may provide an Adaptive Wavelet AVC (AWAVC) Intra codec that combines adaptive wavelet analysis/synthesis filtering with AVC High (or High 10) I-picture or Intra Encode/Decode. As shown, at an encoding side, an input video (or image) YUV frame (frame) may undergo, at an "Adaptive Wavelet Analysis Filtering" module, adaptive wavelet decomposition using a filter set from a codebook of filter-sets with selection of filter based on application (e.g., resolution, content, and bitrate). Using the selected filter set, the process of analysis filtering may be performed on the input frame/image with one level decomposition that may covert the image/frame into wavelet subbands such as LL, HL, LH, and HH subbands, each of which are one-quarter in size and with bit depth of 9 bits (e.g., for 8 bit input video or image). The LL subband may be encoded by an "AVC High 10 I/Intra Encoder" with features such as those described with respect to FIG. 5A and the HL, LH, and HH subbands may be encoded with individual "AVC High 10 I/Intra Encoders". The outcome of the encoding process may include four individual bitstreams such as an LL bitstream, an HL bitstream, an LH bitstream, and an HH bitstream that may be multiplexed by a "Muxer to Layered Bitstream" module into a single scalable bitstream (bitstr) for storage or transmission over a channel. The multiplexed bitstream may also carry information about selected filter set used for wavelet analysis decomposition (wfi).

As also shown in FIG. 8A, at a decoding side, a multiplexed bitstream (bitstr) may be demultiplexed into individual LL, HL, LH, and HH bitstreams that may be sent to corresponding AVC High 10 I/Intra decoders for each subband resulting in corresponding four, quarter size decoded subbands. Also decoded from the multiplexed bitstream is information about a wavelet filter used for decomposition (wfi) so that complimentary filter pairs may be used by the "Adaptive Wavelet Synthesis Filtering" module that may receive the four, quarter size decoded subbands and compose them into full resolution/size final reconstructed video (or image) frame for display (dec. frame). For example, although the bitstream is scalable, the use case just described may result in the reconstruction for display of only a single full size video (or image) frame (dec. frame).

For example, as shown in FIG. 8A, wavelet decomposition of an image or frame may be performed (e.g., by the "Adaptive Wavelet Analysis Filtering" module) to generate multiple subbands (HH, LH, HL, LH subbands), each of the multiple subbands may be encoded with an Advanced Video Coding (AVC) compliant encoder to generate a plurality of AVC compliant bitstreams each corresponding to a subband, and the subbands may be multiplexed to generate a scalable bitstream. Furthermore, a wavelet analysis filter set may be selected for performing the wavelet decomposition. In an embodiment, the image or frame (frame) has a bit depth of 8 bits and each of the subbands has a bit depth of 9 bits. For example, the AVC compliant encoder may be a 10 bit intra profile encoder. As shown, performing the wavelet decomposition may include a single level wavelet analysis filtering and the multiple subbands may include four subbands: an LL subband, an LH subband, an HL subband, and an HH subband.

Furthermore, at the decoder side, a scalable bitstream may be demultiplexed such that at least portions of the scalable bitstream are Advanced Video Coding (AVC) compliant to provide multiple bitstreams each corresponding to a subband of a plurality of wavelet subbands, at least one of the bitstreams may be decoded with an AVC compliant decoder, and an image or frame may be reconstructed based on the decoding. In the context of FIG. 8A (and other contexts discussed herein), reconstructing the image or frame may include decoding multiple bitstreams each corresponding to a subband with an AVC compliant decoder to generate decoded subbands and performing single level wavelet synthesis filtering on the decoded subbands to generate the image or frame.

Figure 8B:
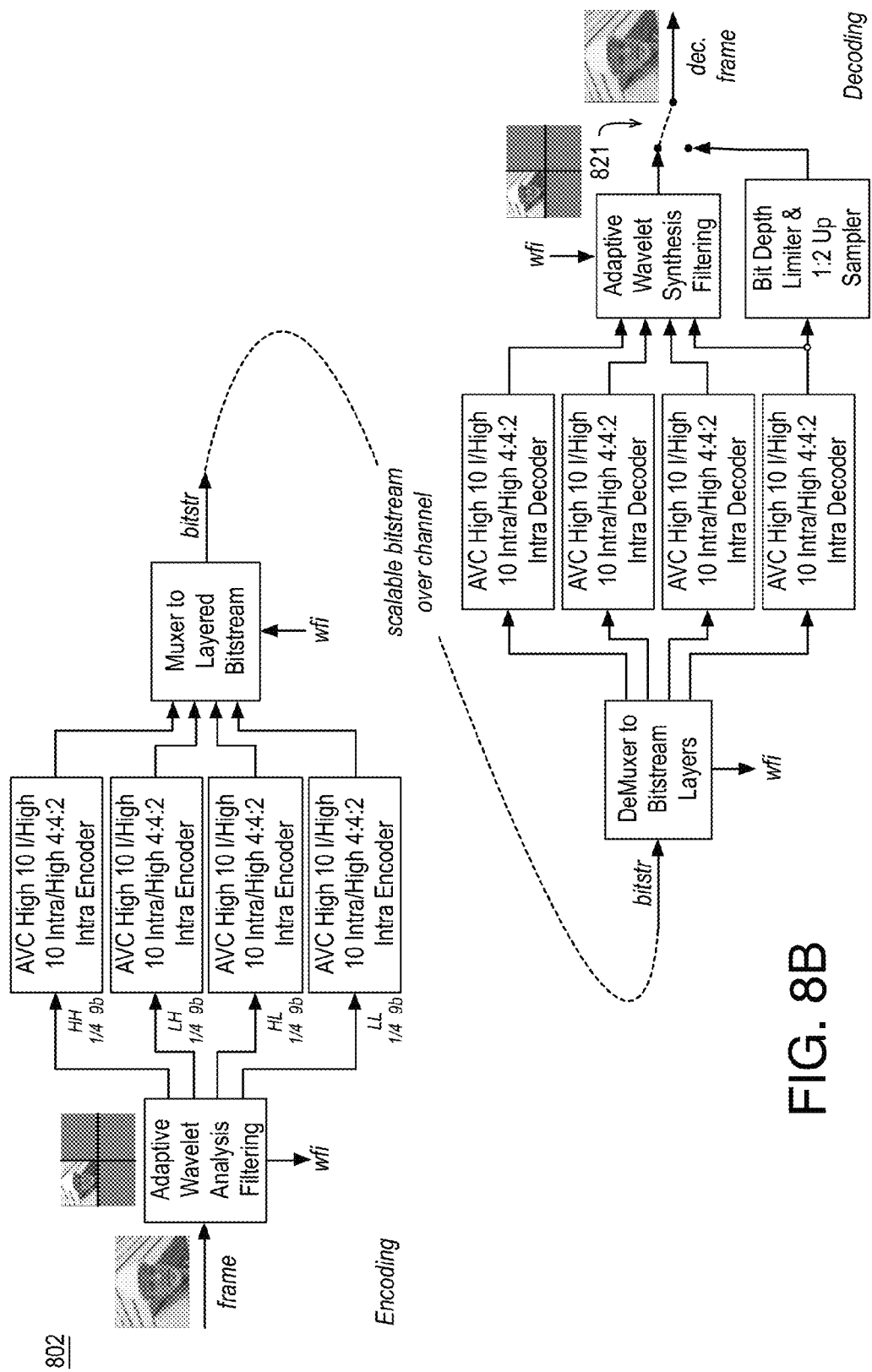
FIG. 8B is a block diagram of another example combined adaptive wavelet AVC (AWAVC) coder.

FIG. 8B is a block diagram of another example combined adaptive wavelet AVC (AWAVC) coder 802, arranged in accordance with at least some implementations of the present disclosure. For example, FIG. 8B provides an adaptive Wavelet AVC (AWAVC) Intra codec that combines adaptive wavelet analysis/synthesis filtering with AVC High (or High 10) I-picture or Intra Encoder/Decoder and shows either full quality video or lower quality video that can be decoded from the same bitstream. As shown, encoding side of FIG. 8B is the same as the encoding side of FIG. 8A. Discussion of such encoding will not be repeated for the sake of brevity. Furthermore, much of the decoding side shown in FIG. 8B is the same as the decoding side in block diagram of FIG. 8A except that an output switch 821 (e.g., an output selection switch) may control two options for display such as whether a low resolution video/image frame is upsampled and output or a full resolution video/image frame after combination of all decoded subbands with the "Adaptive Wavelet Synthesis Filtering" module is output. The choice may be based on the decoding capability (some decoders may not decode full resolution version), application, user selection, system selection, or the like.

For example, at the decoder side of coder 802, a scalable bitstream may be demultiplexed such that at least portions of the scalable bitstream are Advanced Video Coding (AVC) compliant to provide multiple bitstreams each corresponding to a subband of a plurality of wavelet subbands, at least one of the bitstreams may be decoded with an AVC compliant decoder, and an image or frame may be reconstructed based on the decoding. Furthermore, an output selection corresponding to the image or frame (dec. frame) may be determined such that the output selection may be a low resolution or full resolution selection such that reconstructing the image or frame may be responsive to the output selection. For example, when the output selection is low resolution, reconstructing the image or frame may include decoding only an LL subband with the AVC compliant decoder as shown in FIG. 8B. For example, reconstructing the image or frame may further include applying a bit depth limiter and/or performing upsampling by a "Bit Depth Limiter & 1:2 Up Sampler" as shown in FIG. 8B at the decoding side. When output selection is full resolution, reconstructing the image or frame may include decoding multiple bitstreams each corresponding to a subband of multiple wavelet subbands with at least an AVC compliant decoder to generate multiple decoded subbands and wavelet synthesis filtering may be performed on the multiple decoded subbands (by the "Adaptive Wavelet Synthesis Filtering" module) to generate the image or frame at full resolution.

While the embodiments shown in FIGS. 8A and 8B provide, at the encoding side, a 1 level wavelet analysis/decomposition of an input video/image frame into 4 subbands and, correspondingly, at the decoder side, 1 level synthesis/combination/recomposition of 4 subbands to form a decoded video/image frame, the techniques discussed herein may be extended to more than 1 level decomposition/recomposition.

Figure 9A:
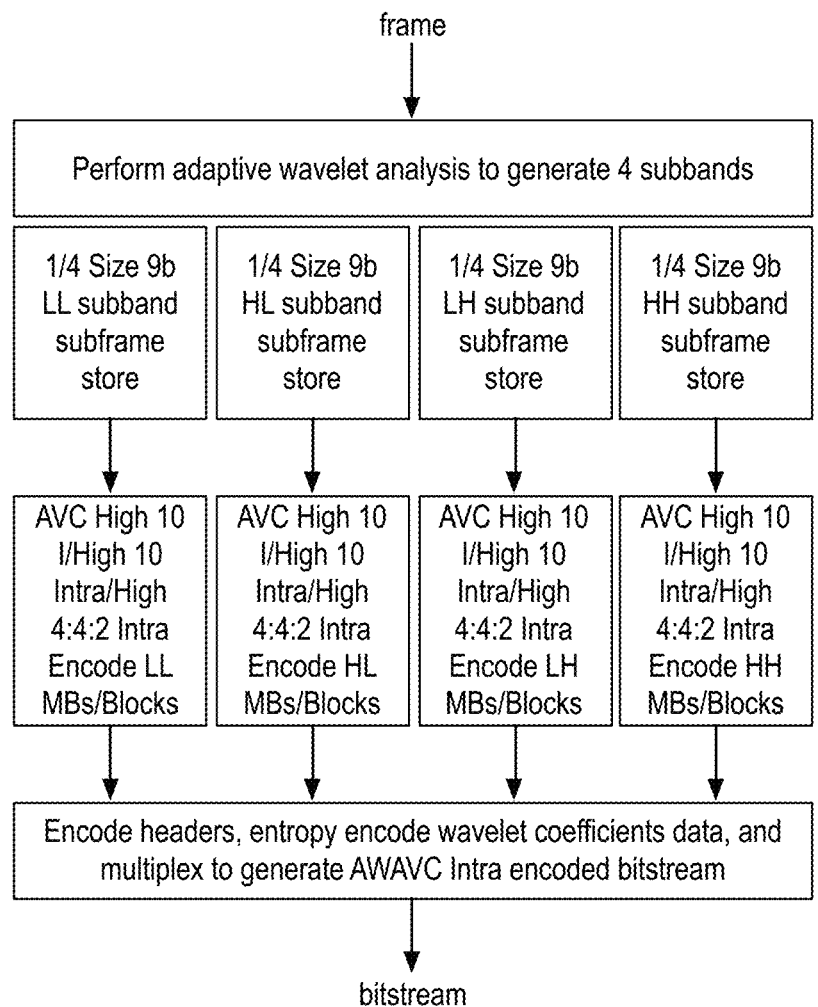
FIG. 9A illustrates an example process for AWAVC Intra Encoding.

FIG. 9A illustrates an example process 901 for AWAVC Intra Encoding, arranged in accordance with at least some implementations of the present disclosure. As shown, an input video (or image) frame (labeled "frame") may undergo one-level adaptive wavelet analysis filtering (e.g., decomposition, which may include selecting a wavelet analysis filter) to generate 4 subbands (at the operation labeled "Perform adaptive wavelet analysis to generate 4 subbands") with each subband being one quarter in size with respect to the input frame or image and consisting of subband coefficients (also referred to as subband pixels or samples) that are of 9 bit in accuracy when pixels of the input frame are of 8 bit accuracy. Each of the generated subbands may then be stored in respective one-quarter size subframe stores (at the operations labeled "¼ Size 9b LL/HL/LH/HH subband subframe store") and partitioned into macroblocks and blocks such that LL subband subframe is input to an AVC High10 I/Intra encoder and HL, LH or HH subband subframes are input to corresponding AVC High10 I/Intra encoders. The individual generated bitstreams (generated at operations labeled "AVC High 10 I/High 10 Intra/High 4:4:2 Intra Encode LL/HL/LH/HH MBs/Blocks") from these AVC High10 I/Intra encoders may be combined with headers (including the header to identify selected subband filters used for analysis/decomposition filtering) and multiplexed (at the operation labeled "Encode headers, entropy encode wavelet coefficients data, and multiplex to generate AWAVC Intra encoded bitstream") to generate a single AWAVC coded bitstream (labeled "bitstream") for storage and/or transmission or the like. The coding process just described may generate a scalable bitstream in which the LL subband bitstream may be decoded independently or all four subbands may be decoded together.

Figure 9B:
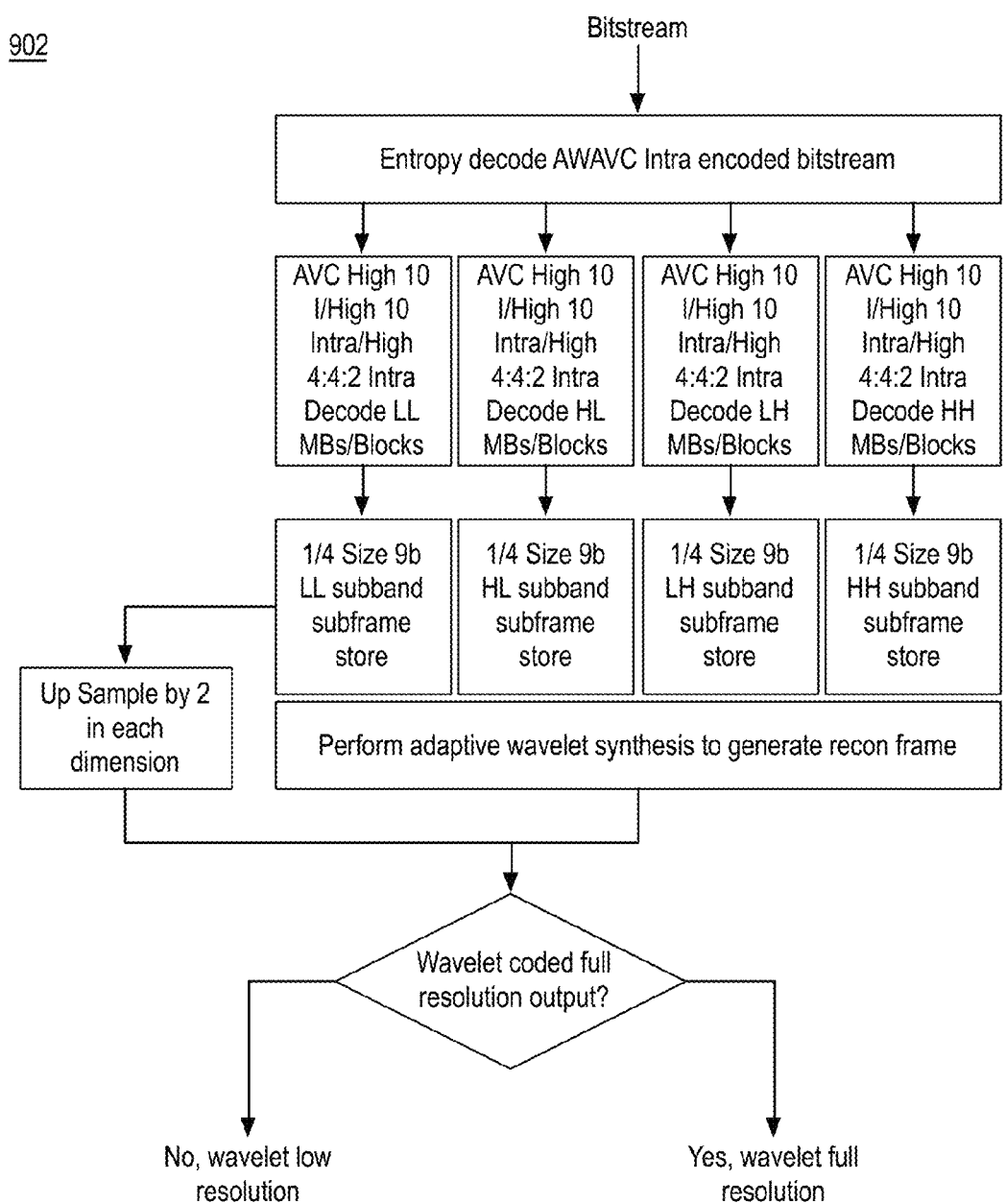
FIG. 9B illustrates an example process for AWAVC Intra Decoding that inverts the process performed by AWAVC Intra encoding.

FIG. 9B illustrates an example process 902 for AWAVC Intra Decoding that inverts the process performed by AWAVC Intra encoding, arranged in accordance with at least some implementations of the present disclosure. As shown, an AWAVC Intra bitstream (labeled "Bitstream") may be received and the bitstream headers may be decoded and the remaining bitstream may be demultiplexed into each of individual LL, HL, LH, and HH bitstreams (at the operation labeled "Entropy decode AWAVC Intra encoded bitstream"). If an output selection (e.g., user request or the like) requests low resolution output (at the decision operation labeled "Wavelet coded full resolution output?"), the LL subband (only) may be decoded by an AVC High 10 I/Intra decoder (at the operation labeled "AVC High 10 I/High 10 Intra/High 4:4:2 Intra Decode LL MBs/Blocks"), bit depth limited, and upsampled (at the operation labeled "Up Sample by 2 in each dimension") to generate a low resolution upsampled video/image frame that may sent to output for display (labeled "No, wavelet low resolution"). If full resolution output is requested, each of the four subbands may be decoded by corresponding AVC High 10 I/Intra decoder decoders (at the operations labeled "AVC High 10 I/High 10 Intra/High 4:4:2 Intra Decode LL/HL/LH/HH MBs/Blocks"). For example, the LL subband may be decoded by an AVC High 10 I/Intra decoder and the HL, LH, and HH subbands may also be decoded by respective AVC High 10 I/Intra decoders and all four subbands may be stored in sub-frame stores (at the operations labeled "¼ Size 9b LL/HL/LH/HH subband subframe store"). The decoded LL, HL, LH, and HH subbands from the sub-frame stores may undergo synthesis/recomposition filtering using a complimentary filter pair (to the analysis filters) (at the operation labeled "Perform adaptive wavelet synthesis to generate recon frame"), the information about which may be decoded from the bitstream. For example, the synthesis filters may combine the decoded subbands resulting in a full reconstructed video/image frame that may be output to display (labeled "Yes, wavelet full resolution"). As discussed, this type of conditional decoding where either the low resolution output or full resolution output is decoded from the same bitstream depending on application, user request, or decoder resource limitations, or the like may be referred to as scalable decoding and may be possible due to scalable (e.g., embedded) coding that may be performed more easily due to wavelet coding. The type of scalability discussed with respect to FIGS. 9A and 9B may provide 2 layers: a quarter resolution layer and another full resolution layer. In other examples, wavelet coding may provide multiple or many layer scalability (with some loss in compression efficiency).

Figure 10A:
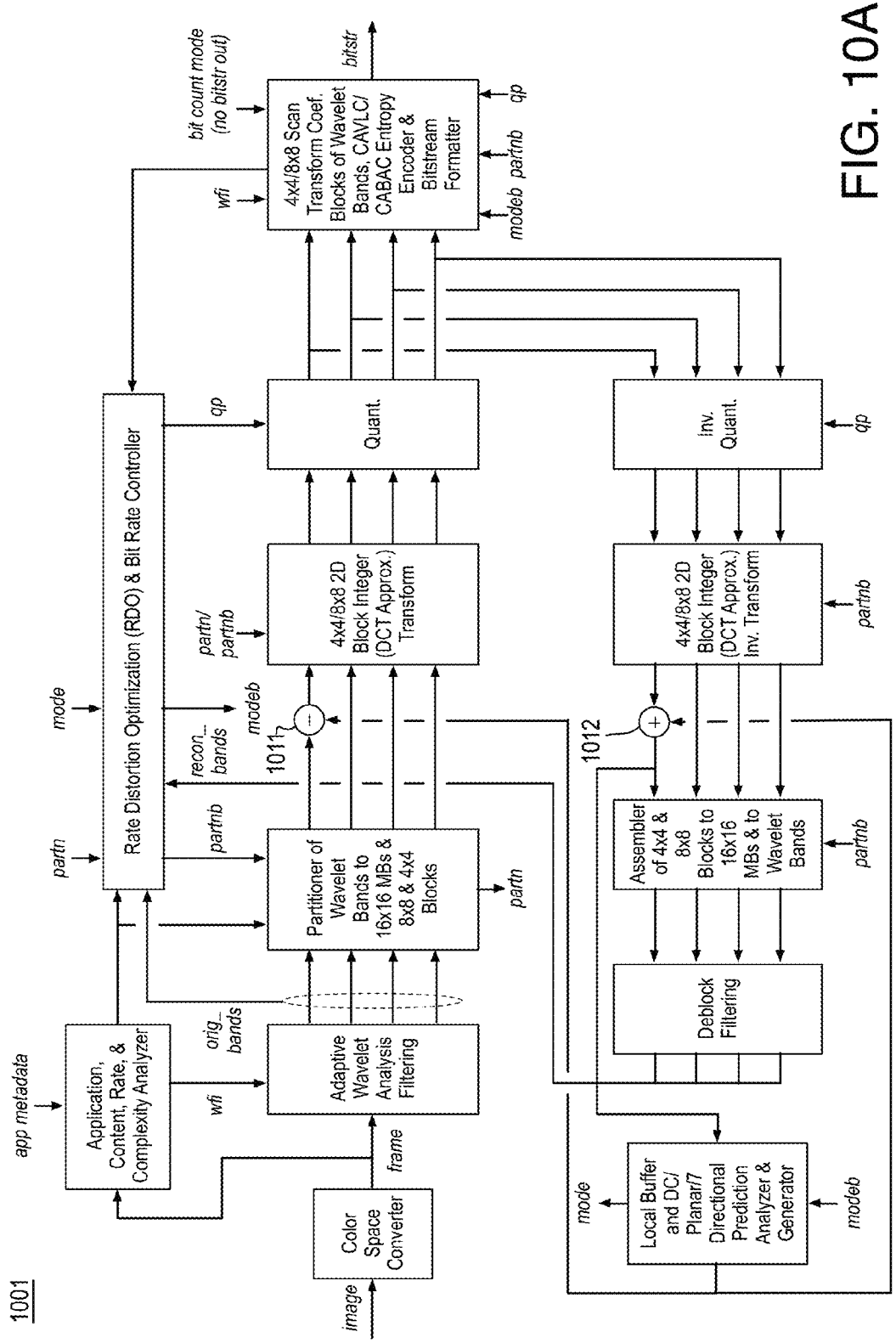
FIG. 10A illustrates a functional block diagram of an example AWAVC Intra Encoder.

FIG. 10A illustrates a functional block diagram of an example AWAVC Intra Encoder 1001, arranged in accordance with at least some implementations of the present disclosure. As shown, an input image (image) may be color converted by a "Color Space Converter" from RGB to a YUV frame (frame) (if the input is a YUV video frame rather than an RGB image then this operation is not needed). Furthermore, without loss of generality it is assumed that a YUV frame is of a 4:2:0 format (e.g., U, and V resolutions are one-half of that of Y both in the horizontal and vertical directions). Based on an evaluation of application parameters (e.g., image/frame resolution, bitrate, etc.) and content (e.g., complexity) by an "Application, Content, Rate, & Complexity Analyzer," a wavelet decomposition/analysis filter may be selected, quality and rate targets may be set, partitioning of bands may be regulated, and bitrate control may be performed.

Also as shown, the YUV frame may undergo one level wavelet decomposition (using wavelet filter pair selected based on application/resolution) into LL, HL, LH, and HH subbands by an "Adaptive Wavelet Analysis Filtering" module and then the content of each macroblock of each band may be partitioned by a "Partitioner of Wavelet Bands to 16×16 MBs & 8×8 & 4×4 Blocks" under control of the "Rate Distortion Optimization & Bit Rate Controller" into 8×8 blocks and further into 4×4 blocks by a "Partitioner of Wavelet Bands to 16×16 MBs & 8×8 & 4×4 Blocks". Such processing may result in many candidate partitions (partn) of each macroblock. For example, the "Rate Distortion Optimization & Bit Rate Controller" may provide a best selection of partition size, prediction mode, and transform type.

Furthermore, for each LL band macroblock partition, several candidate intra (DC, planar, and 7 directional) prediction modes (mode) may be generated using decoded neighboring blocks by a "Local Buffer and DC/Planar/7 Directional Prediction Analyzer & Generator". For other (e.g., HL, LH, HH) band macroblock partitions, intra prediction is not performed.

As shown in FIG. 10A, LL band MB partitioned blocks may be differenced with candidate prediction partition blocks by a differencer 1011 to compute candidate difference partition blocks that are then transformed by a "4×4/8×8 2D Block Integer Transform" module resulting in candidate transform coefficient blocks. For other bands, no predictions are needed and thus the prediction partition/blocks samples are directly transformed resulting in transform coefficient blocks. All transform block coefficients are quantized by a "Quantizer" and entropy encoded by CABAC Entropy encoder at a "4×4/8×8 Scan Transform Coefficient Blocks of Wavelet Bands, CAVLC/CABAC Entropy Encoder & Bitstream Formatter". All bit costs such as transform coefficients entropy coding bit costs, MB partitioning bit costs, prediction mode bit costs are determined by the "4×4/8×8 Scan Transform Coefficient Blocks of Wavelet Bands, CAVLC/CABAC Entropy Encoder & Bitstream Formatter" module. Thus for a combination (partition size, prediction mode, transform coefficients block) cost can be calculated and a reconstructed partition may be determined and thus the distortion can also be calculated. These costs and distortions are used in rate distortion optimization as follows.

Given a set of candidate partitions (partn) of each macroblock, candidate intra prediction modes (mode), and potential quantizer values (q), the "Rate Distortion Optimization & Bit Rate Controller" makes the best decision using the bitrate (from bit costs provided by the entropy encoder) and the distortion measure (computed from difference of the original and the reconstructed subband partitions) on the best encoding strategy by determining the best partitioning (partnb) and the best intra prediction mode (modeb) to use for coding of each partition, and the quantizer (qp) that will allow achieving the best (RD tradeoff) quality results under constraint of available bitrate. The selections of partnb, modeb, and qp are sent via the bitstream (bitstr) to the decoder.

The process of forming predictions from neighbors requires reconstruction of neighboring blocks, requiring a decoding loop at the encoder. As shown, quantized coefficient blocks (from the "Quantizer") of each band at the encoder may go through dequantization at an "Inverse Quantizer", followed by an inverse transform at a "4×4/8×8 2D Block Integer Inverse transform" module resulting in blocks of reconstructed samples of the HL, LH, and HH bands and interim blocks of reconstructed samples of the LL band. For the LL band, prediction mode may be used to acquire prediction blocks to add to the LL band interim reconstructed blocks to generate final reconstructed blocks. For example, prediction blocks may be generated by the "Local Buffer and DC/Planar/7 Directional Prediction Analyzer & Generator" and added to the interim reconstructed blocks by adder 1012. Reconstructed LL band blocks may also be saved in a local buffer and used for current block prediction by the "Local Buffer and DC/Planar/7 Directional Prediction Analyzer & Generator" such that the predicted block provides one input to differencer 1011. The other input to difference 1011 may be the current partition/block being coded. Furthermore, since full reconstruction of all bands is needed for the purpose of computing distortion, the reconstructed LL band and the other (HL, LH, HH) band blocks are assembled to form macroblocks at an "Assembler of 4×4 & 8×8 Blocks to 16×16 MBs & to Wavelet Bands" and then undergo deblocking in a "Deblock Filtering" module resulting in reconstructed LL, HL, LH, and HH bands with reduced artifacts that are input to RDO for use computing distortion.

Figure 10B:
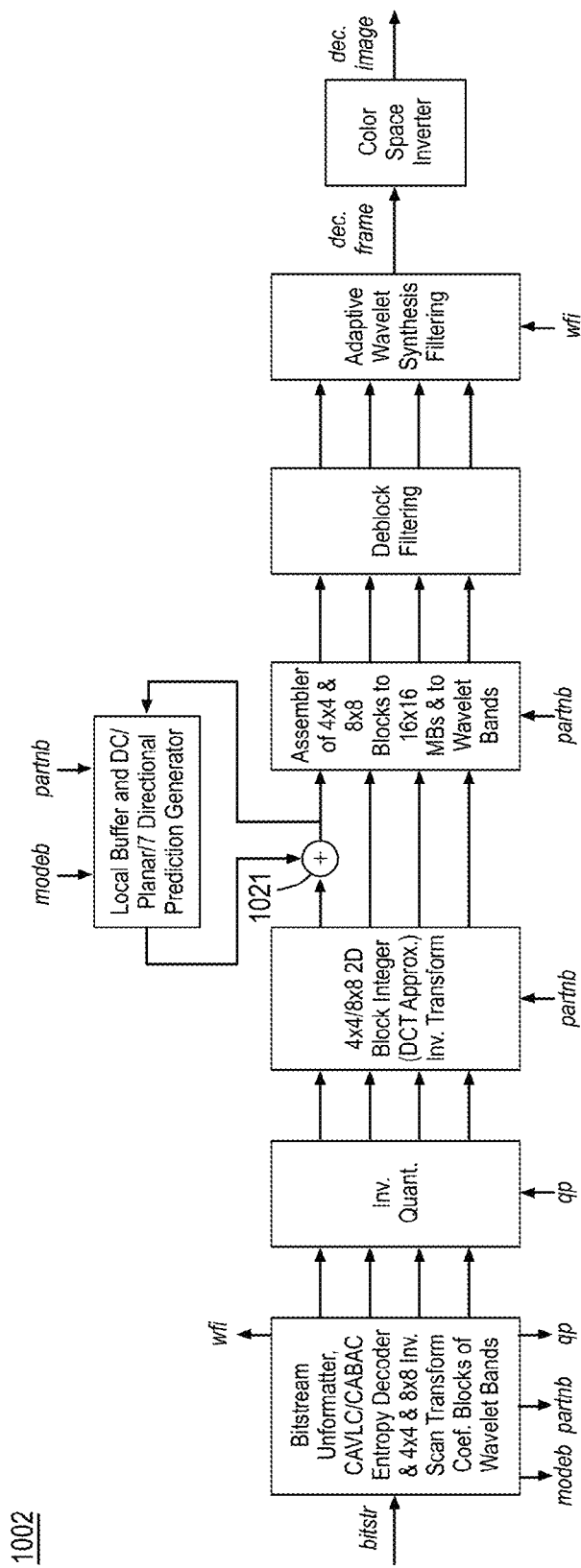
FIG. 10B illustrates a block diagram of a functional standalone AWAVC Intra Decoder corresponding to the encoder of FIG. 10A.

FIG. 10B illustrates a block diagram of a functional standalone AWAVC Intra Decoder 1002 corresponding to the encoder of FIG. 10A, arranged in accordance with at least some implementations of the present disclosure. The discussion of much of decoder 1002 corresponds to the discussion of the decoding loop in AWAVC Intra Encoder 1002, except for the operation of an "Adaptive Wavelet Synthesis Filtering" module and a "Color Space Inverter." As shown, an encoded AWAVC bitstream (bitstr) may be decoded by a "Bitstream Unformatter, CABAC Entropy Decoder & 4×4/8×8 Inverse Scan Transform Coefficient Blocks of Wavelet Bands" module resulting in selected partitioning info (partnb), selected intra prediction mode info (modeb), a selected quantizer (qp), and quantized transform coefficient blocks. The quantized transform coefficient blocks may be dequantized using quantizer qp at an "Inverse Quantizer" and inverse transformed by a "4×4/8×8 2D Block Integer (DCT Approximation) Inverse Transform" module resulting in blocks of reconstructed samples for the HL, LH and HH bands, and blocks of interim samples for the LL band. As discussed, by adding prediction blocks (generated using prediction modeb info) generated by a "Local Buffer and DC/Planar/7 Directional Prediction Generator" to decoded interim blocks by adder 1121, final blocks of the LL band may be generated. All partitions/blocks of each wavelet band may be assembled into macroblocks and thus to full bands by an "Assembler of 4×4 & 8×8 Blocks to 16×16 MBs & to Wavelet Bands" that may undergo deblocking in a "Deblock Filtering" module to reduce coding artifacts and then may be input to the "Adaptive Wavelet Synthesis Filtering" module that may use filters that are complimentary to the wavelet analysis filters (with information on filters used at the encoder sent via the bitstream) to perform synthesis filtering that may combine all 4 bands to generate a decoded YUV frame (dec. frame). Depending on the application either this frame itself may be sufficient or it may need to be converted to the RGB format image by optional processing by the "Color Space Inverter" to generate a decoded image (dec. image).

Figure 11:
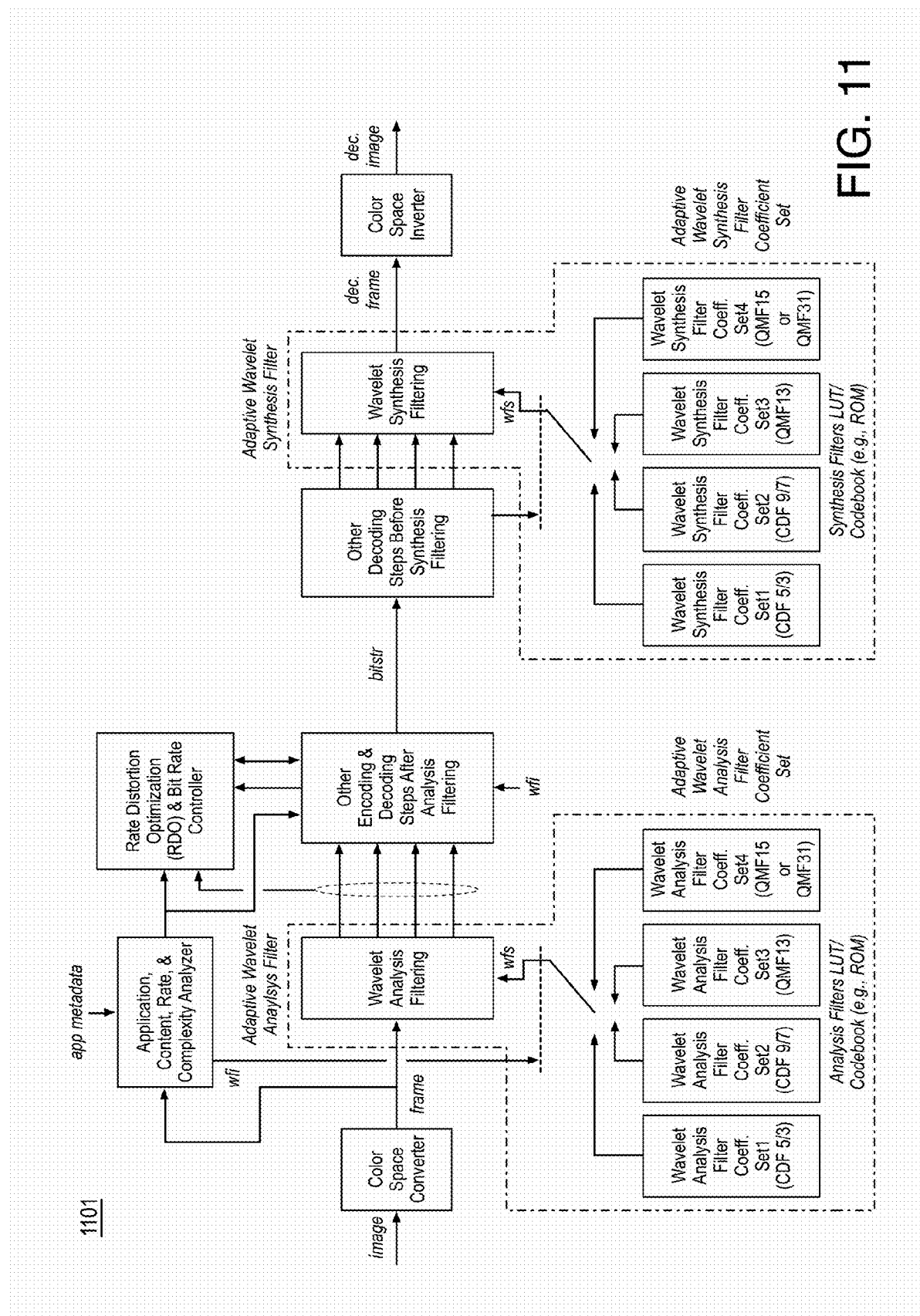
FIG. 11 illustrates a system providing details of the "Adaptive Wavelet Analysis Filtering" module of the AWAVC Encoder of FIG. 10A and the "Adaptive Wavelet Synthesis Filtering" module of the AWAVC Decoder of FIG. 10B.

FIG. 11 illustrates a system 1101 providing details of the "Adaptive Wavelet Analysis Filtering" module of the AWAVC Encoder of FIG. 10A and the "Adaptive Wavelet Synthesis Filtering" module of the AWAVC Decoder of FIG. 10B, arranged in accordance with at least some implementations of the present disclosure. FIG. 11 also illustrates interfaces to rest of the encoder and decoder. For example, FIG. 11 shows some actual blocks ("Color Space Converter", "Application, Content, Rate & Complexity Analyzer", "Rate Distortion Optimization (RDO) & Bit Rate Controller", and "Color Space Inverter") and some bundled blocks ("Other Encoding & Decoding Steps After Analysis Filtering" and "Other Decoding Steps Before Synthesis Filtering") that either interface with "Adaptive Wavelet Analysis Filter" or "Adaptive Wavelet Synthesis Filter." As shown, the "Adaptive Wavelet Analysis Filter" module may be composed of two blocks or modules: an "Adaptive Wavelet Analysis Filter Coefficient Set" module and a "Wavelet Analysis Filtering" unit or module. The "Adaptive Wavelet Analysis Filter Coefficient Set" may be a look up table or codebook of multiple filter sets (e.g., sets 1-4 including CDF 5/3, CDF9/7, QMF13, and QMF15 or QMF31) such that the first filter of the set is used for low pass analysis filtering (lpaf) and the second filter of the set is used for high pass analysis filtering (hpaf) as discussed herein. Based on application (e.g., high quality/fast processing), resolution (e.g., 1080p or less), and content (e.g., high contrast/blurry) a selected filter set may be chosen and signaled via a wavelet filter set index (wfi) in the bitstream (bitstr). For example, the "Wavelet Analysis Filtering" module may use the selected filter set from the codebook (indexed by wfi) to perform subband decomposition at the encoder.

Furthermore, FIG. 11 illustrates the "Adaptive Wavelet Synthesis Filter" may include a "Wavelet Synthesis Filtering" module and an "Adaptive Wavelet Synthesis Filter Coefficient Set" module. The "Adaptive Wavelet Synthesis Filter Coefficient Set" may be a look up table or codebook of multiple filter sets (e.g., sets 1-4 including CDF 5/3, CDF9/7, QMF13, and QMF15 or QMF31) such that the first filter of the set is used for low pass synthesis filtering (lpsf) and the second filter of the set is used for high pass synthesis filtering (hpsf) as discussed herein. For example, lpsf and hpsf are corresponding matching filters to lpaf and hpaf filters. The "Wavelet Synthesis Filtering" may use the decoded wavelet filter set index in the codebook to determine the filter set to use to perform subband recomposition at the decoder.

Figure 12A:
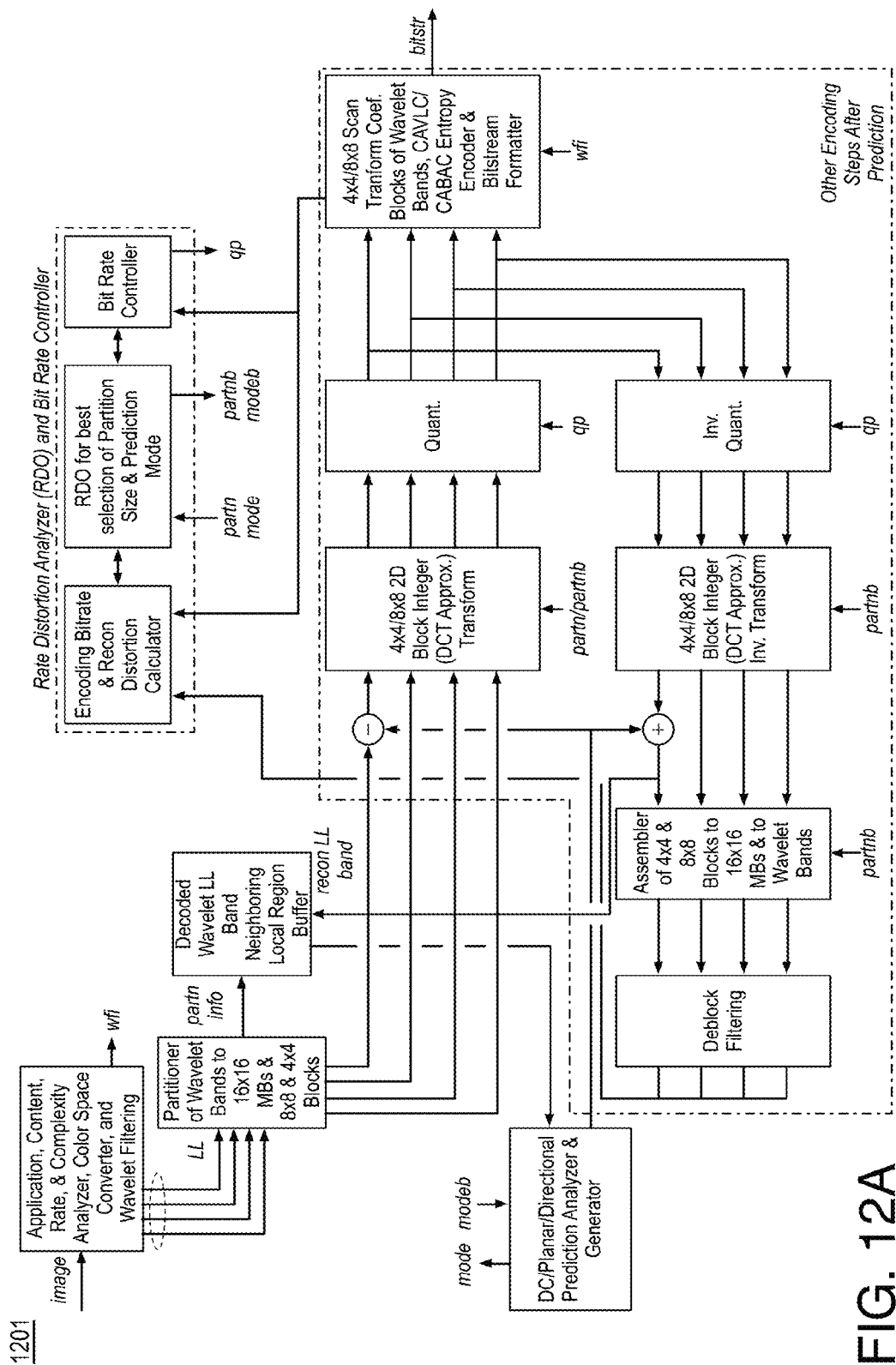
FIG. 12A illustrates a system providing details of the "Local Buffer and Prediction Analyzer and Generator" and interfaces to the rest of the AWAVC Intra Encoder of FIG. 10A.

FIG. 12A illustrates a system 1201 providing details of the "Local Buffer and Prediction Analyzer and Generator" and interfaces to the rest of the AWAVC Intra Encoder of FIG.

10A, arranged in accordance with at least some implementations of the present disclosure. For example, FIG. 12A illustrates the "Local Buffer, and Prediction Analyzer & Prediction Generator" in the AWAVC Intra Encoder. For example, FIG. 12A shows interfaces to a bundled unit "Application, Content, Rate & Complexity Analyzer, Color Space Converter, and Wavelet Analysis Filtering" that is a combination of three units or modules (e.g., "Application, Content, Rate and Complexity Analyzer", "Color Space Converter", and "Wavelet Analysis Filtering"). Furthermore, FIG. 12A illustrates interfaces to "Rate Distortion Analyzer (RDO) and Bit Rate Controller" which for clarity is shown split into three subunits (e.g. an "Encoding Bitrate & Reconstruction Distortion Calculator", a "RDO for best selection of Partition size & Prediction mode", and a "Bit Rate Controller") to clearly show interfaces with the rest of the system. FIG. 12A also illustrates other interfaces such as to the "Partitioner of Wavelet Bands to 16×16 MBs & 8×8 & 4×4 Blocks" as well as to a collection of subunits referred to together as "Other Encoding Steps After Prediction." The "Other Encoding Steps After Prediction" unit may include subunits such as the "Differencer", the "4×4/8×8 2D Block Integer (DCT Approximation) Transform" module, the "Quantizer", the "4×4 to 8×8 Scan Transform Coefficient Blocks of Wavelet Bands, CAVLC/CABAC Entropy Encoder & Bitstream Formatter", the "Inverse Quantizer", the "4×4/8×8 2D Block Integer (DCT Approximation) Inverse Transform" module, the "Adder", the "Assembler of 4×4 & 8×8 Blocks to 16×16 MBs & to Wavelet Bands", and the "Deblocking Filtering" module). Furthermore, the interfaces of these subunits to the "Local Buffer and Prediction Analyzer and Generator" are shown.

Furthermore, the "Local Buffer and Prediction Analyzer and Generator" is shown divided into two units: a "Decoded Wavelet LL band neighboring Local Region Buffer" and a "DC/Planar/7 Directional Prediction Analyzer & Generator". The "Decoded Wavelet LL band neighboring Local Region Buffer" may store decoded previous blocks to use as reference for generating intra prediction. The while "DC/Planar/7 Directional Prediction Analyzer & Generator" may be used to form intra prediction on a partition/block basis using the neighboring block region. For example, the process of generating intra prediction may generate 9 candidate predictions (modes) using DC prediction, planar prediction, and 7 angles based directional prediction that may be analyzed by RDO to determine the best prediction mode (modeb). Besides the modeb signal, the encoded bitstream generated by the "4×4/8×8 Scan Transform Coefficient Blocks of Wavelet Bands, CAVLC/CABAC Entropy Encoder & Bitstream Formatter" may carry other signals including the wavelet filter set selection index (wfi).

Figure 12B:
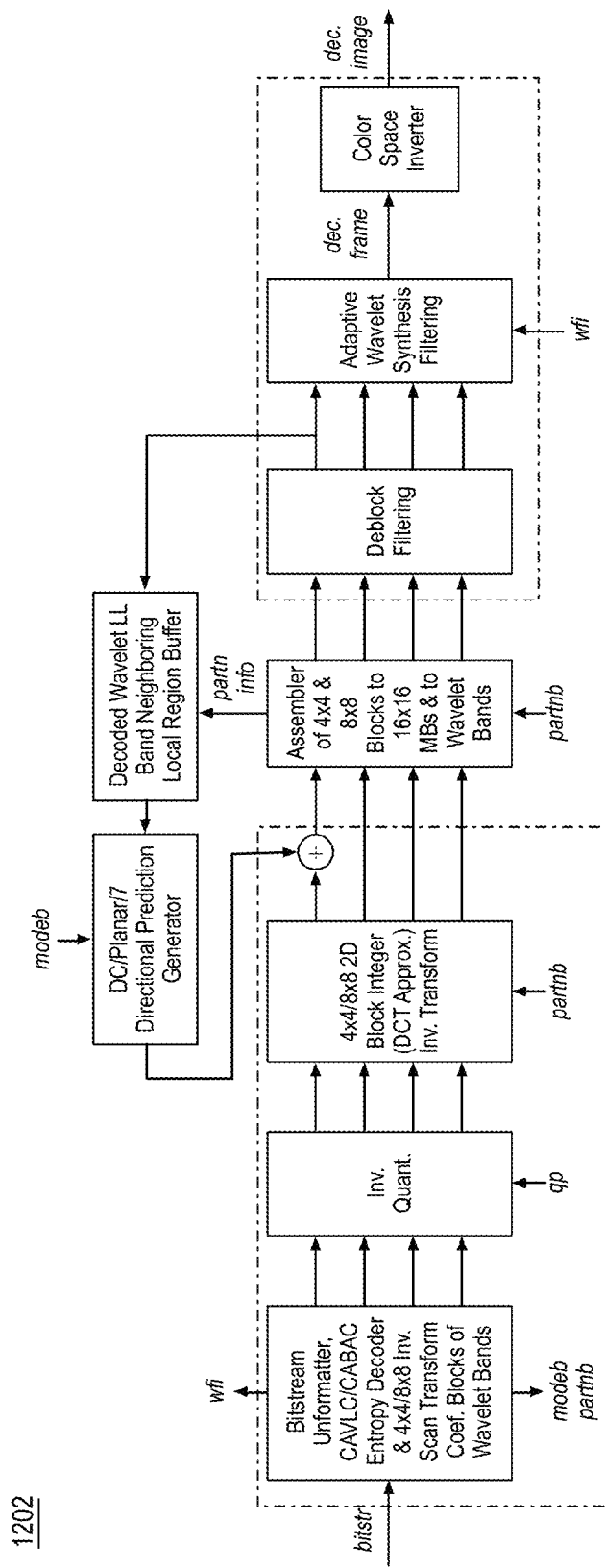
FIG. 12B illustrates a system providing details of the "Local Buffer and Prediction Generator" and interfaces to the rest of the AWAVC Intra Decoder of FIG. 10B.

FIG. 12B illustrates a system 1202 providing details of the "Local Buffer and Prediction Generator" and interfaces to the rest of the AWAVC Intra Decoder of FIG. 10B, arranged in accordance with at least some implementations of the present disclosure. For example, FIG. 12B illustrates the "Local Buffer and Prediction Generator" in the AWAVC Intra Decoder. As illustrated, various units or modules (e.g., the "Bitstream Unformatter, CAVLC/CABAC Entropy Decoder & 4×4/8×8 Inverse Scan Transform Coefficient Blocks of Wavelet Bands" module, the "Inverse Quantizer", the "4×4/8×8 2D Block Integer (DCT Approximation) Inverse Transform" module, the "Adder", the "Assembler of 4×4 & 8×8 Block to 16×16 MBs & to Wavelet Bands", the "Deblock Filtering" module, the "Adaptive Wavelet Synthesis Filtering" module, and the "Color Space Inverter") are provided and serve to show interfaces to the "Local Buffer and Prediction Generator." As shown, the "Local Buffer and Prediction Generator" module may be divided into two subunits or modules: a "Decoded Wavelet LL Band Neighboring Region Buffer" and a "DC/Planar/7 Directional Prediction Generator". The "Decoded Wavelet LL Band Neighboring Region Buffer" may save neighboring blocks needed for making prediction by the "DC/Planar/7 Directional Prediction Generator", which may use modeb to extract the best prediction mode and create prediction for that mode only.

Figure 13:
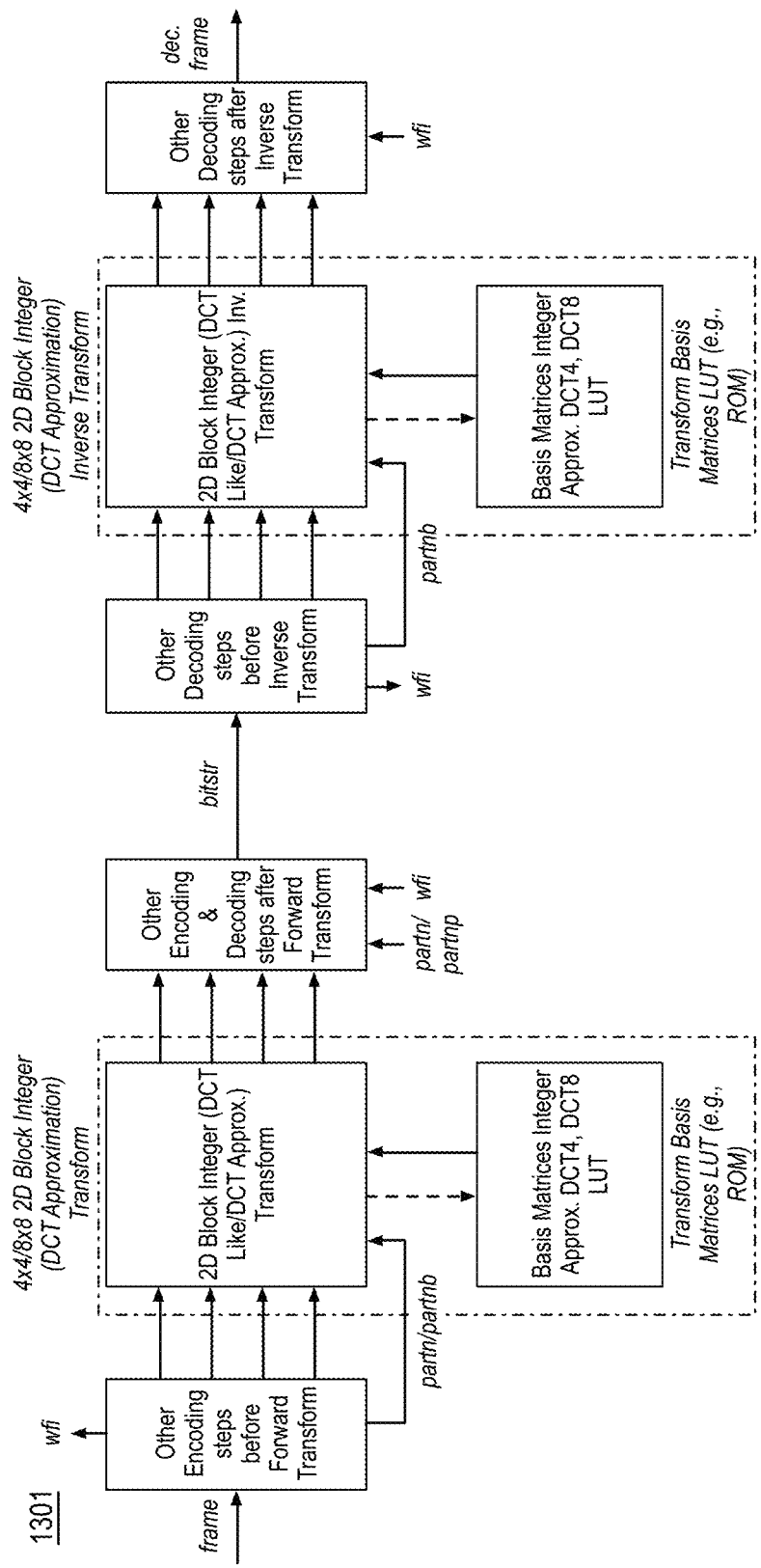
FIG. 13 illustrates a system providing details of the "4×4/8×8 2D Block Integer (DCT Approximation) Transform" module of the AWAVC Intra Encoder of FIG. 10A and the "4×4/8×8 2D Block Integer (DCT Approximation) Inverse Transform" module of the AWAVC Intra Decoder of FIG. 10B.

FIG. 13 illustrates a system 1301 providing details of the "4×4/8×8 2D Block Integer (DCT Approximation) Transform" module of the AWAVC Intra Encoder of FIG. 10A and the "4×4/8×8 2D Block Integer (DCT Approximation) Inverse Transform" module of the AWAVC Intra Decoder of FIG. 10B, arranged in accordance with at least some implementations of the present disclosure. In FIG. 13, on the encoding side, two bundled blocks are illustrated (e.g., "Other Encoding Steps Before Forward Transform" and "Other Encoding & Decoding steps after Forward Transform") that interface with the "4×4/8×8 2D Block Integer (DCT Approximation) Transform" module, which may include two components or modules: a "2D Block Integer (DCT Approximation) Transform" module and a "Basis Matrices Integer Approximation DCT4, DCT8 LUT" unit. For example, the supported choices for forward transform may be 4×4 and 8×8 integer DCT approximation.

Furthermore, the encoder may send a number of control signals via the bitstream (bitstr) it generates. The bitstream formatting process is not shown explicitly but is incorporated in the bundled block "Other Encoding & Decoding steps after Forward Transform" module. The control signals carry information such as best partitioning for a tile (partnb), the best mode decision per partition (modeb) (not shown in FIG. 13 due to simplification), and an index to the chosen wavelet filter set (wfi). Such control signals at the decoder may be decoded by a bundled block "Other Decoding steps before Inverse Transform" that may provide bitstream unformatting among other operations including control of the decoding process at the decoder.

Furthermore, on the decoding side, bundled blocks ("Other Decoding steps before Inverse Transform" and "Other Decoding steps after Inverse Transform") are shown to interface with the "4×4/8×8 2D Block Integer (DCT Approximation) Inverse Transform" component which itself may include two components or modules: a "2D Block Integer (DCT Approximation) Inverse Transform" module and a "Basis Matrices Integer Approximation DCT4, DCT8 LUT" module (e.g., as on the encoder side). For example, the supported choices for inverse transform may be 4×4, and 8×8 DCT approximation (e.g., the same as for the forward transform).

Figure 14A:
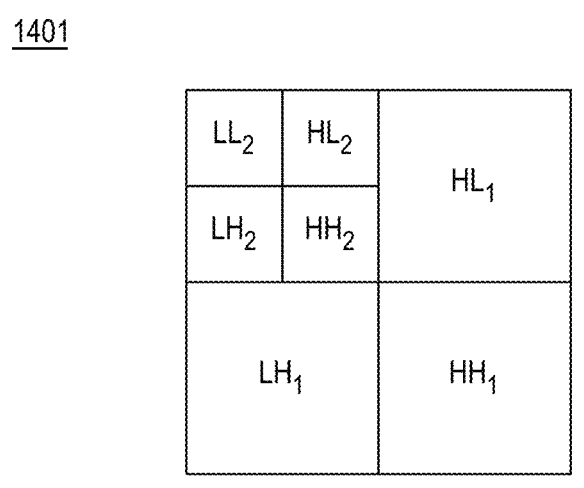

FIG. 14A illustrates a two level dyadic decomposition process 1401 of an image, arranged in accordance with at least some implementations of the present disclosure. For example, FIG. 14A illustrates 7 wavelet bands resulting from 2 level decomposition of a video frame/image. As shown, the process may include performing one level decomposition of an image by applying low-pass and high-pass filtering on rows and then on columns resulting in $LL_1$, $HL_1$, $LH_1$, and $HH_1$ subbands. Furthermore, the low-low ($LL_1$) subband may be decomposed further by an identical decomposition process. This results in decomposition of the $LL_1$ subband further into 4 subbands that may be characterized as $LL_2$, $HL_2$, $LH_2$, and $HH_2$, with $LL_2$ now being the low-low subband. As shown, the two level dyadic decomposition process may generate 7 subbands: $LL_2$, $HL_2$, $LH_2$, $HH_2$, $HL_1$, $LH_1$, and $HH_1$.

Figure 14B:
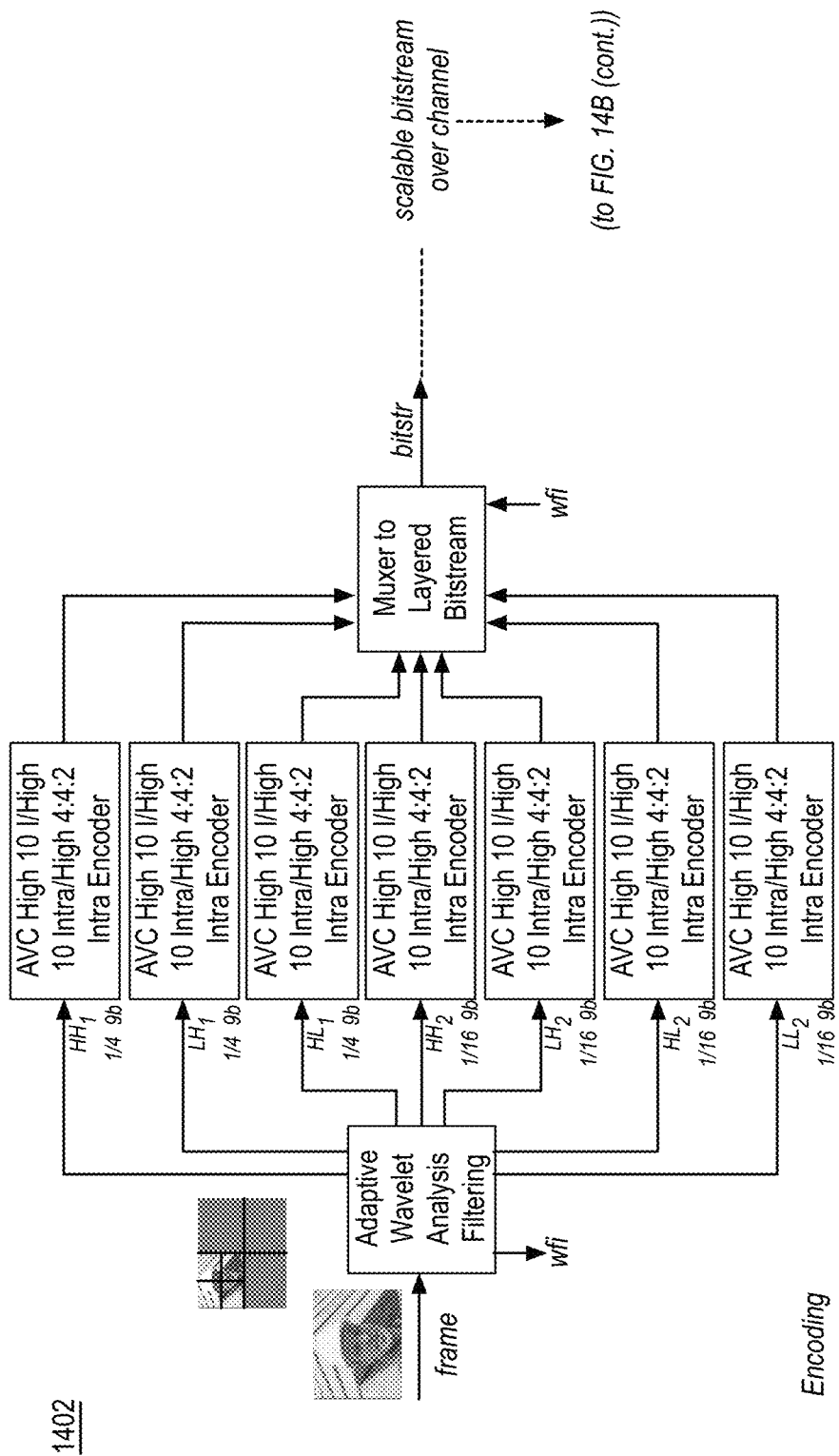
FIG. 14B is a block diagram of an example AWAC (AW2AVC) Intra Coder.

FIG. 14B is a block diagram of an example AWAC (AW2AVC) Intra Coder 1402, arranged in accordance with at least some implementations of the present disclosure. For example, the Encoder/Decoder of FIG. 14B may provide encoding/decoding of 7 subbands of a video/image frame resulting from two level decomposition. For example, FIG. 14 may illustrate an Adaptive Wavelet AVC (AW2AVC) Intra Encoder/Decoder that combines Adaptive Wavelet 2 Level Analysis/Synthesis with AVC High 10 Encoders/Decoders. As shown, at the encoding side, the input video (or image) YUV frame (frame) may undergo adaptive wavelet decomposition using a filter set from a codebook of filter-sets with selection of filter based on application (e.g., resolution, content, and bitrate) by an "Adaptive Wavelet Analysis Filtering" module. Using the selected filter set, the process of analysis filtering may be performed for a two level decomposition and may convert the frame into $LL_2$, $HL_2$, $LH_2$, $HH_2$, $HL_1$, $LH_1$, and $HH_1$ subbands. For example, subbands $LL_2$, $HL_2$, $LH_2$, and $HH_2$ are one-sixteenth in size and subbbands $HL_1$, $LH_1$, and $HH_1$ are one-quarter in size. All subbands have a bit depth of 9 bits (assuming an 8 bit input video or image or frame). Furthermore, one level decomposition may expands the amplitude by square root of 2 (e.g., by a factor of 1.414 thus 8 bit input video in the 0-255 range after one level decomposition may be in the range of 0-361 range requiring 9 bits). The same is again true of performing another level decomposition of the $LL_1$ band, which multiplies the 0-361 range by square root of 2 with the resulting range of 0-511 still fitting into a 9 bit value. Thus, after 2 level decomposition, 10 bit precision is not needed. As shown, subbands $LL_2$, $HL_2$, $LH_2$ and $HH_2$ from 2 level decomposition result in subbands of 1/16 size of input video/image frame, while subbands $HL_1$, $LH_1$ and $HH_1$ are of ¼ size of input video/image frame.

As shown, all 7 subbands (e.g., $LL_2$, $HL_2$, $LH_2$, $HH_2$, $HL_1$, $LH_1$, and $HH_1$) subbands may be encoded by AVC High 10 I/Intra encoder(s) (e.g., "AVC High 10 I/High 10 Intra/High 4:4:2 Intra Encoders"). While using the same encoder on every band may not provide the highest compression efficiency (since all subbands will use intra prediction and scans are not optimized for each subband, etc.) such implementations may be simpler and may provide compatibility and allow for use of efficient hardware or software encoders. As shown, the resulting 7 bitstreams may be multiplexed with headers by a "Muxer to Layered Bitstream" to form a single encoded bitstream (bitstr) where one of the headers in the bitstream includes an index of a wavelet filter set used for decomposition (wfi).

For example, as shown in FIG. 14B, wavelet decomposition of an image or frame may be performed (e.g., by the "Adaptive Wavelet Analysis Filtering" module) to generate multiple subbands ($LL_2$, $HL_2$, $LH_2$, $HH_2$, $HL_1$, $LH_1$, and $HH_1$ subbands), each of the multiple subbands may be encoded with an Advanced Video Coding (AVC) compliant encoder to generate a plurality of AVC compliant bitstreams each corresponding to a subband, and the subbands may be multiplexed to generate a scalable bitstream. Furthermore, a wavelet analysis filter set may be selected for performing the wavelet decomposition. In an embodiment, the image or frame (frame) has a bit depth of 8 bits and each of the subbands has a bit depth of 9 bits. For example, the AVC compliant encoder may be a 10 bit intra profile encoder. As shown, performing the wavelet decomposition may include multiple level wavelet analysis filtering and the multiple subbands may include seven subbands: $LL_2$, $HL_2$, $LH_2$, $HH_2$, $HL_1$, $LH_1$, and $HH_1$.

As shown, the decoding side of FIG. 14B reverses the encoding process. For example, the received bitstream (bitstr) may be demultiplexed by a "DeMuxer to Bitstream Layers" to subband bitstreams and decoding headers. For example, one of the decoded headers may include the wavelet filter set selection information. Depending on the application or user requirement or the like, an output selection may be made via switch 1421. For example, if a decoded $LL_2$ subband of 1/16$^{th}$ size/lowest quality frame (which may be upsampled for display) is selected, only the $LL_2$ band is decoded by an "AVC High 10 I/Intra Decoder" such as an "AVC High 10 I/High 10 Intra/High 4:4:2 Intra Decoder" (such a selection may be characterized as a low resolution selection). Such a frame may be bit depth limited and optionally up sampled by a "Bit Depth Limiter & 1:4 Up Sampler", for example, to generate the frame (dec. frame). If this resolution is not sufficient, the user or system may require the next available resolution which is ¼$^{th}$ the size of input frame formed by a synthesis of $LL_2$, $HL_2$, $LH_2$, and $HH_2$ bands and thus requires in addition to decoding $LL_2$ band, using AVC High 10 I/Intra decoders ("AVC High 10 I/High 10 Intra/High 4:4:2 Intra Decoder") to decode $HL_2$, $LH_2$, and $HH_2$ bands and applying 1 level Adaptive Synthesis Filtering to reconstruct ¼ size middle quality frame (which maybe upsampled for display). Such a selection may be characterized as a medium resolution selection. Such a frame may be bit depth limited and optionally up sampled by a "Bit Depth Limiter & 1:2 Up Sampler", for example, to generate the frame (dec. frame). If the user or system requirement is that of a full size/full quality frame (e.g., a full resolution selection), the full resolution frame (dec. frame) may be obtained by decoding all 7 bands by AVC High 10 I/Intra decoders ("AVC High 10 I/High 10 Intra/High 4:4:2 Intra Decoder") and combining the 7 decoded subbands by 2 level Adaptive Synthesis Filtering by the "Adaptive Wavelet Synthesis Filtering" module. For example, in outputting a 9 bit per luma component image on an 8 bit per luma component intended display, bit depth limitation (such as by truncation or rounding or more sophisticated means) may be necessary as discussed.

For example, at the decoder side of coder 1402, a scalable bitstream may be demultiplexed such that at least portions of the scalable bitstream are Advanced Video Coding (AVC) compliant to provide multiple bitstreams each corresponding to a subband of a plurality of wavelet subbands, at least one of the bitstreams may be decoded with an AVC compliant decoder, and an image or frame may be reconstructed based on the decoding. Furthermore, an output selection corresponding to the image or frame (dec. frame) may be determined such that the output selection may be a low resolution, a medium resolution, or a full resolution selection such that reconstructing the image or frame may be responsive to the output selection. For example, when the output selection is low resolution, reconstructing the image or frame may include decoding only an $LL_2$ subband with the AVC compliant decoder. For example, reconstructing the image or frame may further include applying a bit depth limiter and/or performing upsampling by a "Bit Depth Limiter & 1:4 Up Sampler". When the output selection is medium resolution, reconstructing the image or frame may include decoding multiple bitstreams each corresponding to a subband of the plurality of wavelet subbands with at least the AVC compliant decoder to generate multiple decoded subbands such that the multiple bitstreams comprise a subset of the plurality of bitstreams. For example, the subset may be the $LL_2$, $HL_2$, $LH_2$, and $HH_2$ bands. For example, reconstructing the image or frame may further include applying a bit depth limiter and/or performing upsampling by a "Bit Depth Limiter & 1:2 Up Sampler". When output selection is full resolution, reconstructing the image or frame may include decoding multiple bitstreams each corresponding to a subband of multiple wavelet subbands with at least an AVC compliant decoder to generate multiple decoded subbands and performing multiple level wavelet synthesis filtering on the multiple decoded subbands (by the "Adaptive Wavelet Synthesis Filtering" module) to generate the image or frame at full resolution.

Figure 15A:
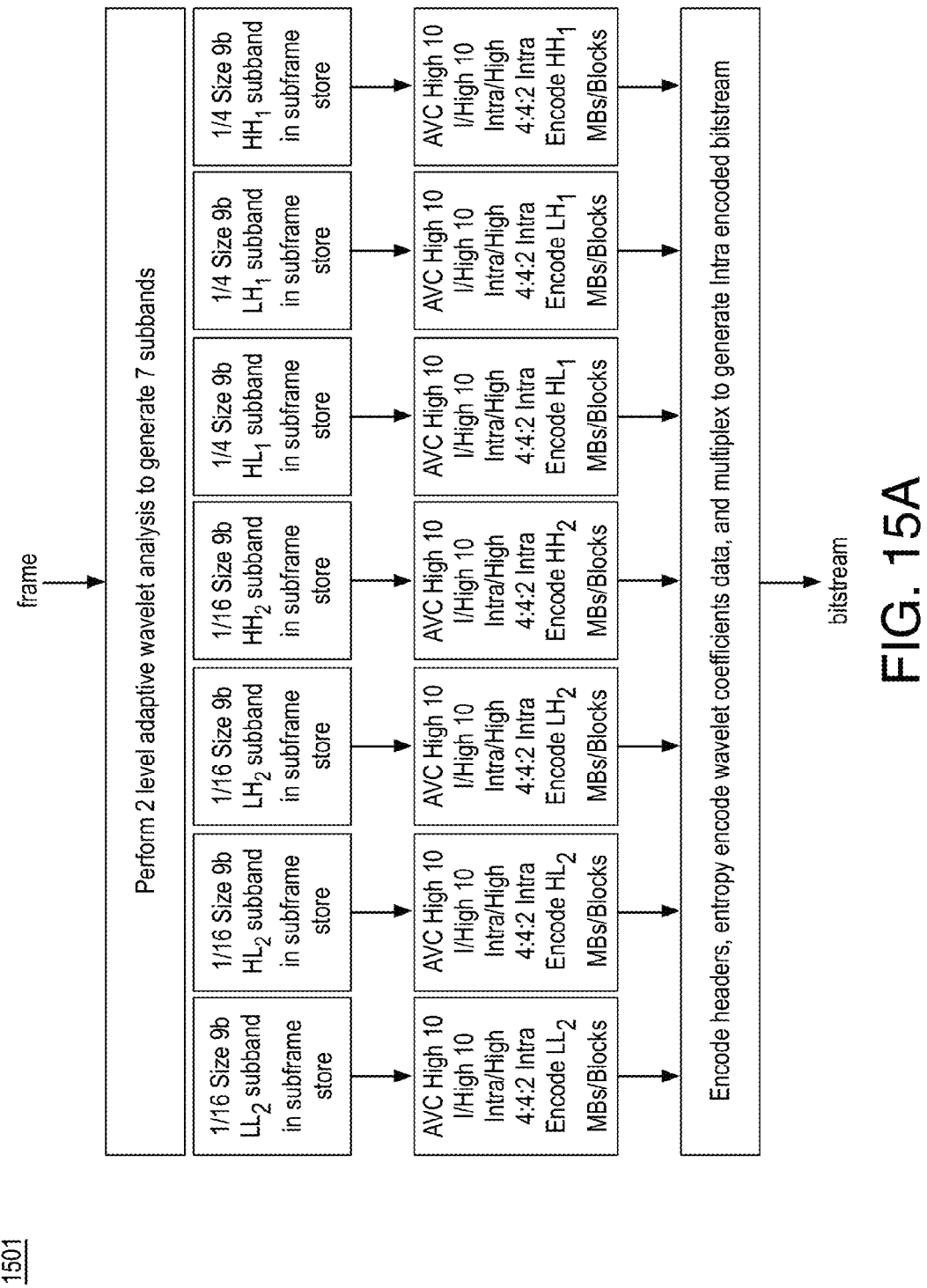
FIG. 15A illustrates an example process for AW2AVC encoding.

FIG. 15A illustrates an example process 1501 for AW2AVC encoding, arranged in accordance with at least some implementations of the present disclosure. As shown, an input video/image frame (labeled "frame") may undergo 2 level adaptive wavelet analysis filtering (at the operation labeled "Perform 2 level adaptive wavelet analysis to generate 7 subbands") to decompose it into 7 bands. The 7 subbands may be stored in their own subframe buffers (at the operations labeled "1/16 Size 9b $LL_2/HL_2/LH_2/HH_2$ subband in subframe store" and "1/4 Size 9b $HL_1/LH_1/HH_1$ subband in subframe store")—4 of the seven bands are $1/16^{th}$ of the original frame size and thus require frame buffers of this size and 3 bands are of $1/4^{th}$ of the input frame size and thus require one-quarter size frame buffers. Each sample (e.g., subband coefficient) in each subband is of 9-bit bit depth when input is of 8-bit bit depth. Each of the seven subbands may be partitioned into MBs and the blocks may be encoded with an AVC High 10 I/Intra encoder (at the operations labeled "AVC High 10 I/High 10 Intra/High 4:4:2 Intra Encode $LL_2/HL_2/LH_2/HH_2/HL_1/LH_1/HH_1$ MBs/Blocks"). The resulting 7 subband bitstreams may be multiplexed with encoded headers (including the header that identifies the selected wavelet filter set) (at the operation labeled "Encode headers, entropy encode wavelet coefficients data, and multiplex to generate Intra encoded bitstream") and output as a single scalable bitstream (labeled "bitstream").

Figure 15B:
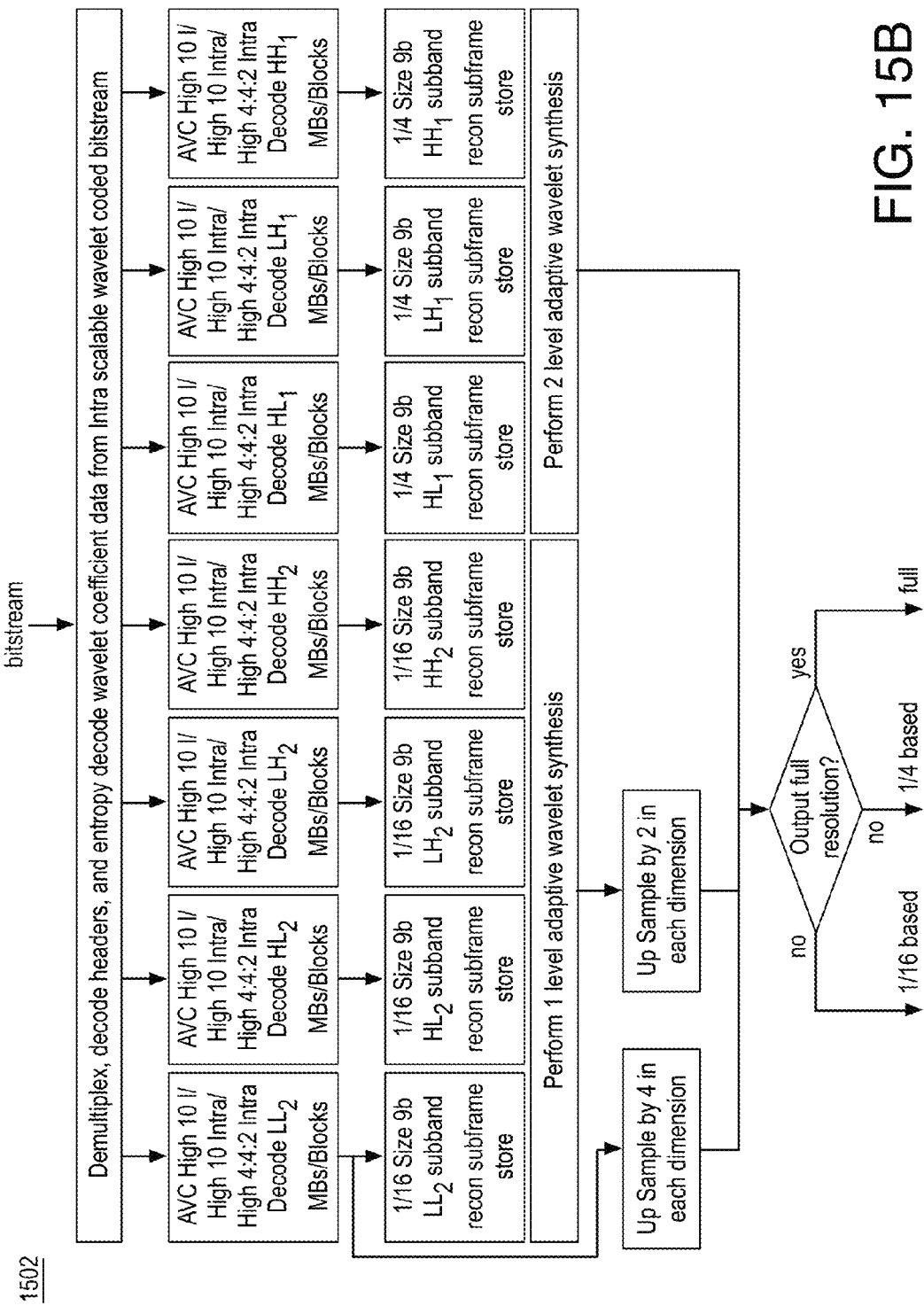
FIG. 15B illustrates an example process for AW2AVC decoding.

FIG. 15B illustrates an example process 1502 for AW2AVC decoding, arranged in accordance with at least some implementations of the present disclosure. As shown, an AW2AVC encoded bitstream (labeled "bitstream") may be input to a demultiplexer and header decoder that may separates out and decode headers and separate individual subband bitstreams (at the operation labeled "Demultiplex, decode headers, and entropy decode wavelet coefficient data from Intra scalable wavelet coded bitstream"). The decoding process may work in one of three different (as determined by the decision operation labeled "Output full resolution?") ways depending on user or system requirements. For instance, if a 1/16 resolution/quality image is deemed sufficient (labeled as "1/16 based"), only the $LL_2$ band may be decoded by an AVC High 10 I/Intra decoder (at the operation labeled "AVC High 10 I/High 10 Intra/High 4:4:2 Intra Decode $LL_2$ MBs/Blocks") and optionally upsampled for display (at the operation labeled "Up Sample by 4 in each dimension"). If the user requirements or the like may be satisfied by a medium resolution/quality image (labeled as "1/4 based"), the $LL_2$, $HL_2$, $LH_2$, and $HH_2$ bands may be decoded by AVC High 10 I/Intra decoder(s) (at the operations labeled "AVC High 10 I/High 10 Intra/High 4:4:2 Intra Decode $LL_2/HL_2/LH_2/HH_2$ MBs/Blocks") and stored in subframes (at the operations labeled "1/16 Size 9b $LL_2/HL_2/LH_2/HH_2$ subband recon subframe store") and composed by an Adaptive Wavelet Synthesis Filtering (at the operation labeled "Perform 1 level adaptive wavelet synthesis") to create a $1/4^{th}$ resolution decoded video/image frame that may be optionally upsampled (at the operation labeled "Up Sample by 2 in each dimension") for display. If the user or the like requires full resolution/quality frame (labeled as "full"), all seven bands may be decoded by AVC High I/Intra decoder(s) (at the operations labeled "AVC High 10 I/High 10 Intra/High 4:4:2 Intra Decode $LL_2/HL_2/LH_2/HH_2/HL_1/LH_1/HH_1$ MBs/Blocks") and stored in subframes (at the operations labeled "1/16 Size 9b $LL_2/HL_2/LH_2/HH_2/HL_1/LH_1/HH_1$ subband recon subframe store") and composed by an Adaptive Wavelet Synthesis Filtering (which uses wavelet filter set identified by wfi) (at the operation labeled "Perform 2 level adaptive wavelet synthesis") to create a full resolution/quality decoded video/image frame for display.

Figure 16:
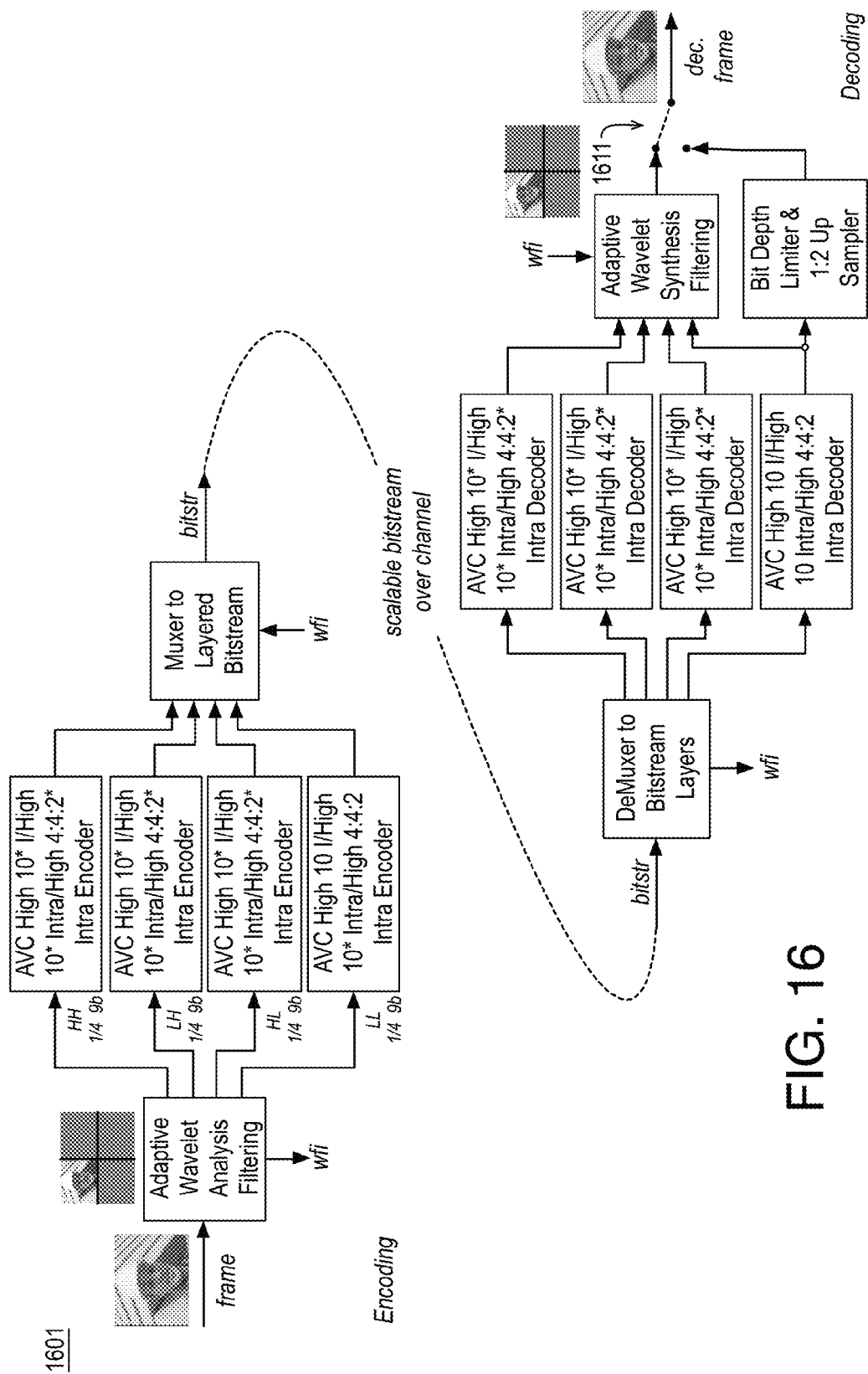
FIG. 16 is a block diagram of an Adaptive Wavelet Modified AVC (AWMAVC) coder.

FIG. 16 is a block diagram of an Adaptive Wavelet Modified AVC (AWMAVC) coder 1601, arranged in accordance with at least some implementations of the present disclosure. For example, FIG. 16 illustrates an Adaptive Wavelet Modified AVC (AWMAVC) Intra Encoder/Decoder that combines adaptive wavelet analysis/synthesis filtering with an AVC High 10/High 10* codec such that the encoder encodes input video frame/image to generate a single bitstream from which either a lower quality or a full quality version of the encoded input video frame/image may be decoded.

As shown, at the encoding side, an input video (or image) YUV frame (frame) may undergo adaptive wavelet decomposition by an "Adaptive Wavelet Analysis Filtering" module using a filter set from a codebook of filter-sets with selection of filter based on application (e.g., resolution, content, and bitrate). Using the selected filter set, the process of analysis filtering may be performed for one level decomposition that may convert the frame into LL, HL, LH, and HH subbands, each of which are one-quarter in size and with bit depth of 9 bits (assuming an 8 bit input video or image). The LL subband may be encoded by an AVC High 10 I/Intra encoder (e.g., "AVC High 10 I/High 10* Intra/High 4:4:2 Intra Encoder") and HL, LH, and HH subbands may be encoded with individual customized AVC High 10* I/Intra encoders (e.g., "AVC High 10* I/High 10* Intra/High 4:4:2* Intra Encoder"). The outcome of the encoding process may include four individual bitstreams such as an LL bitstream, HL bitstream, LH bitstream, and HH bitstream that may be multiplexed by a "Muxer to Layered Bitstream into a single scalable bitstream (bitstr) with headers including a header that carries an index of the selected wavelet filter set (wfi).

Also as shown in FIG. 16, at the decoding side, a bitstream (bitstr) may be received and the headers, including the header that carries an index of a selected wavelet filter set (wfi) may be decoded and the bitstream may be demultiplexed into individual LL, HL, LH, and HH bitstreams by a "DeMuxer to Bitstream Layers". The demultiplexed LL bitstream may be proved to an AVC High 10 I/Intra decoder (e.g., "AVC High 10 I/High 10 Intra/High 4:4:2 Intra Decoder") and depending on a user or system output selection as implemented by a switch 1611, a low resolution decoded video (or image) frame (dec. frame) may be provided for display after optional upsampling by 2 in each dimension by a "Bit Depth Limiter & 1:2 Up Sampler". If the user or system selects (via switch 1611) a full resolution video (or image) frame, the remaining 3 (HL, LH and HH) bands may be provided to corresponding custom AVC High 10* I/Intra decoders (e.g., "AVC High 10* I/High 10* Intra/High 4:4:2* Intra Decoder") and all four, quarter size decoded subbands may be combined using a matching filter set (indicated by the index decoded from the bitstream) by an "Adaptive Wavelet Synthesis Filtering" module. The results may provide a full resolution/size final reconstructed video (or image) frame (dec. frame) for display.

Figure 17A:
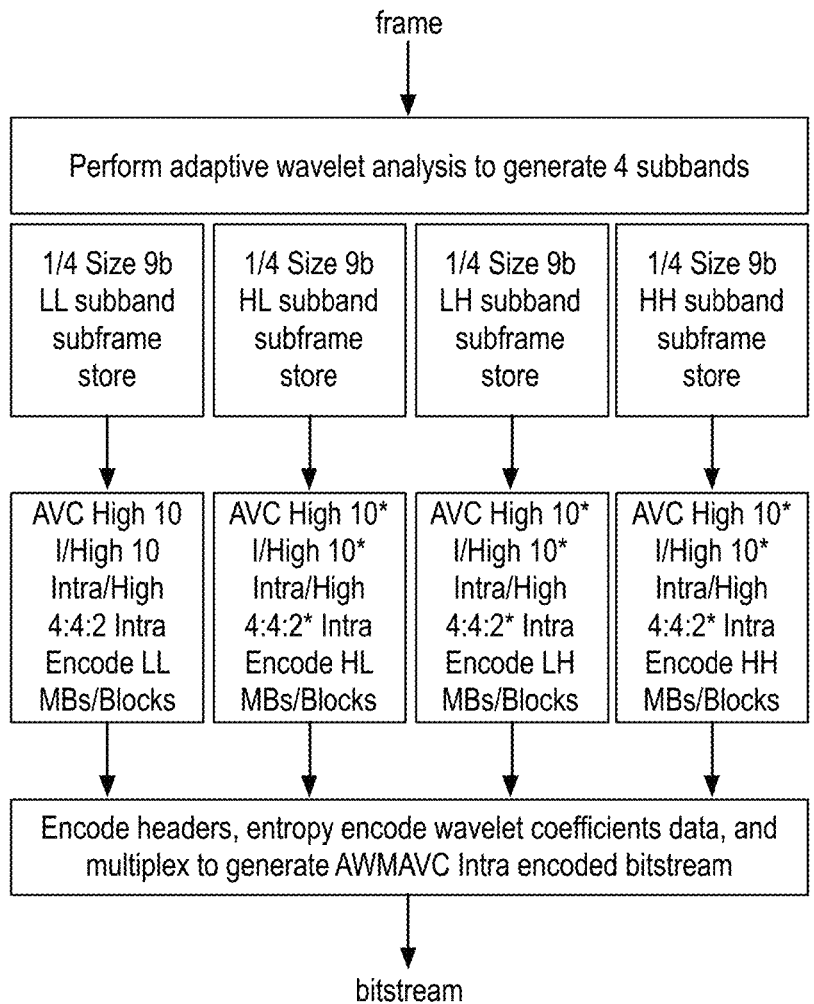
FIG. 17A illustrates an example process for AWMAVC Intra Encoding.

FIG. 17A illustrates an example process 1701 for AWMAVC Intra Encoding, arranged in accordance with at least some implementations of the present disclosure. As shown, an input video (or image) frame (labeled "frame") may undergo a one-level adaptive wavelet analysis filtering (at the operation labeled "Perform adaptive wavelet analysis to generate 4 subbands") based on a choice of best suited filter set depending on the application (e.g., resolution, content and bitrate). The analysis filtering process may result in four subbands with each subband being $\frac{1}{4}^{th}$ in size of the input frame and including subband coefficients (also referred to as subband pixels or samples) that are of 9 bit in accuracy when pixels of the input frame are of 8 bit accuracy. Each of the generated subbands may be stored in respective one-quarter size subframe stores (at the operations labeled "¼ Size 9b LL/HL/LH.HH subband subframe store") and partitioned into MBs and blocks. The blocks of the LL subband may be coded by an AVC High 10 I/Intra encoder (at the operation labeled "AVC High 10 I/High 10 Intra/High 4:4:2 Intra Encode LL MBs/Blocks") and blocks of the HL, LH, and HH subband may be coded by AVC High 10* I/Intra encoder(s) (at the operations labeled "AVC High 10* I/High 10* Intra/High 4:4:2* Intra Encode HL/LH/HH MBs/Blocks"). The individual generated bitstreams from these AVC High 10 I/Intra or AVC High 10* I/Intra encoders may be combined with headers including a header that signals the wavelet filter set used for analysis and multiplexed (at the operation labeled "Encode headers, entropy encode wavelet coefficients data, and multiplex to generate AWMAVC Intra encoded bitstream") to generate a single AWMAVC coded bitstream (labeled "bitstream") for storage or transmission. The encoding method just described generates a scalable bitstream in which the LL subband bitstream can be decoded independently, or all four subbands can be decoded together.

Figure 17B:
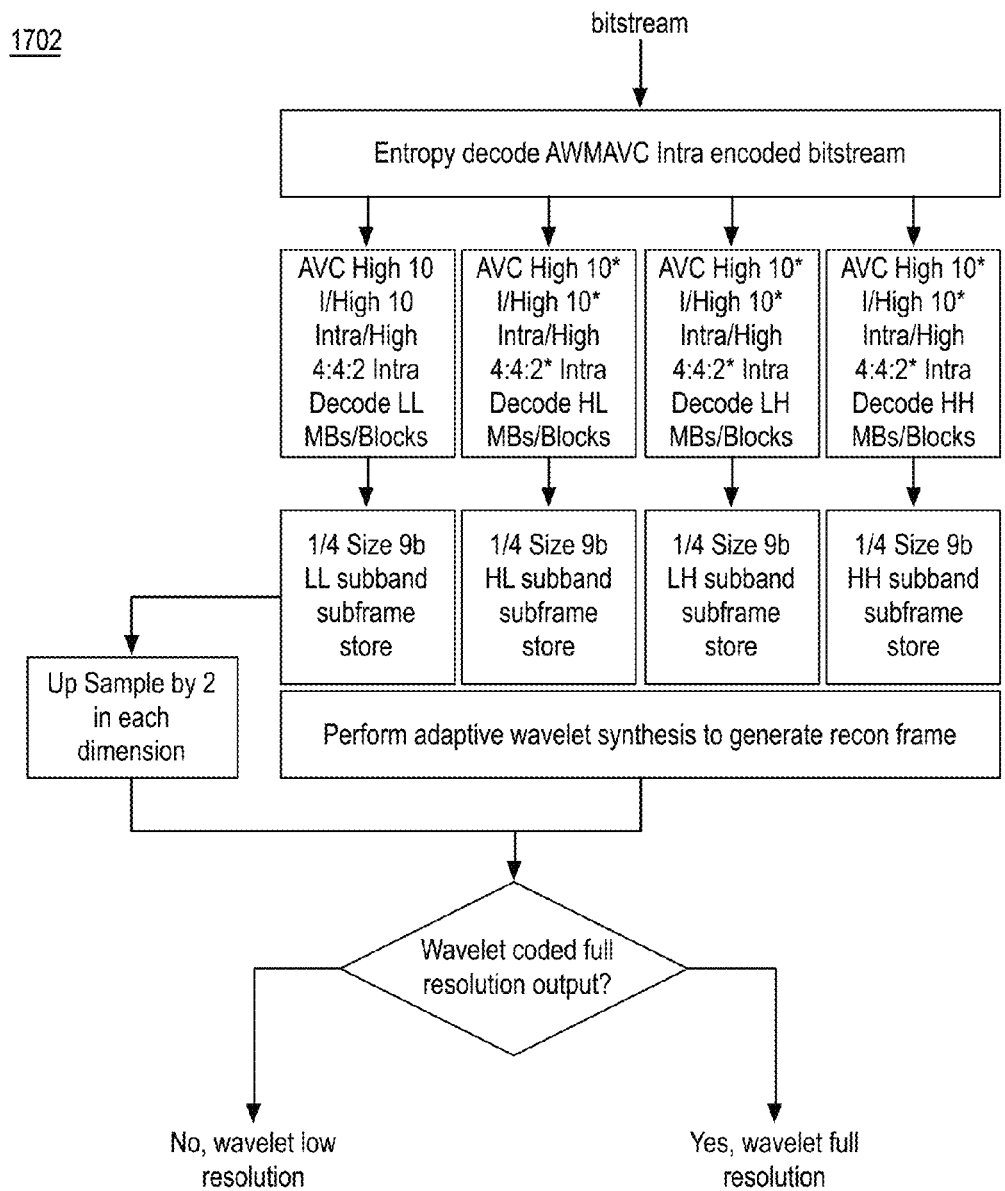
FIG. 17B illustrates an example process for AWMAVC Intra Decoding that inverts the process performed by AWMAVC Intra encoding.

FIG. 17B illustrates an example process 1702 for AWMAVC Intra Decoding that inverts the process performed by AWMAVC Intra encoding, arranged in accordance with at least some implementations of the present disclosure. As shown, an AWMAVC Intra bitstream (labeled "bitstream") may be received and bitstream headers may be decoded including decoding information on wavelet filter set that was used for analysis at the encoder and the remaining bitstream may be demultiplexed into each of individual LL, HL, LH, and HH bitstreams (at the operation labeled "Entropy decode AWMAVC Intra encoded bitstream"). If the user or system requests, based on an output selection or the like (as implemented by the decision operation labeled "Wavelet coded full resolution output?"), low resolution output, the LL subband may AVC High 10 I/Intra decoded (at the operation labeled "AVC High 10 I/High 10 Intra/High 4:4:2 Intra Decode LL MBs/Blocks"), bit depth limited, and optionally upsampled (at the operation labeled "Up Sample by 2 in each dimension") to generate a low resolution upsampled video/image frame that may be sent to output (labeled "No, wavelet low resolution"). If the user or system requires full resolution output, each of the remaining subbands may be decoded by AVC High 10* I/Intra decoders (at the operations labeled "AVC High 10* I/High 10* Intra/High 4:4:2* Intra Decode HL/LH/HH MBs/Blocks") and, including the LL decoded LL band, all four subbands may be stored in sub-frame stores (at the operations labeled "¼ Size 9b LL/HL/LH/HH subband subframe store"). Using the decoded header indicating a wavelet filters set to be used for wavelet analysis filtering, a matching wavelet synthesis filter set is determined. The decoded LL, HL, LH, and HH subbands from sub-frame stores may undergo frame synthesis (at the operation labeled "Perform adaptive wavelet synthesis to generate recon frame") using these filters to combine the decoded subbands resulting in a full reconstructed video/image frame that may be output to display (labeled "Yes, wavelet full resolution"). As discussed, such conditional decoding where either the low resolution output or full resolution output is decoded from the same bitstream depending on user or system requirement (e.g., decoding resource limitations, etc.) may be characterized as scalable decoding and may be possible due to scalable (also called embedded) encoding that can be performed due to wavelet coding. The type of scalability discussed with respect to FIGS. 17A and 17B may provide 2 layers: a quarter resolution layer and a full resolution layer.

FIG. 18A illustrates, for LL band 4×4 blocks of samples that are transformed to 4×4 blocks of transform coefficients, zigzag scanning direction 1801 for the transform coefficients, arranged in accordance with at least some implementations of the present disclosure. For example, the transform coefficients or quantized transform coefficients may be zigzag scanned using a direction of scanning as illustrated in FIG. 18A. For example, FIG. 18A illustrates scanning of wavelet LL band 4×4 block transform coefficients in AWMAVC Intra coding. As shown, for the LL band, a zigzag scan may be used with the scan starting from a bottom-right corner and moving to next higher frequency horizontally, and then diagonally upwardly to the same frequency vertically, and then moving up to a next higher frequency vertically, moving diagonally upward, scanning intermediate coefficients, on to the same frequency horizontally, and so on, until it reaches the highest frequency coefficient at a top-left corner of the block. Inverse scanning may generate transform coefficients or quantized transform coefficients from a decoded bitstream by providing coefficients in an opposite manner (e.g., from a top-left corner of the block to a bottom-right corner).

FIG. 18B illustrates, for HL band 4×4 blocks of samples that are transformed to 4×4 blocks of transform coefficients, zigzag scanning direction 1802 for the transform coefficients, arranged in accordance with at least some implementations of the present disclosure. For example, 18B may provide a modified scanning of wavelet HL band 4×4 block transform coefficients or quantized transform coefficients in AWMAVC Intra coding. As shown, for the HL band, a zigzag can may be used with the scan starting from a top-right corner and moving in a zigzag pattern to a bottom-left corner of the block. Inverse scanning may generate transform coefficients or quantized transform coefficients from a decoded bitstream by providing coefficients in an opposite manner (e.g., from a bottom-left corner of the block to a top-right corner).

Figure 18C:
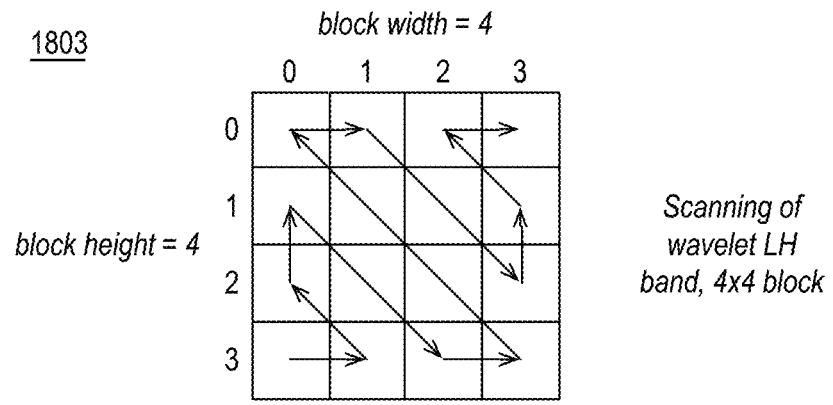
FIG. 18C illustrates, for LH band 4×4 blocks of samples that are transformed to 4×4 blocks of transform coefficients, zigzag scanning direction for the transform coefficients.

FIG. 18C illustrates, for LH band 4×4 blocks of samples that are transformed to 4×4 blocks of transform coefficients, zigzag scanning direction 1803 for the transform coefficients, arranged in accordance with at least some implementations of the present disclosure. For example, 18C may provide a modified scanning of wavelet LH band 4×4 block transform coefficients or quantized transform coefficients in AWMAVC Intra coding. As shown, for the LH band, a zigzag can may be used with the scan starting from a bottom-left corner and moving in a zigzag pattern to a top-right corner of the block. Inverse scanning may generate transform coefficients or quantized transform coefficients from a decoded bitstream by providing coefficients in an opposite manner (e.g., from a top-right corner of the block to a bottom-left corner).

Figure 18D:
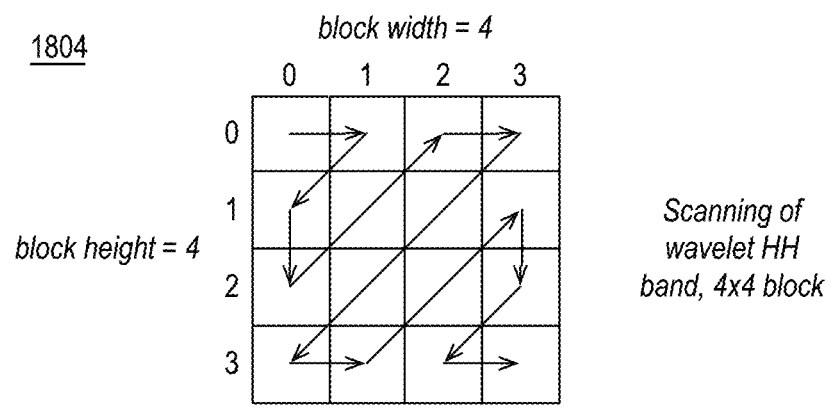
FIG. 18D illustrates, for HH band 4×4 blocks of samples that are transformed to 4×4 blocks of transform coefficients, zigzag scanning direction for the transform coefficients.

FIG. 18D illustrates, for HH band 4×4 blocks of samples that are transformed to 4×4 blocks of transform coefficients, zigzag scanning direction 1804 for the transform coefficients, arranged in accordance with at least some implementations of the present disclosure. For example, 18D may provide a modified scanning of wavelet HH band 4×4 block transform coefficients or quantized transform coefficients in AWMAVC Intra coding. As shown, for the HH band, a zigzag can may be used with the scan starting from a top-left corner and moving in a zigzag pattern to a bottom-right corner of the block. Inverse scanning may generate transform coefficients or quantized transform coefficients from a decoded bitstream by providing coefficients in an opposite manner (e.g., from a bottom-right corner of the block to a top-left corner).

Figure 14B:
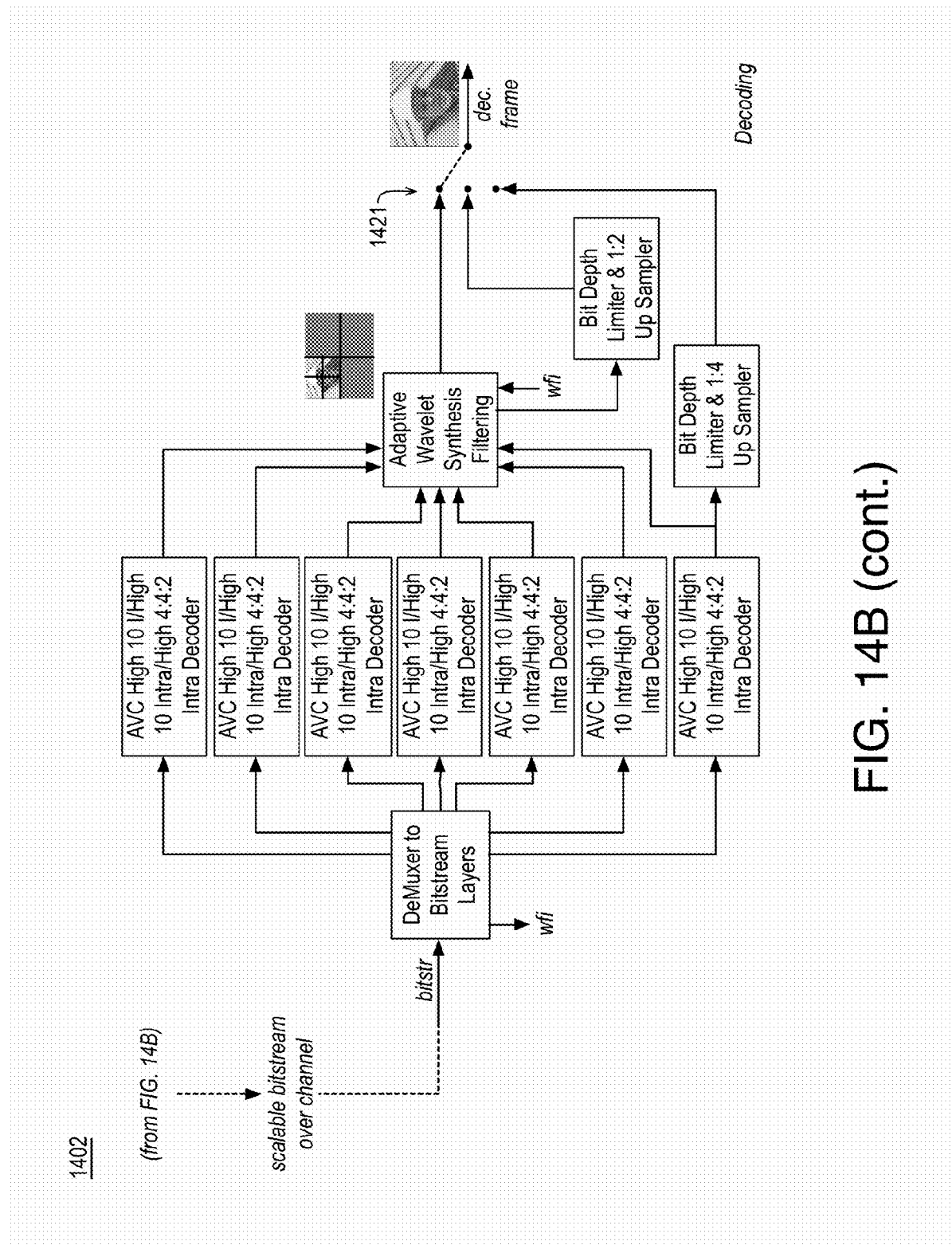
Figure 19:
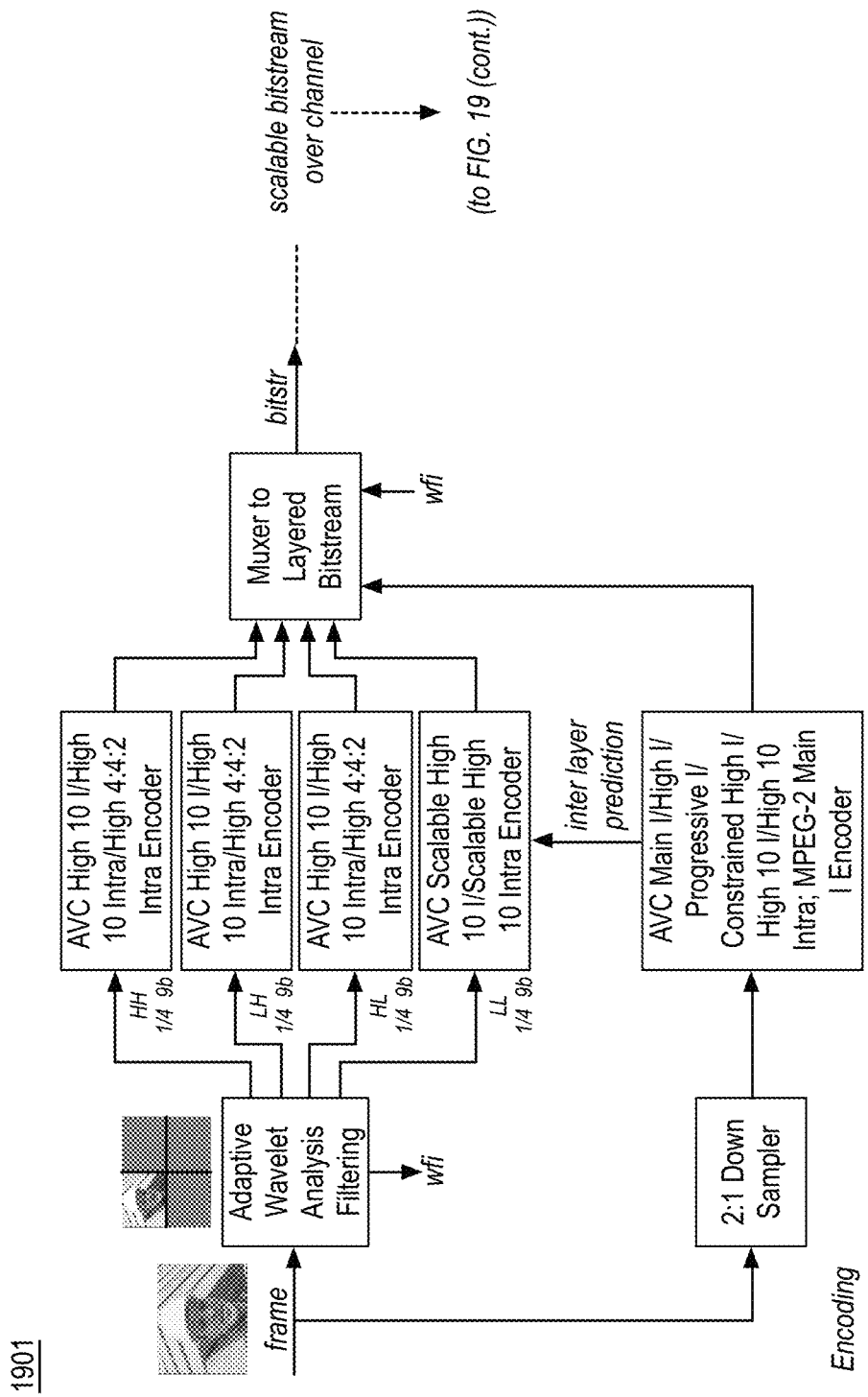
FIG. 19 is a block diagram of an example coder.
Figure 19:
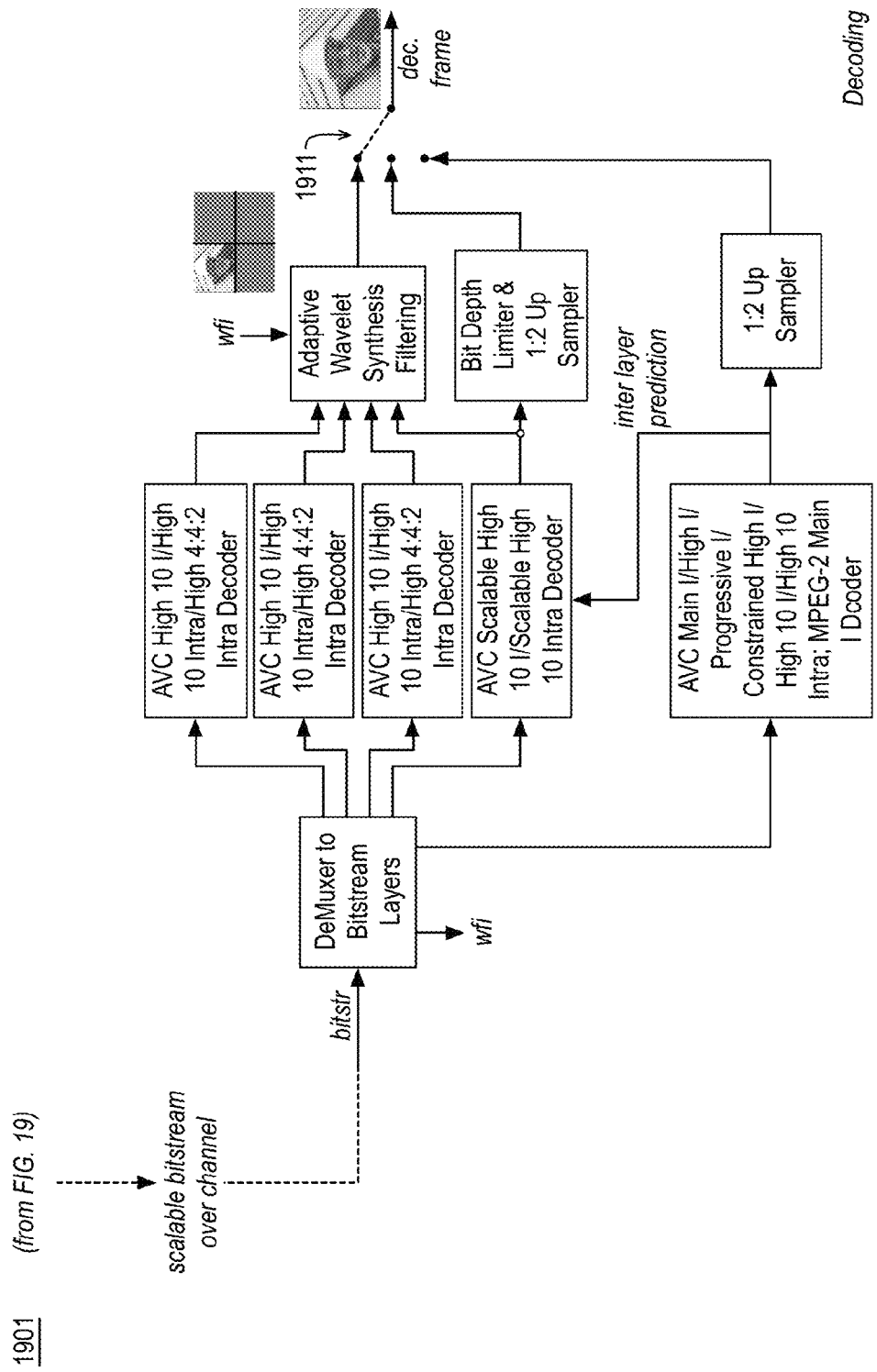

As discussed with respect to FIGS. 8, 14 and 16, wavelet based scalability may be provided in conjunction with AVC High 10 I/Intra coding. In other examples, wavelet based scalability may be combined with traditional spatial scalability. FIG. 19 illustrates an example system that combines spatial scalability and wavelet based scalability.

FIG. 19 is a block diagram of an example coder 1901, arranged in accordance with at least some implementations of the present disclosure. For example, FIG. 19 may provide an Adaptive Wavelet Scalable AVC (AWSVC) Intra Encoder/Decoder providing SNR scalable coding by combining adaptive wavelet filtering, down/up sampling and AVC High 10 Intra coding. From a single scalable bitstream, 3 versions, 2 of same resolution but different quality, and one of highest resolution can be decoded As shown, at an encoding side, an input video frame (frame) may be filtered and downsampled by a factor of 2 in each dimension by a "2:1 Down Sampler". Since the down sampled image is a normal 8-bit bit-depth pixel-domain signal, it can be encoded by an AVC Main I, AVC High I, AVC Constrained High, AVC High 10 I, AVC High 10 Intra, a non AVC encoder such as an MPEG-2 Main I encoder (e.g., at "AVC Main I/High I/Progressive I/Constrained High I/High 10 I/High 10 Intra; MPEG-2 Main I Encoder"). Also, as shown, the same input video/image frame may undergo decomposition at an "Adaptive Wavelet Analysis Filtering" module (e.g., with a filter set depending on application, resolution or user requirements) that may decompose the frame into LL, HL, LH and HH subbands. As shown, the local decoded video/image frame from the "AVC Main I/High I/Progressive I/Constrained High I/High 10 I/High 10 Intra; MPEG-2 Main I Encoder" may be used for "inter band" prediction (labeled as "inter layer prediction") and coding of the LL band. For coding of LL subband, an "AVC Scalable High 10 I/Intra Encoder" (e.g., similar to an AVC Scalable High I/Intra encoder used in Scalable Video Coding (SVC) other than that it supports 10 bit bit-depth input to handle LL-band which is a 9-bit bit-depth signal. This type of spatial/SNR scalability structure may allow the LL band intra coding to use locally adaptive prediction not only from the LL band but also from base layer that is not wavelet encoded (this may require bit shifting to extend base layer to 9 bit signal before using it for prediction). In the illustrated example, the Base layer uses the same resolution as the wavelet LL band subband so the base layer decoded video/image frame does not need to be upsampled prior to prediction of the LL band. Such scalability may be characterized as SNR scalability as the two layers (base layer and LL band layer) are at the same resolution.

As shown, coding of the remaining 3 (HL, LH and HH) subbands may be provided as discussed herein (e.g., coder 1901 may use AVC High 10 I/Intra encoder(s) shown as "AVC High 10 I/High 10 Intra/High 4:4:2 Intra Encoder" or modified AVC encoders such as the "AVC High 10* I/High 10* Intra/High 4:4:2* Intra Encoder" discussed with respect to FIG. 16). the resulting base layer bitstream and 4 subband bitstreams may be multiplexed along with headers into a single bitstream (bitstr). The headers may indicate which filter set was used for adaptive wavelet analysis filtering and that the LL band is SNR scalability encoded with respect to an external (non subband decomposed) base layer.

The decoding side may perform the reverse process by receiving a bitstream (bitstr), demultiplexing the multiplexed base layer bitstream and subband bitstreams by the "DeMuxer to Bitstream Layers" and decoding the necessary headers to determine the scalability used and create decoding structures necessary for successfully decoding the scalable streams. That may be selected based on an output selection and implemented via switch 1911, there may be three choices available for decoding: decoding a standalone coded base layer stream by a "AVC Main I/High I/Progressive I/Constrained High I/High 10 I/High 10 Intra; MPEG-2 Main I Decoder" at $\frac{1}{4}^{th}$ resolution that may result in lower quality decoded video/image frame than the LL band, a $\frac{1}{4}^{th}$ resolution LL band stream decoding by a "AVC Scalable High 10 I/Scalable High 10 Intra Decoder", which may provide $\frac{1}{4}^{th}$ resolution video/image frame but at higher quality, and the output of an "Adaptive Wavelet Synthesis Filtering" module that may combine 4 subbands as decoded by the "AVC Scalable High 10 I/Scalable High 10 Intra Decoder" (LL subband) and "AVC High 10 I/High 10 Intra/High 4:4:2 Intra Decoder" (LH, HL, HH subbands) resulting in full resolution/quality decoded video/image frame; the actual decoding method chosen depends on user requirements.

For example, if standalone base-layer resolution/quality (e.g., low resolution) is sufficient for the user or system, that stream may be decoded by using a matching (depending on encoder used on encoding side) decoder such as AVC Main I or AVC High I or AVC Constrained High or AVC High 10 I or AVC High 10 Intra or MPEG-2 Main I decoder. The decoded video/image frame may be upsampled by 2 in each dimension at a "1:2 Up Sampler" for display. If medium quality LL band output is desired, not only the base layer needs to be decoded (as just described) but also the LL band needs to be decoded by an AVC Scalable High 10 I/Intra decoder that uses decoded base layer video/image frame for SNR scalable prediction. If the user requires full resolution/quality decoded video/image frame, in addition to the process just described for decoding LL subband, the 3 remaining wavelet subbands such as HL, LH and HH subbands need to be decoded by using AVC High 10 I/Intra decoder(s). All four decoded subbands may then be input to the "Adaptive Wavelet Synthesis Filtering" module that performs synthesis filtering using the filter set information decoded from header in the bitstream. The output of this process is a decoded full resolution/quality video/image frame.

While in the system of FIG. 19, the base layer and LL band have the same (¼ size) resolution, the base layer could have been encoded at lower spatial resolution such as ¹⁄₁₆ resolution by using 4:1 instead of 2:1 downsampling filter. In such an example, the LL-subband would use spatial scalability.

Figure 20A:
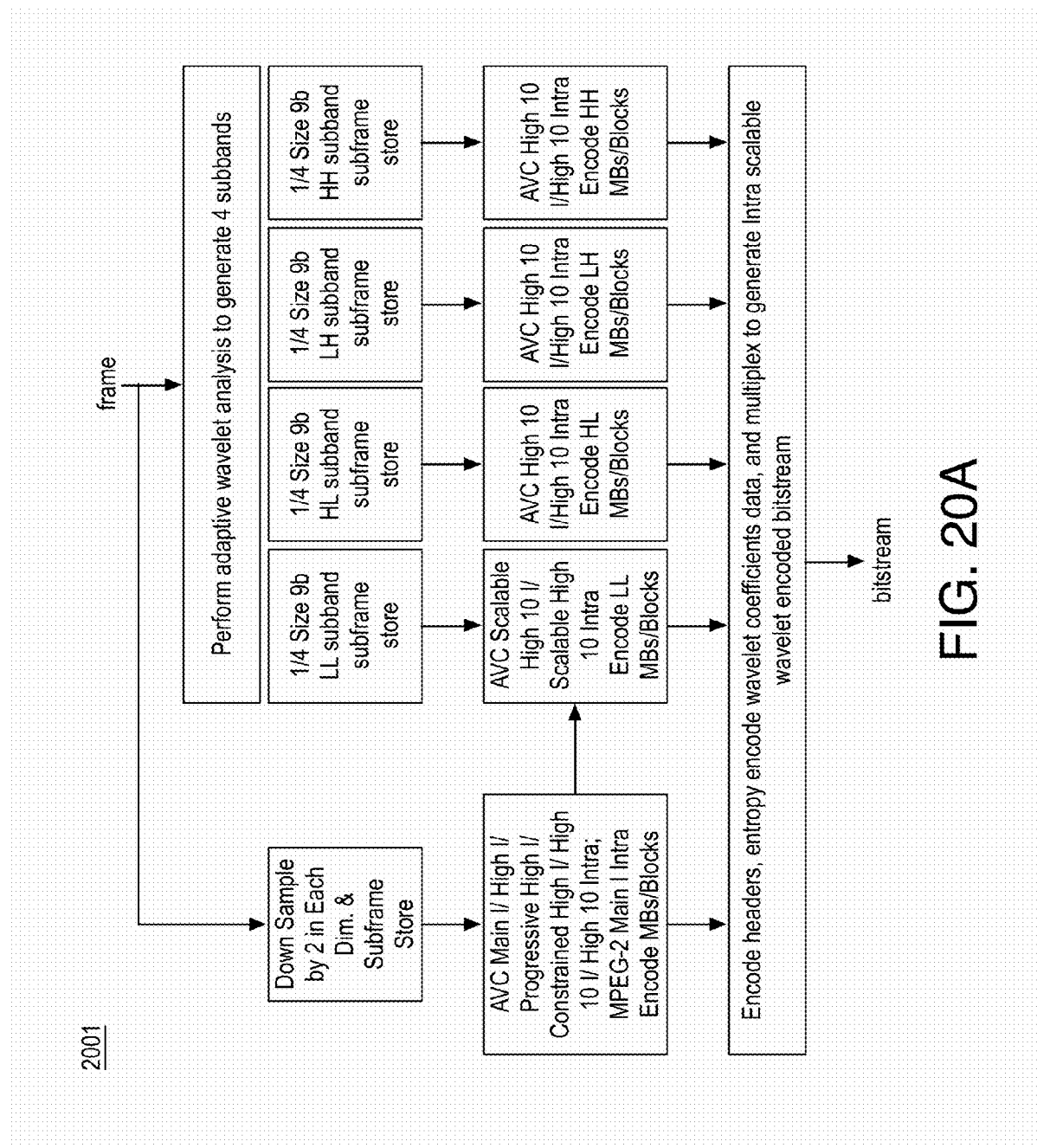
FIG. 20A illustrates an example process for Adaptive Wavelet Scalable AVC (AWSVC) Intra Encoding.

FIG. 20A illustrates an example process 2001 for Adaptive Wavelet Scalable AVC (AWSVC) Intra Encoding, arranged in accordance with at least some implementations of the present disclosure. As shown, an input video/image frame (labeled as "frame") may be filtered and down-sampled by a factor of 2 in each dimension (at the operation labeled "Down Sample by 2 in Each Dim. & Subframe Store") resulting in a $\frac{1}{4}^{th}$ size image that may be stored (at the operation labeled "Down Sample by 2 in Each Dim. & Subframe Store") and encoded by an encoder such as AVC Main I or AVC High I or AVC Constrained High or AVC High 10 I or AVC High 10 Intra or MPEG-2 Main I encoder (at the operation labeled "AVC Main I/High I/Progressive High I/Constrained High I/High 10 I/High 10 Intra; MPEG-2 Main I Intra Encode MBs/Blocks"). The generated encoded stream may be characterized as a base-layer bitstream. Furthermore, the input video/image frame may also be adaptive wavelet analysis filtered using a filter set (e.g., depending on application, content, or user requirement) into LL, HL, LH and HH wavelet subbands (at the operation labeled "Perform adaptive wavelet analysis to generate 4 subbands"). The 4 subbands may be stored in corresponding frame stores (at the operations labeled "¼ Size 9b LL/HL/LH/HH subband subframe store") that can store ¼$^{th}$ size 9-bit bit depth subframes that may be encoded. The LL band may undergo AVC scalable high 10 I/intra encoding (at the operation labeled "AVC Scalable High 10 I/Scalable High 10 Intra Encode LL MBs/Blocks") that may use SNR scalability encoding with respect to locally decoded base-layer video/image frame. The remaining subbands may undergo AVC high 10 I/intra encoding (at the operations labeled "AVC High 10 I/High 10 Intra Encode HL/LH/HH MBs/Blocks") or modified encoding as discussed herein. All five encoded streams may be multiplexed with several encoded headers that carry information such as which wavelet filter set used for analysis and the type of scalability used for coding the LL band with respect to non-wavelet encoded base layer (at the operation labeled "Encode headers, entropy encode wavelet coefficients data, and multiplex to generate Intra scalable wavelet encoded bitstream") to generate a bitstream.

Figure 20B:
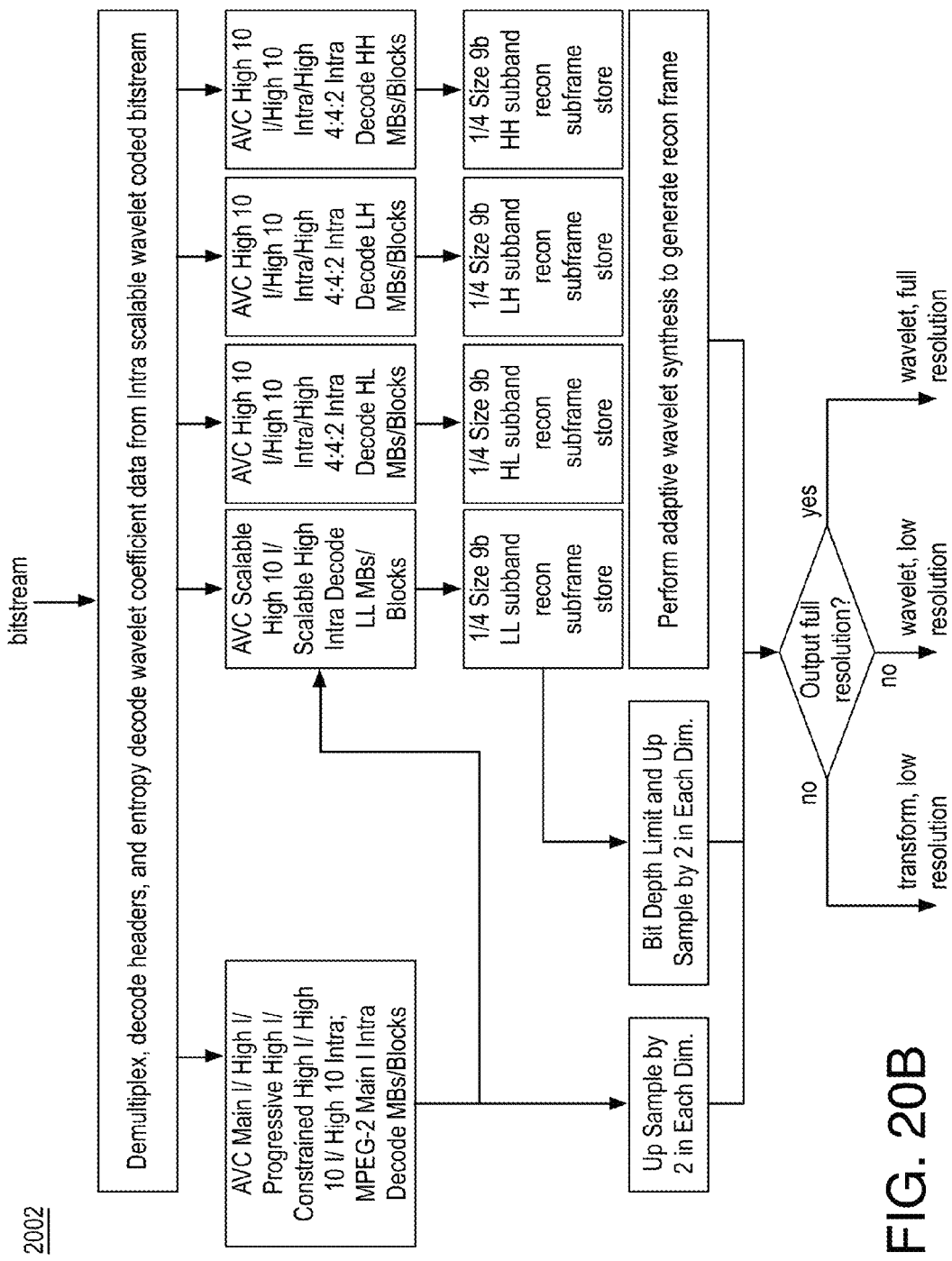
FIG. 20B illustrates an example process for Adaptive Wavelet Scalable AVC (AWSVC) Intra Decoding.

FIG. 20B illustrates an example process 2002 for Adaptive Wavelet Scalable AVC (AWSVC) Intra Decoding, arranged in accordance with at least some implementations of the present disclosure. As shown, a bitstream to be decoded may be demultiplexed into each of five different bitstreams and headers may be decoded (at the operation labeled "Demultiplex, decode headers, and entropy decode wavelet coefficient data from Intra scalable wavelet coded bitstream"). As discussed, headers may carry information on which wavelet filter set was chosen at encoder as well as which type of scalability is used so that the necessary decoding structure can be used. Of the five bitstreams demultiplexed, the first one is a base layer bitstream while the others are LL, HL, LH and HH subband bitstreams. Three types of decoding are possible (as shown by the decision operation labeled "Output full resolution?") such as decoding a standalone coded base layer bitstream at ¼$^{th}$ resolution (resulting in lower quality decoded video/image frame), decoding the ¼$^{th}$ resolution LL band bitstream that can provide ¼$^{th}$ resolution video/image frame but at higher quality, and decoding all 4 bands and then adaptive wavelet synthesis filtering resulting in full resolution/quality decoded video/image frame. For example, the selected decoding technique may depend on user or system requirements or the like.

If standalone base-layer resolution/quality is sufficient for the user or system, the base layer stream may be decoded using a matching (depending on encoder used on encoding side) decoding such as AVC Main I or AVC High I or AVC Constrained High or AVC High 10 I or AVC High 10 Intra or MPEG-2 Main I decoding (at the operation labeled "AVC Main I/High I/Progressive High I/Constrained High I/High 10 I/High 10 Intra; MPEG-2 Main I Intra Decode MBs/Blocks"). The decoded video/image frame may be upsampled by 2 in each dimension (at the operation labeled "Up Sample by 2 in Each Dim.") for display (labeled as "transform, low resolution"). If medium quality LL band output is desired, the base layer needs to be decoded (as just described) and the LL band needs to be decoded by an AVC Scalable High 10 I/Intra decoding that uses decoded base layer video/image frame for SNR scalable prediction (at the operation labeled "AVC Scalable High 10 I/Scalable High Intra Decode LL MBs/Blocks"). The decoded LL band may be bit depth limited and up sampled (at the operation labeled "Bit Depth Limit and Up Sample by 2 in Each Dim.") and the video/image frame may be provided (labeled as "wavelet, low resolution"). If the user or system requires a full resolution/quality decoded video/image frame, in addition to the process just described for decoding the LL subband, the 3 remaining wavelet subbands such as the HL, LH and HH subbands need to be decoded by using AVC High 10 I/Intra decoding (at the operations labeled "AVC High 10 I/High 10 Intra/High 4:4:2 Intra Decode HL/LH/HH MBs/Blocks"). All four decoded subbands may be stored (at the operations labeled "¼ Size 9b LL/LH/HL/HH subband recon subframe store") and input to Adaptive Wavelet Synthesis Filtering that performs synthesis filtering using the filter set information decoded from header in the bitstream (at the operation labeled "Perform adaptive wavelet synthesis to generate recon frame"). The output of this process is a full resolution/quality video/image frame (labeled as "wavelet, full resolution").

For example, at an encoding side, wavelet decomposition may be performed on an original image or frame to generate multiple subbands, the original image or frame may be downsampled to generate a downsampled image, the downsampled image may be encoded with an Advanced Video Coding (AVC) compliant encoder (or any other suitable encoder) to provide an inter layer prediction, at least one subband of the multiple subbands may be encoded (e.g., the LL subband) based on the inter layer prediction using an AVC compliant scalable encoder to generate a bitstream corresponding to the subband, remaining subbands of the multiple subbands may be encoded to generate one or more second bitstreams, and at least the bitstream corresponding to the subband and the second bitstreams may be multiplexed. to generate a scalable bitstream. For example, encoding the remaining subbands may include AVC compliant encoding and the scalable bitstream may be AVC compliant. In an embodiment, encoding the remaining subbands may include encoding the blocks of quantized transform coefficients of remaining subbands using a direction of scanning based on a type of the remaining subbands as discussed with respect to FIGS. 18A-18D. In an embodiment, downsampling comprises a downsampling by two in both a horizontal and a vertical dimension.

At a decoding side, a scalable bitstream may be demultiplexed to provide multiple bitstreams each corresponding to a subband of a plurality of wavelet subbands and a second bitstream corresponding to a downsampled image, the second bitstream may be decoded with an Advanced Video Coding (AVC) compliant decoder (or any suitable decoder) to generate the downsampled image, the downsampled image may be upsampled, a first bitstream of the multiple bitstreams may be decoded using an AVC compliant scalable decoder and based on inter layer prediction using the upsampled image to generate a first subband of the plurality of wavelet subbands, remaining bitstreams of the multiple bitstreams may be decoded to generate remaining subbands of the plurality of wavelet subbands, and an image or frame may be reconstructed based on the decoding. Furthermore, an output selection corresponding to the image or frame may be determined such that the output selection is at least one of low resolution, medium resolution, or full resolution and reconstructing the image or frame is responsive to the output selection. If the output selection is low resolution, the reconstructed the image or frame may be the downsampled image. If the output selection is medium resolution, the reconstructed image or frame may be the first subband. If the output selection is full resolution, reconstructing the image or frame may include performing wavelet recomposition on the first subband and the remaining subbands to generate the reconstructed image or frame at full resolution Discussion has focused on systems that combine wavelet filtering and AVC encoding resulting in many combinations such as fixed/adaptive wavelet filtering, completely AVC compatible/slightly modified AVC coding (to obtain maximum compression inefficiency), 2 layer/3 layer scalability, wavelet domain scalability only/combined spatial and wavelet domain scalability, and so on. Discussion now turns to a combination of wavelet filtering and High Efficiency Video Coding (HEVC) coding. For example, slightly modified HEVC coding (to provide maximum compression efficiency) may be provided.

Figure 21A:
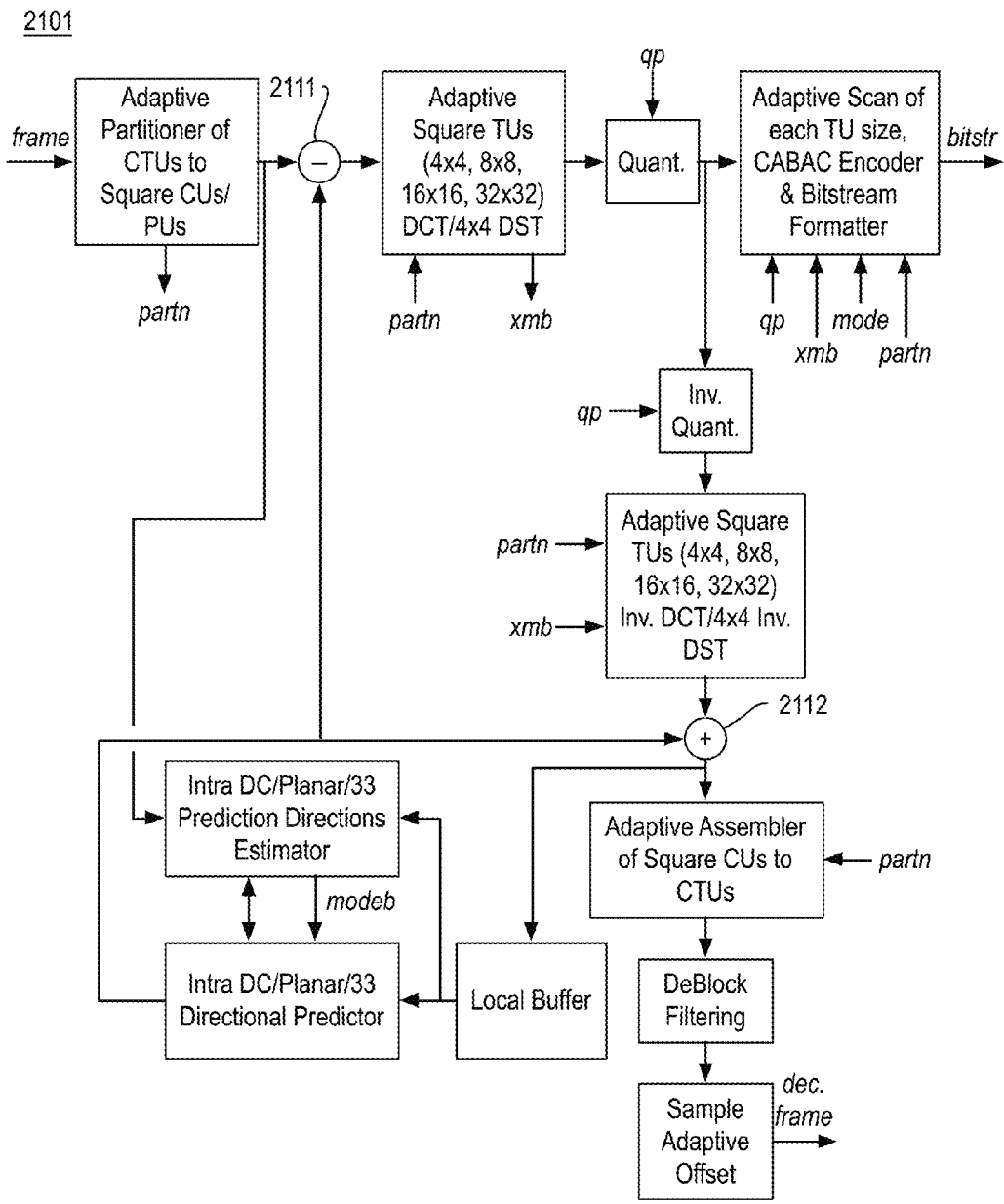
FIG. 21A illustrates an example HEVC Main 10 intra encoder.

FIG. 21A illustrates an example HEVC Main 10 intra encoder 2101, arranged in accordance with at least some implementations of the present disclosure. For example, FIG. 21A illustrates an example HEVC Main 10 Intra Encoder that may be used for transform encoding of blocks of pixels or transform encoding of blocks of original (or wavelet subbands). As shown, an input frame (frame) may be partitioned into large blocks referred to as largest coding unit (LCUs) or coding tree units (CTUs), typically of size 64×64 (although 32×32 and 16×16 are also allowed). For intra coding, LCUs may be adaptively partitioned by an "Adaptive Partitioner of CTUs to Square CUs/PUs" into coding units (CUs) of various sizes such as 32×32, 16×16, and 8×8. This partitioning may be done based on content and bit rate analysis or rate distortion optimization (RDO), details of which are not shown. Furthermore, for intra coding, the CUs may be divided into square prediction units (PUs) down to 4×4 blocks by the "Adaptive Partitioner of CTUs to Square CUs/PUs". For a PU of an input video/ image frame, an intra prediction block of the same size may be generated by an "Intra DC/Planar/33 Directional Predictor". A block can be predicted by 35 different candidate predictions (DC, planar, and 33 directions) that may be generated from neighboring decoded blocks as determined by an "Intra DC/Planar/33 Prediction Directions Estimator". A prediction error block may be generated at the output of a differencer 2111 and the prediction error block may be transform coded by a "Adaptive Square TUs (4×4, 8×8, 16×16, 32×32) DCT/4×4 DST" module. For intra coding, transform blocks of 32×32, 16×16, 8×8, and 4×4 may be supported with PU size inherited for transform coding. Furthermore, all DCT approximation transforms may be available for all TU block sizes; however, for 4×4 block size a DST approximation transform may also be available. Transform coefficient blocks generated by the forward transform may be quantized by a "Quantizer" and quantized coefficients may be scanned and entropy coded with a CABAC entropy encoder by an "Adaptive Scan of each TU size, CABAC Encoder & Bitstream Formatter." Different types of overhead data and control signals such as partn, mode, xmb, and qp may also be entropy encoded by the "Adaptive Scan of each TU size, CABAC Encoder & Bitstream Formatter". The HEVC Intra encoder also includes a feedback or decode loop that may dequantize quantized transform coefficients by an "Inverse Quantizer", followed by inverse transform of the same size and transform type used for forward transform by an "Adaptive Square TUs (4×4, 8×8, 16×16, 32×32) Inverse DCT/4×4 Inverse DST" module, followed by addition of decoded error blocks to prediction blocks at an adder 2112 resulting in reconstructed blocks. Neighboring reconstructed blocks needed for prediction of a block being encoded may be stored in a "Local Buffer" and used to form the aforementioned 35 candidate predictions. The reconstructed blocks may also be assembled by an "Adaptive Assembler of Square CUs to CTUs" into CUs and CTUs to assemble the locally decoded frame that may be deblock filtered at a "DeBlock Filtering" module and Sample Adaptive Offset (SAO) filtered at a "Sample Adaptive Offset" module and optionally output (dec. frame).

Figure 21B:
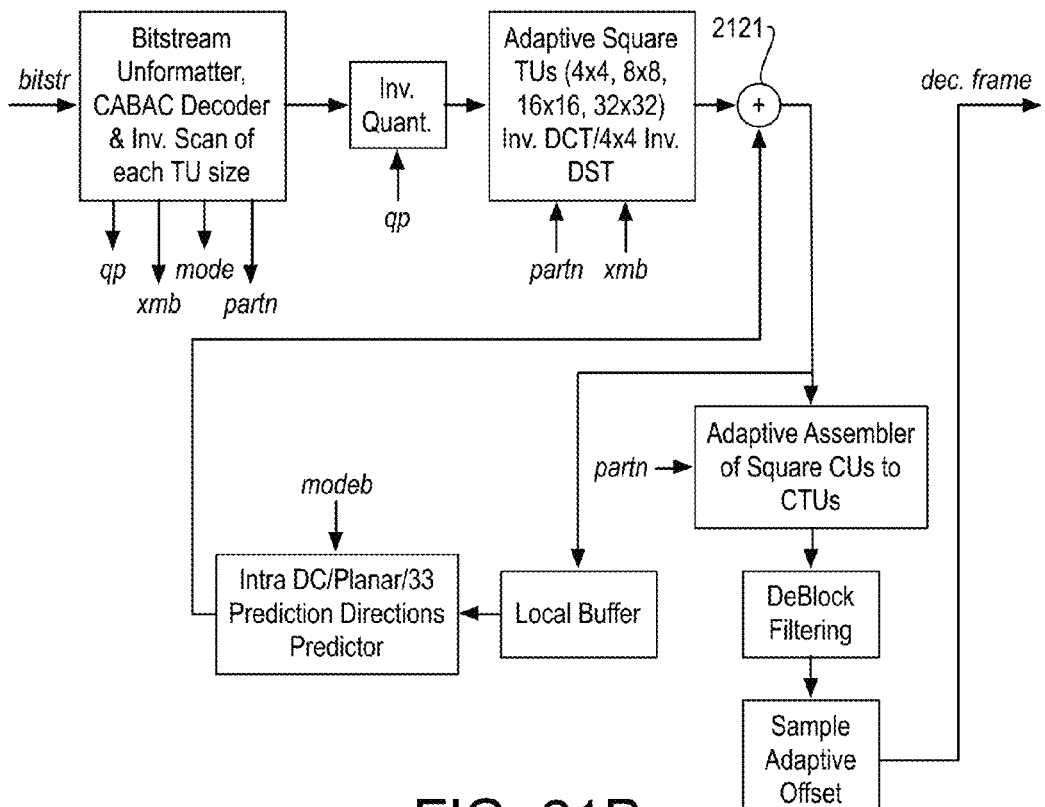
FIG. 21B is a block diagram of an example HEVC Main 10 intra decoder.

FIG. 21B is a block diagram of an example HEVC Main 10 intra decoder 2102, arranged in accordance with at least some implementations of the present disclosure. For example, FIG. 21B illustrates an example HEVC Main 10 Intra Decoder that may decode HEVC Main 10 Intra encoded streams. For example, the decoder may function identically to the local feedback loop of the HEVC Main 10 encoder discussed with respect to FIG. 21A. As shown, an HEVC Main 10 encoded bitstream ( ) may be input to a "Bitstream Formatter, CABAC Decoder & Adaptive Inverse Scan of each TU size" module that may extracts and decode overhead data and control signals (that are then made available to different processing blocks as shown) and also may decode and scan quantized transform coefficients. The transform coefficients may be inverse quantized by an "Inverse Quantizer" and then inverse transformed using the transform and block size used by the encoder by an "Adaptive Square TUs (4×4, 8×8, 16×16, 32×32) Inverse DCT/4×4 Inverse DST" module resulting in decoded prediction error blocks that form one input to an adder 2121. At the other input to adder 2121 is the prediction or prediction block which may be generated in up to 35 different ways such as dc, planar, or based on any of 33 directions by an "Intra DC/Planar/33 Prediction Directions Predictor". For example, for every block being predicted, modeb information in the bitstream may identify which of 35 possible predictions needs to be generated. The reconstructed frame blocks/CUs generated at the output of adder 2121 may be stored in a "Local Buffer" and the reconstructed neighboring blocks (to the block being decoded) may be used to generate prediction. The reconstructed frame blocks/CUs may also be input to an "Adaptive Assembler of Square CUs to CTUs" that may assemble reconstructed blocks/CUs to generate CTUs and thus the full reconstructed frame. The reconstructed frame may be deblock filtered by a "Deblock Filtering" module and sample adaptive offset filtered by a "Sample Adaptive Offset" module and output for presentation (dec. frame).

Figure 22A:
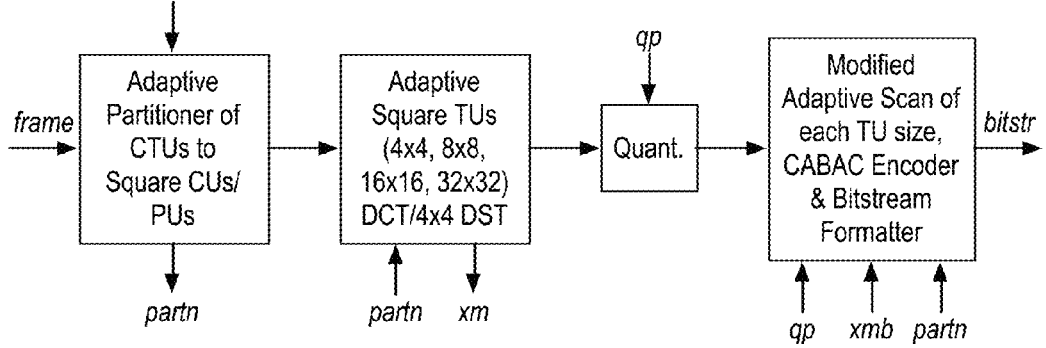
FIG. 22A illustrates an example HEVC Main 10* Intra encoder that may provide an HEVC Main 10 Intra Encoder without intra prediction.

FIG. 22A illustrates an example HEVC Main 10* Intra encoder 2201 that may provide an HEVC Main 10 Intra Encoder without intra prediction, arranged in accordance with at least some implementations of the present disclosure. For example, HEVC Main 10* Intra encoder 2201 may disable Intra prediction, modify a starting position and direction of scanning within coefficient blocks depending on the band, modify a number of scans depending on the band and block size. For example, the HEVC Main 10* Intra Encoder of FIG. 22A may provide an HEVC Main 10 Intra Encoder with removed intra prediction but including selection of transform type and adaptive scanning location/ direction depending on the subband (such as LL, HL, LH or HH). As shown, a video/image frame to be encoded (frame) may be input to an "Adaptive Partitioner of CTUs to Square CUs/PUs" which may partition a frame into equal size CTUs (e.g., of size 64×64) and, depending on RDO or via content and bitrate analysis, adaptively partition each CTU into square CUs (e.g., with intra sizes of 64×64, 32×32, 16×16, 8×8) and further into PUs (e.g., with intra sizes of 32×32, 16×16, 8×8, 4×4). Since for intra coding PUs and TUs may be of the same size, forward transform of the same size as the PU size may be performed at an "Adaptive Square TUs (4×4, 8×8, 16×16, 32×32) DCT/4×4 DST" module and resulting transform coefficient blocks may be quantized at a "Quantizer". The quantized transform coefficient blocks may be adaptively scanned using scans in HEVC but with which scan/s (horizontal, diagonal, vertical) to use for which subband, the coefficient in the block where a scan should start, and the direction of the scan being based on the subband being coded and the scanned coefficients maybe entropy encoded with a CABAC encoder and along with overhead data (such as partition, partn, transform, xm, and quantizer, qp) and selected wavelet filter set header, and formatted into a bitstream by a "Modified Adaptive Scan of each TU size, CABAC Encoder & Bitstream Formatter" and output.

Figure 22B:
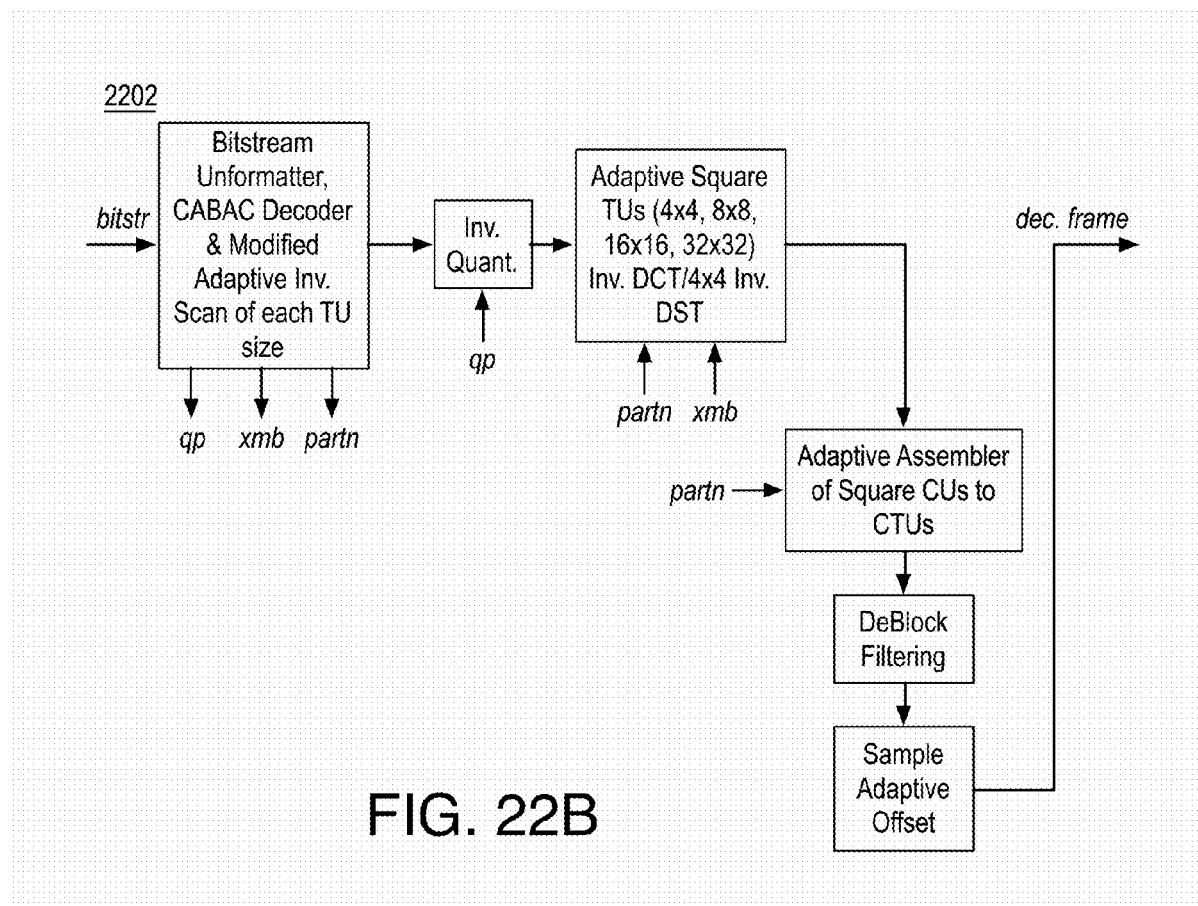
FIG. 22B illustrates an example HEVC Main 10* decoder 2202.

FIG. 22B illustrates an example HEVC Main 10* decoder 2202, arranged in accordance with at least some implementations of the present disclosure. For example, FIG. 22B illustrates an HEVC Main 10* Intra Decoder that can decode HEVC Main 10* encoded streams. As shown, an encoded bitstream (bitstr) from an HEVC Main 10* encoder may be input to a "Bitstream Unformatter, CABAC Decoder & Modified Adaptive Inverse Scan of each TU size" module which may decode overhead data (such as partition, partn, transform, xm, and quantizer, qp) and the selected wavelet filter set header, entropy decode transform coefficients, and perform inverse scanning of transform coefficients generating quantized transform coefficient blocks. The quantized transform coefficients may be inverse quantized by an "Inverse Quantizer" and, based on control overhead (e.g., partn, xmb) may be adaptively inverse transformed by an "Adaptive Square TUs (4×4, 8×8, 16×16, 32×32) Inv. DCT/4×4 Inv. DST" module to generate decoded blocks of pixels. The decoded blocks of pixels may be assembled into CTUs and thus into a full frame by an "Adaptive Assembler of Square CUs to CTUs" that may be optionally deblocked by a "Deblock Filtering" module and its edges (lost in coding) may be improved by a "Sample Adaptive Offset" module and provided for display (dec. frame).

Figure 22C:
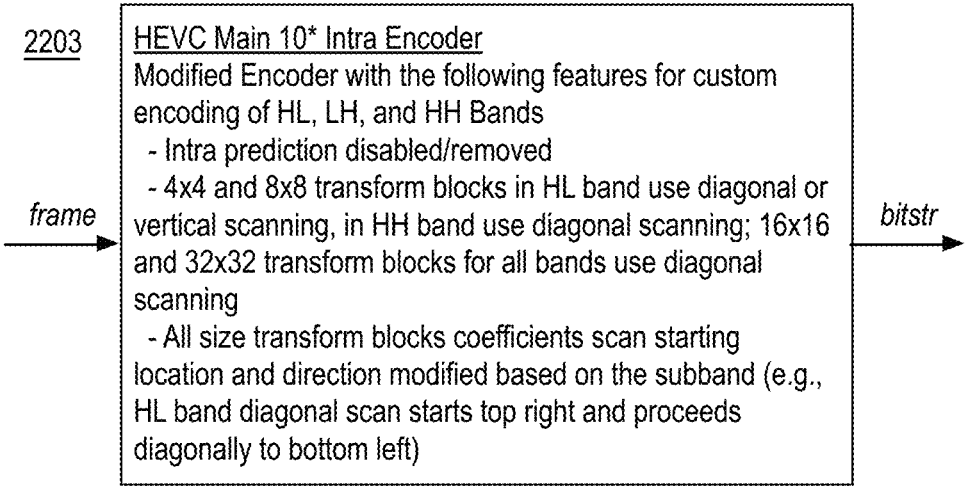
FIG. 22C illustrates a block diagram of example features of an HEVC Main 10* Intra encoder.

FIG. 22C illustrates a block diagram of example features 2203 of an HEVC Main 10* Intra encoder, arranged in accordance with at least some implementations of the present disclosure. For example, features 2203 may include no intra prediction, 4×4 and 8×8 blocks use diagonal and vertical scanning (no horizontal scanning) for HL band, use diagonal and horizontal (no vertical) scanning for LH band, and use diagonal only scanning (no vertical or horizontal scanning) for HH band, and scan starting location and direction depends on the band of the transform block is being scanned (details are provided herein with respect to FIGS. 26A-26L). As shown in FIG. 22C, an HEVC Main 10* Intra Encoder may be modified with the following features for custom encoding of HL, LH, and HH bands: Intra prediction may be disabled/removed, 4×4 and 8×8 transform blocks in HL band use diagonal or vertical scanning, in HH band use diagonal scanning; 16×16 and 32×32 transform blocks for all bands use diagonal scanning, and all e transform blocks coefficients scan starting location and direction modified based on the subband (e.g., HL band diagonal scan starts top right and proceeds diagonally to bottom left).

Figure 22D:
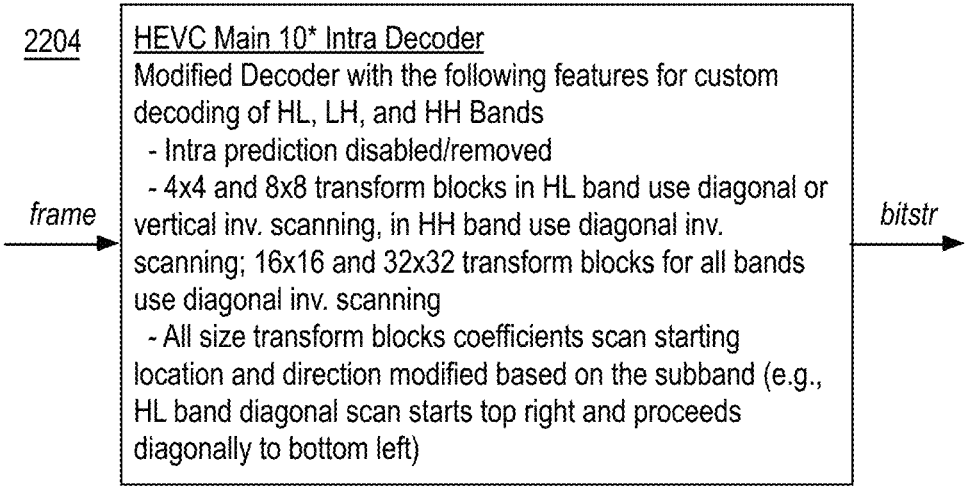
FIG. 22D illustrates a block diagram of example features of an HEVC Main 10* Intra decoder.

FIG. 22D illustrates a block diagram of example features 2204 of an HEVC Main 10* Intra decoder, arranged in accordance with at least some implementations of the present disclosure. For example, features 2204 may include no intra prediction, 4×4 and 8×8 block scans that depend on the band as supported by HEVC Main 10* Encoder, and for all transform blocks starting location and direction of scan to depend on the subband being coded. For example, an HEVC Main 10* Intra decoder may be a decoder that is capable of decoding bitstreams generated by HEVC Main 10* encoder. As shown in FIG. 22D, an HEVC Main 10* Intra Decoder may be modified with the following features for custom encoding of HL, LH, and HH bands: Intra prediction may be disabled/removed, 4×4 and 8×8 transform blocks in HL band use diagonal or vertical inverse scanning, in HH band use diagonal inverse scanning; 16×16 and 32×32 transform blocks for all bands use diagonal inverse scanning, and all size transform blocks coefficients scan starting location and direction modified based on the subband (e.g., HL band diagonal scan starts top right and proceeds diagonally to bottom left).

Figure 23:
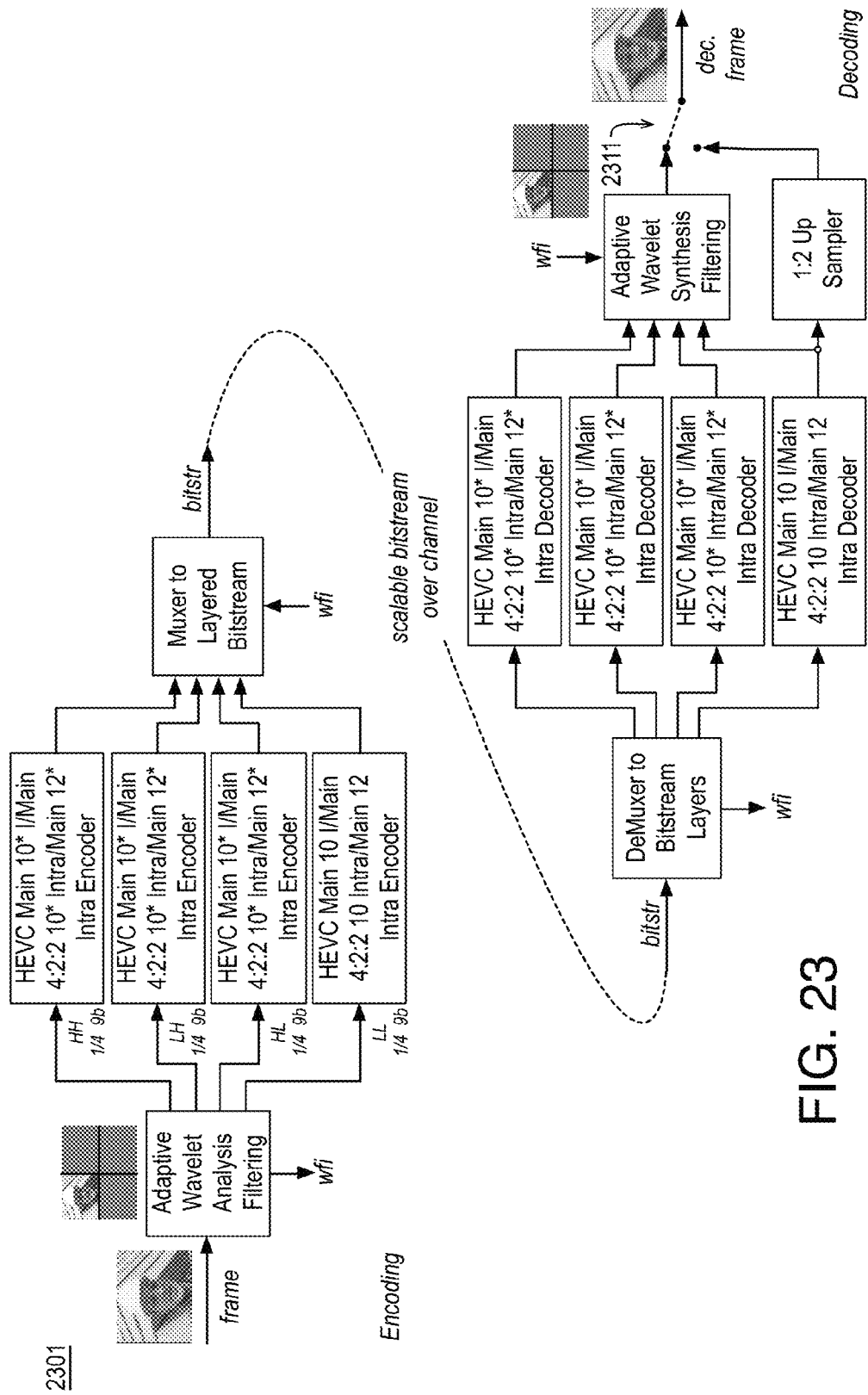
FIG. 23 is a block diagram of an Adaptive Wavelet Modified HEVC (AWMHVC) coder.

FIG. 23 is a block diagram of an Adaptive Wavelet Modified HEVC (AWMHVC) coder 2301, arranged in accordance with at least some implementations of the present disclosure. For example, FIG. 23 may provide an AWMHVC Intra Encoder/Decoder that uses adaptive wavelet analysis/synthesis filtering and HEVC Main 10/Main 10* I (or Main Still Picture/Main Still* Picture or Main 4:4:4 16 Intra/Main 4:4:4 16* Intra) picture Encoder/Decoder. From a single coded bitstream, 2 different decoded versions, one of lower and one of full resolution/higher quality can be extracted. As shown, at the encoding side, an input video (or image) YUV frame (frame) may undergo adaptive wavelet decomposition using a filter set from a codebook of filtersets with selection of filter based on application (e.g., resolution, content, and bitrate) by an "Adaptive Wavelet Analysis Filtering" module. Using the selected filter set, the process of analysis filtering may be performed for one level decomposition that may convert the frame into LL, HL, LH, and HH subbands, each of which are one-quarter in size and with bit depth of 9 bits (assuming 8 bit input video or image). The LL subband may be encoded by an HEVC Main 10 I/Intra encoder (e.g., HEVC Main 10 I/Main 4:2:2 10 Intra/Main 12 Intra Encoder) and the HL, LH, and HH subbands may be encoded with individual customized HEVC Main 10* I/Intra encoders (e.g., "HEVC Main 10* I/Main 4:2:2 10* Intra/Main 12* Intra Encoder"). The outcome of the encoding process may include four individual bitstreams such as an LL bitstream, an HL bitstream, an LH bitstream, and an HH bitstream that may be multiplexed by a "Muxer to Layered Bitstream" into a single scalable bitstream (bitstr) along with headers including that which carries index of selected wavelet filter set (wfi).

Also shown in FIG. 23, at the decoding side, a bitstream (bitstr) may be received, from which from the headers among other data, an index of a selected wavelet filter set is decoded and the bitstream may demultiplexed into individual LL, HL, LH, and HH bitstreams by a "DeMuxer to Bitstream Layers". The demultiplexed LL bitstream may be provided to HEVC Main 10 I/Intra decoder (e.g., "HEVC Main 10 I/Main 4:2:2 10 Intra/Main 12 Intra Decoder"), and depending on an output selection as implemented by a switch 2311, its low resolution decoded video (or image) frame after optional upsampling by 2 in each dimension by a "1:2 Up Sampler" may be provided display (dec. frame). However, if the user or system or the like requests a full resolution video (or image) frame, the remaining 3 (HL, LH and HH) bands may be provided to corresponding custom HEVC Main 10* I/Intra decoders (e.g., "HEVC Main 10* I/Main 4:2:2 10* Intra/Main 12* Intra Decoder"), and all four, quarter size decoded subbands may be combined using a matching filter set (indicated by the index decoded from the bitstream). The process of combination of bands also known as synthesis filtering may be performed by an "Adaptive Wavelet Synthesis Filtering" module and may result in a full resolution/size final reconstructed video (or image) frame for display (dec. frame).

Figure 24A:
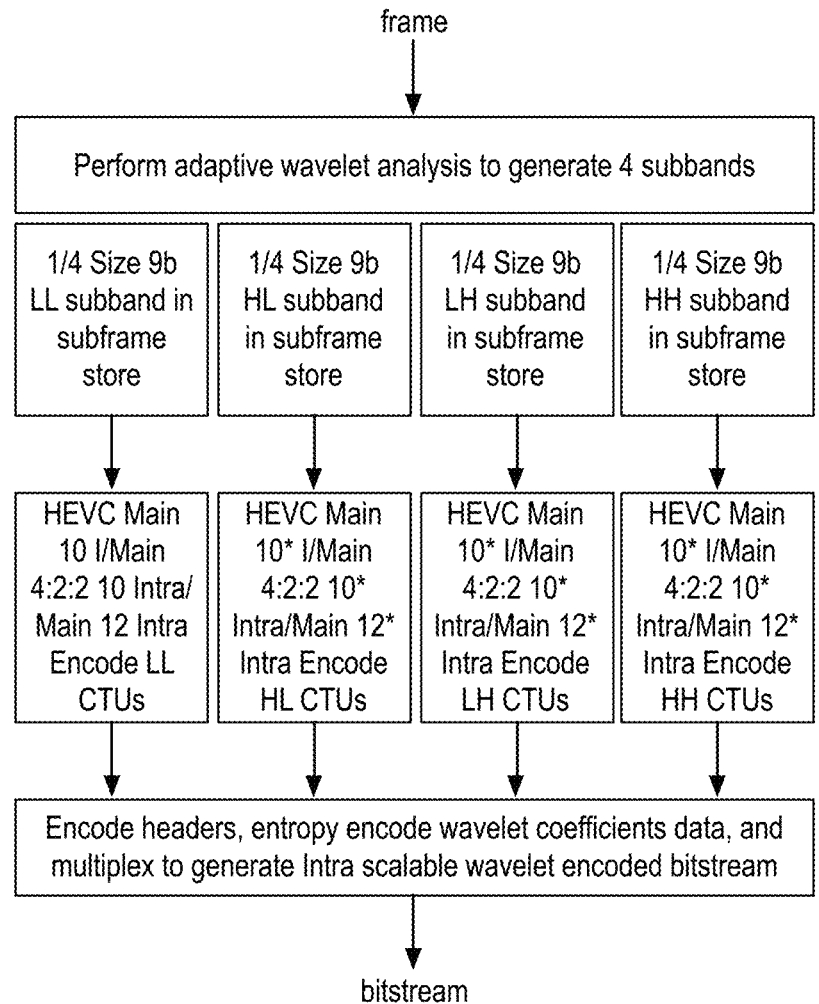
FIG. 24A illustrates an example process of AWMHVC Intra Encoding.

FIG. 24A illustrates an example process 2401 of AWM-HVC Intra Encoding, arranged in accordance with at least some implementations of the present disclosure. As shown, an input video (or image) frame (labeled "frame") may undergo one-level adaptive wavelet analysis filtering that allows for choice of best suited filter set depending on the application (resolution, content and bitrate) parameters (at the operation labeled "Perform adaptive wavelet analysis to generate 4 subbands"). The analysis filtering process results in four subbands with each subband being $1/4^{th}$ in size of input frame and consisting of subband coefficients (also referred to as subband pixels or samples) that are of 9 bit in accuracy when pixels of input frame are of 8 bit accuracy. Each of the generated subbands may be stored in respective one-quarter size subframe stores (at the operations labeled "1/4 Size 9b LL/HL/LH/HH subband in subframe store") and partitioned into LCUs and CUs/blocks. Blocks of the LL subband may be coded by an HEVC Main 10 I/Intra encoder (at the operation labeled "HEVC Main 10 I/Main 4:2:2 10 Intra/Main 12 Intra Encode LL CTUs") and blocks of the HL, LH, and HH subband may be coded by HEVC Main 10* I/Intra encoder(s) (at the operations labeled "HEVC Main 10* I/Main 4:2:2 10* Intra/Main 12* Intra Encode HL/LH/HH CTUs"). The individual generated bitstreams from these HEVC Main 10 I/Intra or HEVC Main 10* I/Intra encoders may be combined with headers including header that signals the wavelet filter set used for analysis and multiplexed (at the operation labeled "Encode headers, entropy encode wavelet coefficients data, and multiplex to generate Intra scalable wavelet encoded bitstream") to generate a single AWMHVC coded bitstream (labeled "bitstream") for storage or transmission. The encoding method just described generates a scalable bitstream in which the LL subband bitstream can be decoded independently, or all four subbands can be decoded together.

Figure 24B:
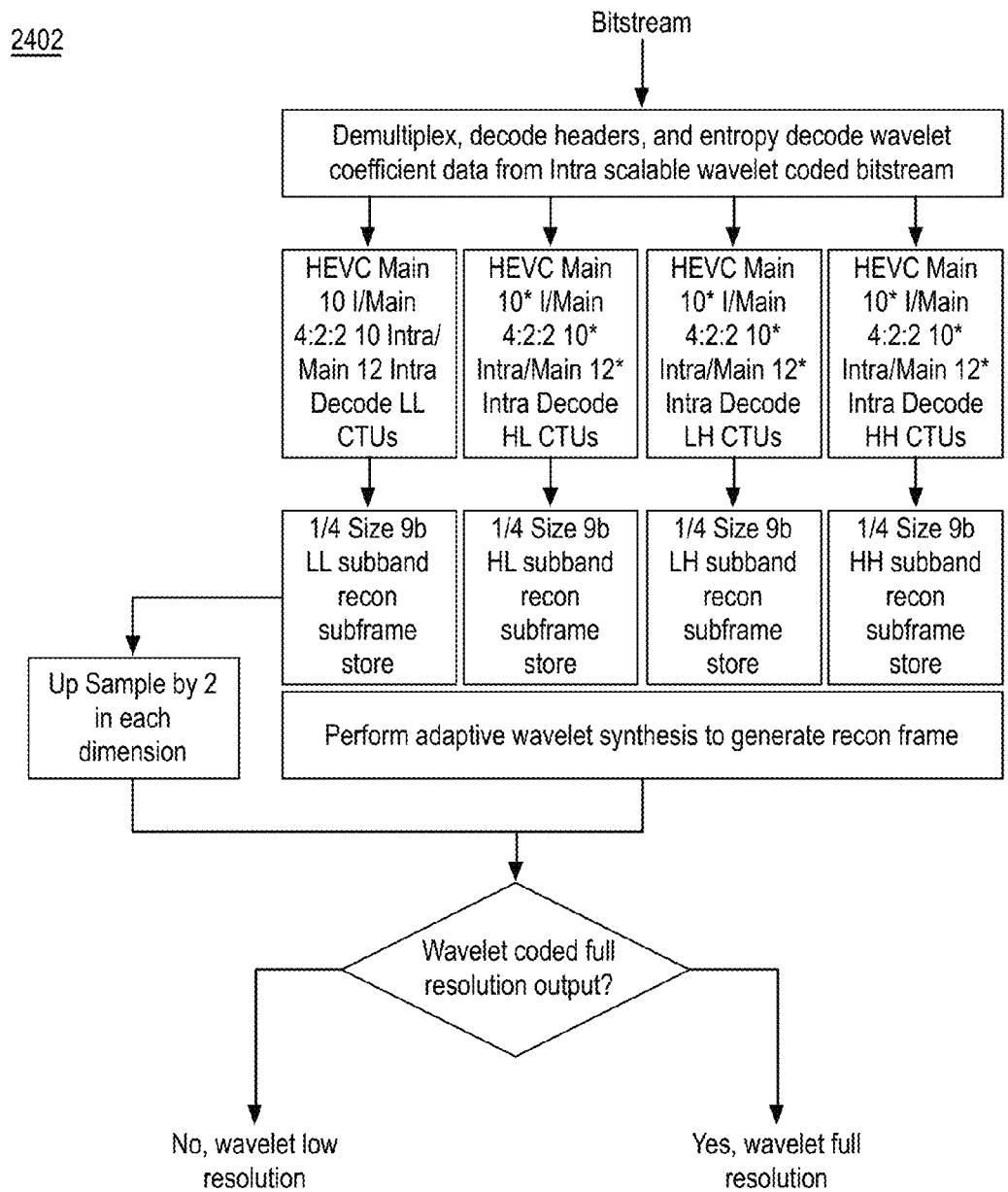
FIG. 24B illustrates an example process of AWMHVC Intra Decoding that inverts the process performed by AWMHVC Intra encoding.

FIG. 24B illustrates an example process 2402 of AWM-HVC Intra Decoding that inverts the process performed by AWMHVC Intra encoding, arranged in accordance with at least some implementations of the present disclosure. As shown an AWMHVC Intra bitstream (labeled "bitstream") may be received and the bitstream headers may be decoded including decoding information on wavelet filter set that was used for analysis at the encoder and the remaining bitstream may be demultiplexed into each of individual LL, HL, LH, and HH bitstreams (at the operation labeled "Demultiplex, decode headers, and entropy decode wavelet coefficient data from Intra scalable wavelet coded bitstream"). If the user or system requires just low resolution output (e.g., an output selection, as determined at the decision operation labeled "Wavelet coded full resolution output?"), the LL subband is HEVC Main 10 I/Intra decoded (at the operation labeled "HEVC Main 10 I/Main 4:2:2 10 Intra/Main 12 Intra Decode LL CTUs"), bit depth limited, and optionally upsampled (at the operation labeled "Up Sample by 2 in each dimension") to generate low resolution upsampled video/image frame (labeled "No, wavelet low resolution") that may be sent to output. If the output selection determined based on the user or system requirements selects full resolution output, each of the remaining subbands may be decoded by HEVC Main 10* I/Intra decoders (at the operations labeled "HEVC Main 10* I/Main 4:2:2 10* Intra/Main 12* Intra Decode HL/LH/HH CTUs") and, including decoded LL band, all four subbands may be stored in sub-frame stores (at the operations labeled "1/4 Size 9b LL/HL/LH.HH subband recon subframe store"). Using the decoded header about wavelet filters set used for wavelet analysis filtering, matching wavelet synthesis filter set may be determined. The decoded LL, HL, LH, and HH subbands from the sub-frame stores may undergo frame synthesis using these filters to combine the decoded subbands resulting in full reconstructed video/image frame (at the operation labeled "Perform adaptive wavelet synthesis to generate recon frame") that may be output to display (labeled "Yes, wavelet full resolution"). As discussed, such conditional decoding where either the low resolution output or full resolution output may be decoded from the same bitstream depending on user or system requirements (e.g., decoding resource limitations, etc.) may be characterized as scalable decoding and may be possible due to scalable (also called embedded) encoding that may be be performed due to wavelet coding. The scalability discussed with respect to FIGS. 24A and 24B may provide 2 layers: a quarter resolution layer and a full resolution layer.

Figure 25A:
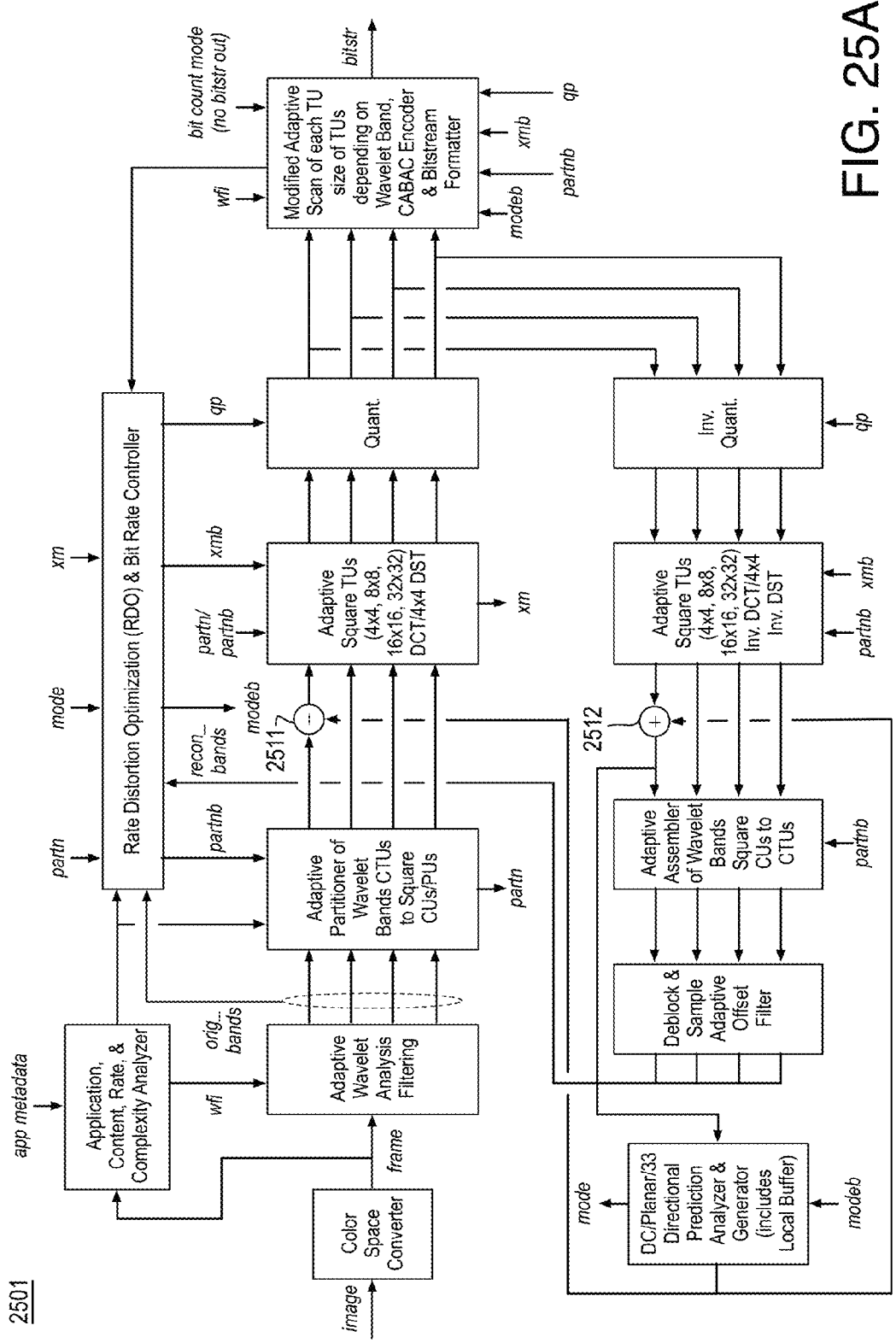
FIG. 25A is a block diagram of an example AWMHVC Intra Encoder.

FIG. 25A is a block diagram of an example AWMHVC Intra Encoder 2501, arranged in accordance with at least some implementations of the present disclosure. As shown, an input image (image) may be color converted from RGB to a YUV frame (frame) by a "Color Space Converter" (if the input is a YUV video frame rather than an RGB image then this step is not needed). Furthermore, without loss of generality it is assumed that YUV frame is of 4:2:0 format (e.g., U and V resolutions are one-half of that of Y both in horizontal and vertical direction). Based on evaluation of application parameters (e.g., image/frame resolution, bitrate) and content (e.g., complexity) by an "Application, Content, Rate, & Complexity Analyzer," wavelet decomposition/analysis filter may be selected, quality and rate targets may be set, partitioning of bands may be regulated, and bitrate control may be performed.

As shown, the YUV frame may undergo one level wavelet decomposition (using a wavelet filter pair selected based on application/resolution) into LL, HL, LH, and HH subbands by an "Adaptive Wavelet Analysis Filtering" module and content of each LCU (e.g., CTU) of each band may be partitioned under control of a "Rate Distortion Optimization & Bit Rate Controller" into CUs and further into PUs blocks by an "Adaptive Partitioner of Wavelet Bands CTUs to square CUs/PUs." Such processing may result in many candidate partitions (partn) of each LCU. For example, the "Rate Distortion Optimization & Bit Rate Controller" may provide for a best selection of partition size, prediction mode, and transform type.

Furthermore, for each LL band LCU partition, several candidate intra (e.g., DC, planar, and 33 directional) prediction modes (mode) may be generated using decoded neighboring CUs by a "DC/Planar/33 Directional Prediction Analyzer & Generator (includes Local Buffer)". For other (HL, LH, HH) band LCU partitions, intra prediction is not performed.

LL band LCU partitioned PUs/blocks may be differenced with candidate prediction partitions at a differencer 2511 to determine candidate difference partition blocks that may be transformed by an "Adaptive Square TUs (4×4, 8×8, 16×16, 32×32) DCT/4×4 DST" module resulting in candidate transform coefficient blocks. For other bands, no predictions are needed and thus the prediction partition/blocks samples are directly transformed resulting in transform coefficient blocks. All transform block coefficients may be quantized by a "Quantizer" and entropy encoded by CABAC Entropy encoder. All bit costs such as transform coefficients entropy coding bit costs, LCU partitioning bit costs, prediction mode bit costs are determined by a "Modified Adaptive Scan of each TU size of TUs depending on Wavelet Bands, CABAC Encoder & Bitstream Formatter." For example, the term "modified adaptive scan" as used herein may refer to the fact that in different wavelet bands different directional subsets of scans are used for scanning of different size TUs depending on the properties of that band. Overall for a combination (partition size, prediction mode, transform type, transform coefficients block) not only cost can be calculated but also reconstructed partition and thus the distortion can also be calculated. These costs and distortions are used in rate distortion optimization as follows.

Given a set of candidate partitions (partn) of each LCU, candidate intra prediction modes (mode), transform (xm), and potential quantizer values (q), the "Rate Distortion Optimization & Bit Rate Controller" may makesthe best decision using the bitrate (from bit costs provided by the entropy encoder) and the distortion measure (computed from difference of the original and the reconstructed subband partitions) on the best encoding strategy by determining the best partitioning (partnb) and the best intra prediction mode (modeb) to use for coding of each partition, the selected transform (xmb), and the quantizer (qp) that will allow achieving the best (RD tradeoff) quality results under constraint of available bitrate. The selections of partnb, modeb, xmb, and qp are sent via the bitstream (bitstr) to the decoder.

The process of forming predictions from neighbors requires reconstruction of neighboring blocks, requiring a decoding loop at the encoder. For example, quantized coefficient blocks of each band at the encoder may go through dequantization at an "Inverse Quantizer", followed by inverse transform at an "Adaptive Square TUs (4×4, 8×8, 16×16, 32×32) Inverse DCT/4×4 Inverse DST" module resulting in CUs/blocks of reconstructed samples of HL, LH, and HH bands and interim TUs/blocks of reconstructed samples of the LL band. For the LL band, a prediction mode may be used to acquire PUs/blocks to add to the LL band interim reconstructed TUs/blocks at adder 2512 to generate final reconstructed CUs. Reconstructed LL band CUs are also saved in a local buffer and used for current CU prediction by the "DC/Planar/33 Directional Prediction Analyzer & Generator (includes Local Buffer)" with the PU/block forming one input to differencer 2511, at the other input of which is the current partition/block being coded. Also, since full reconstruction of all bands is needed for the purpose of computing distortion, the reconstructed LL band and the other (HL, LH, HH) band CUs may be assembled to form LCUs at an "Adaptive Assembler of Wavelet Bands Square CUs to CTUs" that may then undergo deblocking and edge fixing in a "Deblock & Sample Adaptive Offset Filter" module resulting in reconstructed LL, HL, LH, and HH bands with reduced artifacts that are input to RDO for use in computing distortion.

Figure 25B:
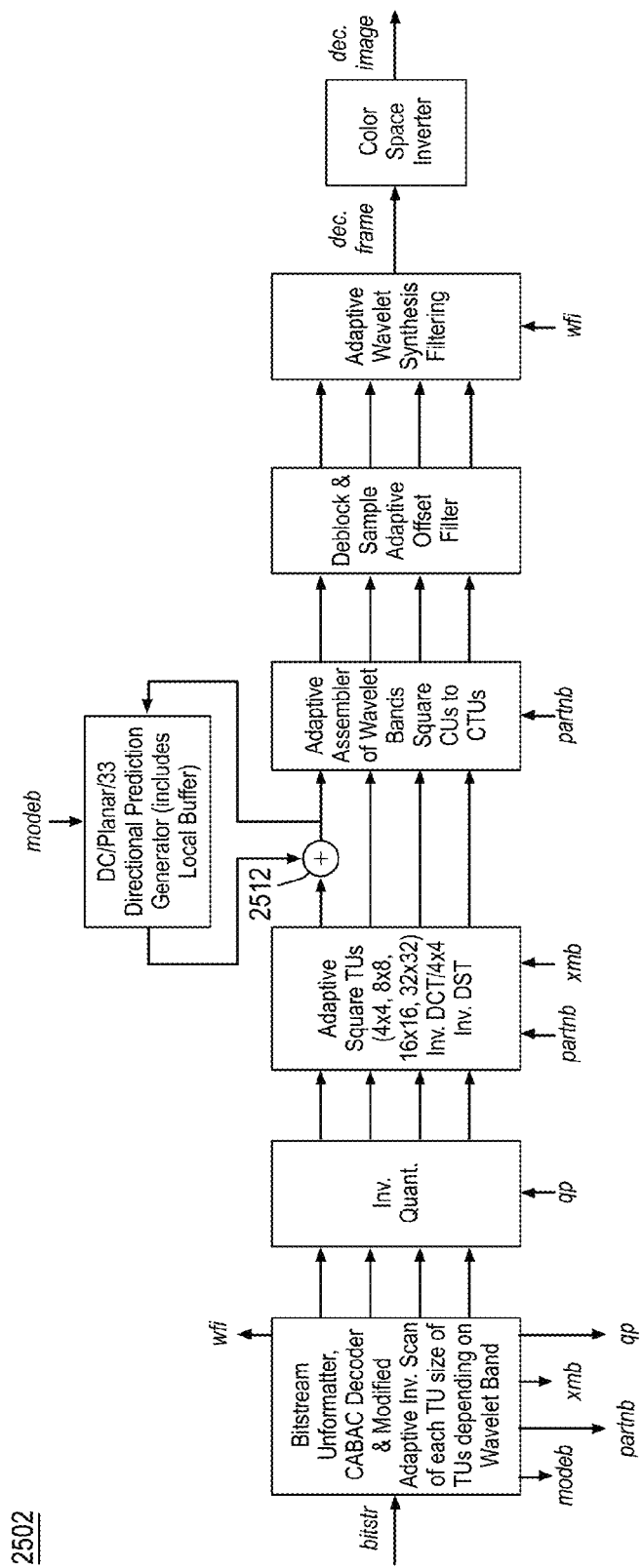
FIG. 25B is a block diagram of an example AWMHVC Intra Decoder corresponding to the encoder of FIG. 25A.

FIG. 25B is a block diagram of an example AWMHVC Intra Decoder 2502 corresponding to the encoder of FIG. 25A, arranged in accordance with at least some implementations of the present disclosure. Much of decoder 2502 was discussed while discussing the decoding loop in AWMHVC Intra Encoder, except for operation of an "Adaptive Wavelet Synthesis Filtering" module and a "Color Space Inverter." As shown, an encoded AWMHVC bitstream (bitstr) may be decoded by a "Bitstream Unformatter, CABAC Decoder & Modified Adaptive Inverse Scan of each TU size of TUs depending on Wavelet Band" module resulting in selected partitioning info (partnb), selected intra prediction mode info (modeb), selected transform info (xmb), selected quantizer (qp), and quantized TU coefficient blocks. As used herein, the term modified adaptive inverse scan refers to the fact that in different wavelet bands different directional subsets of scans are used for inverse scanning of different size TUs, depending on the properties of that band. As shown, the transform coefficient blocks may be dequantized using quantizer qp by an "Inverse Quantizer" and inverse transformed by an "Adaptive Square TUs (4×4, 8×8, 16×16, 32×32) Inverse DCT/4×4 Inverse DST" module resulting in TUs of reconstructed samples of HL, LH and HH bands and blocks of interim samples for the LL band. As discussed, by adding prediction blocks generated using prediction modeb info by a "DC/Planar/33 Directional Prediction Generator (includes Local Buffer)" at adder 2512 to decoded interim TUs, final CUs of LL band may be generated. All CUs of each wavelet band may be assembled into LCUs at an "Adaptive Assembler of Wavelet Bands Square CUs to CTUs" and thus to full bands that may undergo deblocking and edge fixing in a "Deblock & Sample Adaptive Offset Filter" module to reduce coding artifacts and then input to an "Adaptive Wavelet Synthesis Filtering" that uses filters that are complimentary of wavelet analysis filters (with information on filters used at the encoder sent via the bitstream) to perform synthesis filtering to combines all 4 bands to generate a decoded YUV frame (dec. frame). Depending on the application either this frame may be used and/or the frame may optionally be converted to RGB format image by a "Color Space Inverter."

FIG. 26A through FIG. 26L shows how various size blocks transform block scanning of HEVC for pixel domain coding is applied for scanning of various size transform blocks in different wavelet subbands. For example, FIGS. 26A-26D refer to scanning of 4×4 transform blocks, FIGS. 26E-26H refer to scanning of 8×8 transform blocks, and FIGS. 26I-26L refer to scanning of 16×16 and 32×32 transform blocks. Details of which scan(s) are used for each block size and each band are described herein.

Figure 26A:
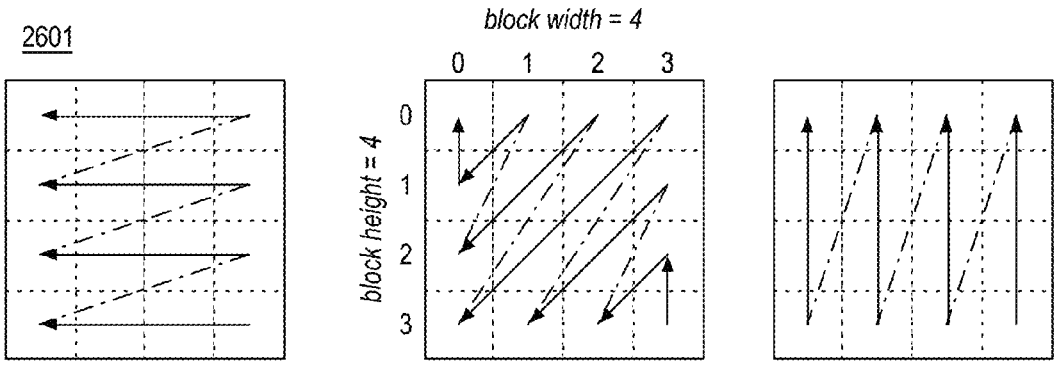
FIG. 26A illustrates example scan patterns for LL band 4×4 transform coefficient blocks.

FIG. 26A illustrates example scan patterns 2601 for LL band 4×4 transform coefficient blocks, arranged in accordance with at least some implementations of the present disclosure. For example, horizontal (left), diagonal (center), and vertical (right) scanning directions may be provided in the AWMHVC codec for LL band intra coding. Such scan choices may be the same as those in HEVC for intra 4×4 transform block scanning. For example, the HEVC Intra coding standard may support 3 different scan directions for scanning of 4×4 blocks of transform coefficients when coding an original frame in the pixel-domain. Since the LL band is a low pass signal similar to an original frame, the same 3 scans may be provided in the AWMHVC codec for 4×4 blocks of transform coefficients in the LL band. During coding, one of the scan directions may be selected and indicated in the bitstream. During decoding, inverse scanning may generate transform coefficient blocks from a decoded bitstream by providing coefficients in an opposite manner (e.g., from a top-left corner of the block to a bottom-right corner using the scan direction—horizontal, diagonal, or vertical—indicated in the bitstream).

Figure 26B:
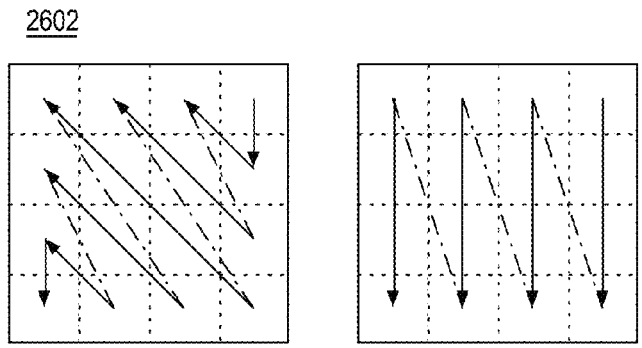
FIG. 26B illustrates example scan patterns for HL band 4×4 transform coefficient blocks.

FIG. 26B illustrates example scan patterns 2602 for HL band 4×4 transform coefficient blocks, arranged in accordance with at least some implementations of the present disclosure. For example, diagonal (left), and vertical (right) scanning directions may be provided in the AWMHVC codec for HL band intra coding. Furthermore, the diagonal and vertical scans may begin at the top-right and end at the bottom-left of the blocks for the HL band. During coding, one of the scan directions may be selected and indicated in the bitstream and, during decoding, inverse scanning may generate transform coefficient blocks from a decoded bitstream by providing coefficients in an opposite manner (e.g., from a bottom-left corner of the block to a top-right corner using the scan direction—diagonal or vertical—indicated in the bitstream).

Figure 26C:
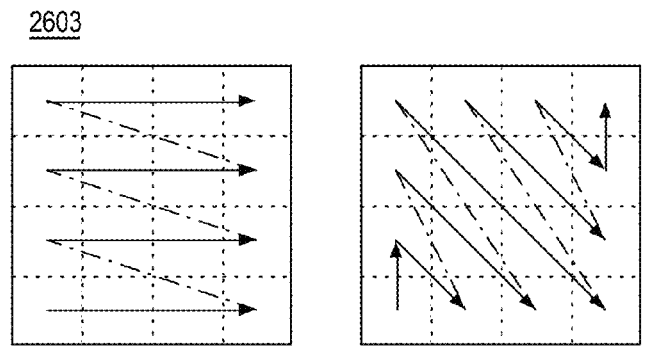
FIG. 26C illustrates example scan patterns for LH band 4×4 transform coefficient blocks.

FIG. 26C illustrates example scan patterns 2603 for LH band 4×4 transform coefficient blocks, arranged in accordance with at least some implementations of the present disclosure. For example, horizontal (left), and diagonal (right) scanning directions may be provided in the AWM-HVC codec for LH band intra coding. Furthermore, the horizontal and diagonal scans may begin at the bottom-left and end at the top-right of the blocks for the LH band. During coding, one of the scan directions may be selected and indicated in the bitstream and, during decoding, inverse scanning may generate transform coefficient blocks from a decoded bitstream by providing coefficients in an opposite manner (e.g., from a top-right corner of the block to a bottom-left corner using the scan direction—horizontal or diagonal—indicated in the bitstream).

Figure 26D:
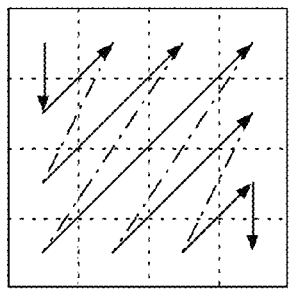
FIG. 26D illustrates an example scan pattern for HH band 4×4 transform coefficient blocks.

FIG. 26D illustrates an example scan pattern 2604 for HH band 4×4 transform coefficient blocks, arranged in accordance with at least some implementations of the present disclosure. For example, a diagonal scanning direction may be provided in the AWMHVC codec for HH band intra coding. Furthermore, the diagonal scan may begin at the top-left and end at the bottom-right of the blocks for the HH band. During decoding, inverse scanning may generate transform coefficient blocks from a decoded bitstream by providing coefficients in an opposite manner (e.g., from a bottom-right corner of the block to a top-left corner using the diagonal scan direction).

In an embodiment, if a diagonal scan pattern is selected for the LL band, the scan pattern for the other bands is also set to a diagonal scan pattern. In an embodiment, if a vertical scan pattern is selected for the HL band, the scan pattern for the LH band is set to a horizontal scan pattern. Such techniques may be applied to 4×4 and/or 8×8 transform coefficient blocks.

Figure 26E:
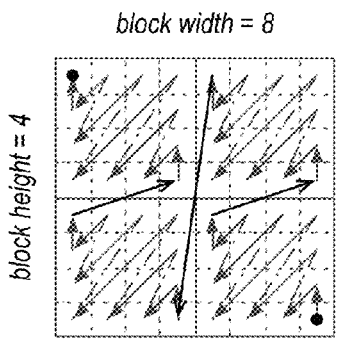
FIG. 26E illustrates example scan patterns for LL band 8×8 transform coefficient blocks.
Figure 26E:
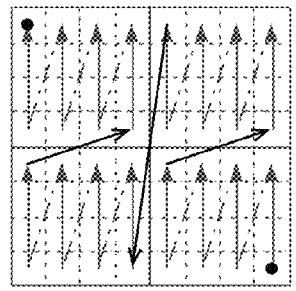

FIG. 26E illustrates example scan patterns 2605 for LL band 8×8 transform coefficient blocks, arranged in accordance with at least some implementations of the present disclosure. For example, horizontal (left), diagonal (center), and vertical (right) scanning directions may be provided in the AWMHVC codec for LL band intra coding. Such scan choices may be the same as those in HEVC for intra 8×8 transform block scanning. For example, the HEVC Intra coding standard may supports 3 different scans for scanning of 8×8 blocks of transform coefficients when coding an original frame in the pixel-domain. Since the LL band is a low pass signal similar to an original frame, the same 3 scans may be provided in the AWMHVC codec for 8×8 blocks of transform coefficients in the LL band. As shown, such scanning directions may be provided for each 4×4 block (from a bottom-right to top-left corner for each 4×4 block) within an 8×8 block such that the 4×4 blocks are traversed in an order of: bottom-right, bottom-left, top-right, top-left. During coding, one of the scan directions (e.g., for the 4×4 blocks) may be selected and indicated in the bitstream and, during decoding, inverse scanning may generate transform coefficient blocks from a decoded bitstream by providing coefficients in an opposite manner. For example, the traversal among 4×4 blocks may not need to be indicated in the bitstream and the scan direction of traversal within the 4×4 blocks may be indicated in the bitstream (e.g., from a bottom-left corner of the block to a top-right corner using the scan direction—horizontal, diagonal, or vertical—indicated in the bitstream).

Figure 26F:
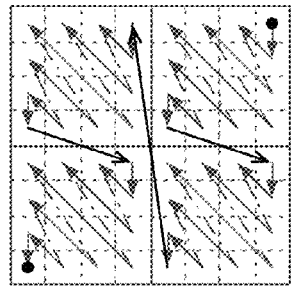
FIG. 26F illustrates example scan patterns for HL band 8×8 transform coefficient blocks.
Figure 26F:
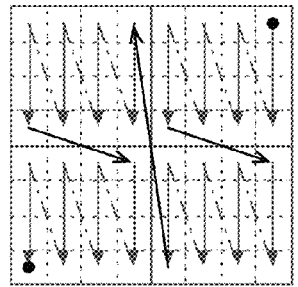

FIG. 26F illustrates example scan patterns 2606 for HL band 8×8 transform coefficient blocks, arranged in accordance with at least some implementations of the present disclosure. For example, diagonal (left), and vertical (right) scanning directions may be provided in the AWMHVC codec for HL band intra coding. As shown, such scanning directions may be provided for each 4×4 block (from a top-right to bottom-left corner for each 4×4 block) within an 8×8 block such that the 4×4 blocks are traversed in an order of: top-right, bottom-right, top-left, bottom-left. During coding, one of the scan directions (e.g., for the 4×4 blocks) may be selected and indicated in the bitstream and, during decoding, inverse scanning may generate transform coefficient blocks from a decoded bitstream by providing coefficients in an opposite manner. For example, the traversal among 4×4 blocks may not need to be indicated in the bitstream and the scan direction of traversal within the 4×4 blocks may be indicated in the bitstream (e.g., from a bottom-left corner of the block to a top-right corner using the scan direction—diagonal or vertical—indicated in the bitstream).

Figure 26G:
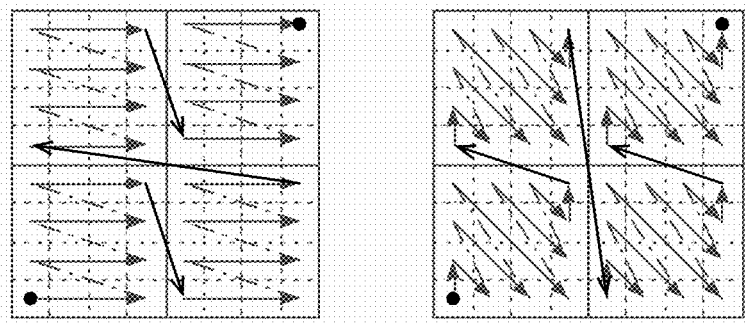
FIG. 26G illustrates example scan patterns for LH band 8×8 transform coefficient blocks.

FIG. 26G illustrates example scan patterns 2607 for LH band 8×8 transform coefficient blocks, arranged in accordance with at least some implementations of the present disclosure. For example, horizontal (left) and diagonal (right) scanning directions may be provided in the AWM-HVC codec for LH band intra coding. As shown, such scanning directions may be provided for each 4×4 block (from a bottom-left to top-right corner for each 4×4 block) within an 8×8 block such that the 4×4 blocks are traversed in an order of: bottom-left, bottom-right, top-left, top-right. During coding, one of the scan directions (e.g., for the 4×4 blocks) may be selected and indicated in the bitstream and, during decoding, inverse scanning may generate transform coefficient blocks from a decoded bitstream by providing coefficients in an opposite manner. For example, the traversal among 4×4 blocks may not need to be indicated in the bitstream and the scan direction of traversal within the 4×4 blocks may be indicated in the bitstream (e.g., from a bottom-left corner of the block to a top-right corner using the scan direction—horizontal or diagonal—indicated in the bitstream).

Figure 26H:
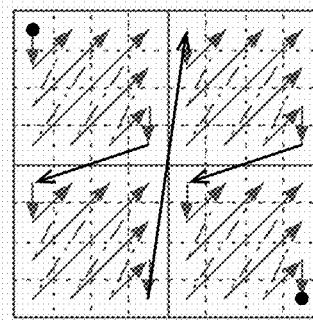
FIG. 26H illustrates an example scan pattern for HH band 8×8 transform coefficient blocks.

FIG. 26H illustrates an example scan pattern 2608 for HH band 8×8 transform coefficient blocks, arranged in accordance with at least some implementations of the present disclosure. For example, a diagonal scanning direction may be provided in the AWMHVC codec for HH band intra coding. As shown, such a scanning direction may be provided for each 4×4 block (from a top-left to bottom-right corner for each 4×4 block) within an 8×8 block such that the 4×4 blocks are traversed in an order of: top-left, bottom-left, top-right, bottom-right. During decoding, inverse scanning may generate transform coefficient blocks from a decoded bitstream by providing coefficients in an opposite manner. For example, the traversal among 4×4 blocks may not need to be indicated in the bitstream nor the scan direction of traversal within the 4×4 blocks may need to be indicated in the bitstream.

Figure 26I:
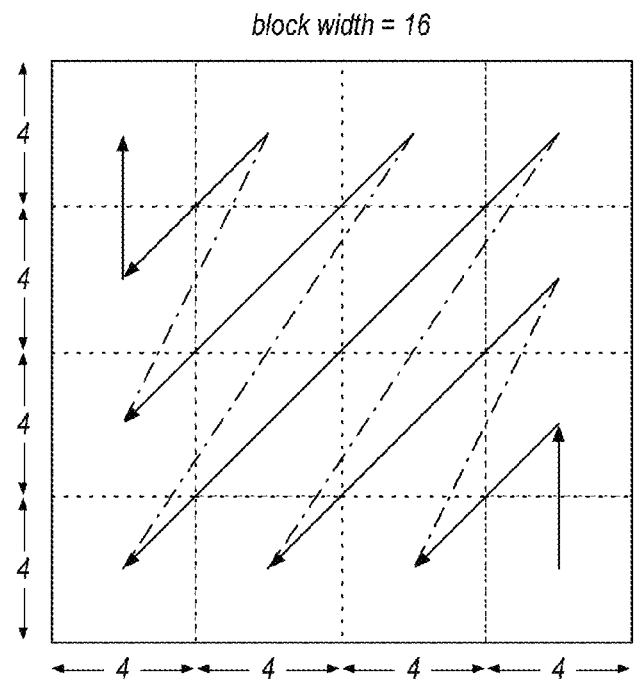
FIG. 26I illustrates an example scan pattern for LL band 16×16 transform coefficient blocks.

FIG. 26I illustrates an example scan pattern 2609 for LL band 16×16 transform coefficient blocks, arranged in accordance with at least some implementations of the present disclosure. As shown in FIG. 26I, traversal between 4×4 blocks of the 16×16 blocks may be in a diagonal pattern starting from a lower-right and ending at a top-left corner. In an embodiment, the scanning direction within the 4×4 blocks is also limited to a diagonal pattern starting from a lower-right and ending at a top-left corner. In other embodiments, horizontal and/or vertical scanning directions within the 4×4 blocks (as discussed with respect to FIG. 26A) may also be provided. The illustrated scan pattern for 16×16 transform coefficient blocks may be extended to 32×32 transform coefficient blocks. For example, the HEVC Intra coding standard supports only a single scan (diagonal) direction for scanning of 16×16 and 32×32 blocks of transform coefficients when coding an original frame available in pixel-domain. Since LL band is a low pass signal much like original frame, same scan patterns (diagonal) may also be provided in the AWMHVC codec for 16×16 and 32×32 blocks of transform coefficients in LL band.

Figure 26J:
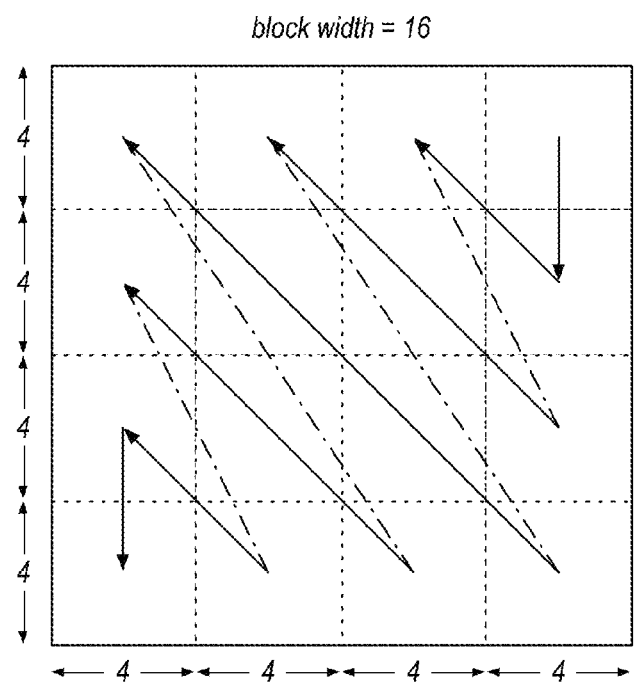
FIG. 26J illustrates an example scan pattern for HL band 16×16 transform coefficient blocks.

FIG. 26J illustrates an example scan pattern 2610 for HL band 16×16 transform coefficient blocks, arranged in accordance with at least some implementations of the present disclosure. As shown in FIG. 26J, traversal between 4×4 blocks of the 16×16 blocks may be in a diagonal pattern starting from a top-right and ending at a bottom-left corner. In an embodiment, the scanning direction within the 4×4 blocks is also limited to a diagonal pattern starting from a top-right and ending at a bottom-left corner. In other embodiments, a vertical scanning direction within the 4×4 blocks (as discussed with respect to FIG. 26B) may also be provided. The illustrated scan pattern for 16×16 transform coefficient blocks may be extended to 32×32 transform coefficient blocks.

Figure 26K:
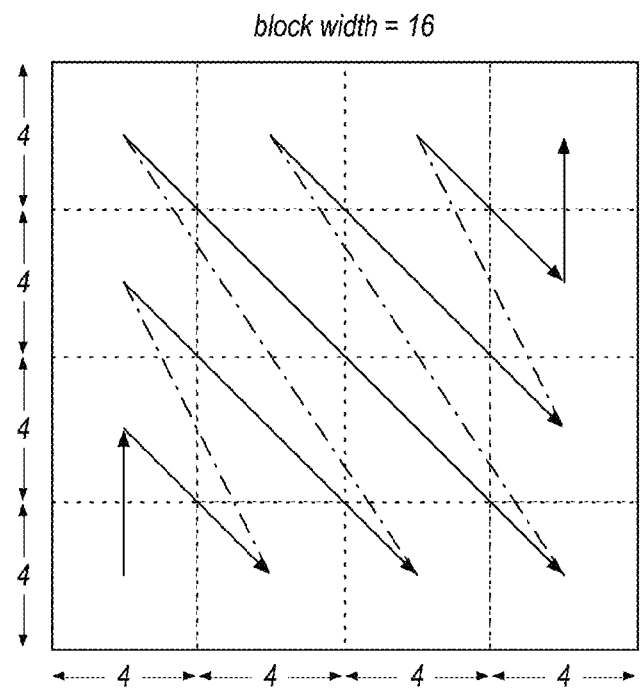
FIG. 26K illustrates an example scan pattern for LH band 16×16 transform coefficient blocks.

FIG. 26K illustrates an example scan pattern 2611 for LH band 16×16 transform coefficient blocks, arranged in accordance with at least some implementations of the present disclosure. As shown in FIG. 26K, traversal between 4×4 blocks of the 16×16 blocks may be in a diagonal pattern starting from a bottom-left and ending at a top-right corner. In an embodiment, the scanning direction within the 4×4 blocks is also limited to a diagonal pattern starting from a bottom-left and ending at a top-right corner. In other embodiments, a horizontal scanning direction within the 4×4 blocks (as discussed with respect to FIG. 26C) may also be provided. The illustrated scan pattern for 16×16 transform coefficient blocks may be extended to 32×32 transform coefficient blocks.

Figure 26L:
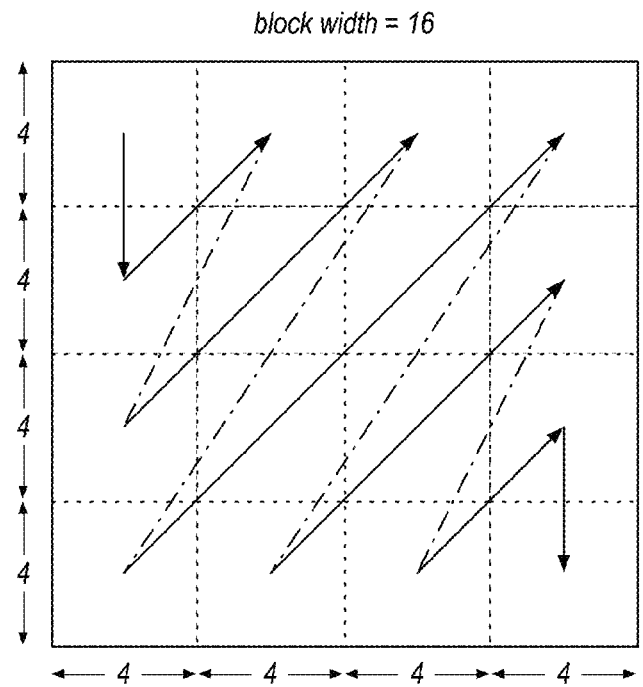
FIG. 26L illustrates an example scan pattern for HH band 16×16 transform coefficient blocks.

FIG. 26L illustrates an example scan pattern 2612 for HH band 16×16 transform coefficient blocks, arranged in accordance with at least some implementations of the present disclosure. As shown in FIG. 26L, traversal between 4×4 blocks of the 16×16 blocks may be in a diagonal pattern starting from a top-left and ending at a bottom-right corner. The scanning direction within the 4×4 blocks may also be a diagonal pattern starting from a bottom-left and ending at a top-right corner. The illustrated scan pattern for 16×16 transform coefficient blocks may be extended to 32×32.

For example, as discussed, at an encoder, wavelet decomposition may be performed on an original image or frame to generate multiple subbands, a first subband (e.g., an LL subband) of the multiple subbands may be encoded with a High Efficiency Video Coding (HEVC) compliant encoder to generate a first bitstream, a second subband of the multiple subbands (e.g., an HL, LH, or HH subband) may be encoding such that the encoding includes scanning a quantized transform coefficient block of the second subband using a direction of scanning based on a type of the second subband to generate a second bitstream, and the first and second bitstreams may be multiplexed to generate a scalable bitstream. In an embodiment, encoding the second subband includes disabling intra prediction. Furthermore, a scanning pattern (e.g., horizontal, vertical, or diagonal) may be selected for the second subband and the scanning pattern may be indicated in the bitstream. In an embodiment, the second subband is an LH subband, the direction of scanning is from a top-right corner to a bottom-left corner and the scanning pattern is diagonal or vertical. In an embodiment, the second subband is an HL subband, the direction of scanning is from a bottom-left corner to a top-right corner and the scanning pattern is diagonal or horizontal. In an embodiment, the second subband is an HH subband, the direction of scanning is from a top-left corner to a bottom-right corner and the scanning pattern is diagonal. Furthermore, a transform unit of the second subband may be divided into sub-blocks, a scanning pattern may be selected for the second subband, the transform unit may be scanned by applying the scanning pattern to the sub-blocks of the transform unit.

Furthermore, at a decoder, a scalable bitstream may be demultiplexed to provide multiple bitstreams each corresponding to a subband of a plurality of wavelet subbands, a first bitstream of the multiple bitstreams may be decoded with a High Efficiency Video Coding (HEVC) compliant decoder to generate a first subband (e.g., an LL subband) of the plurality of wavelet subbands, a second bitstream of the multiple bitstreams may be decoded such that the decoding includes inverse scanning the second bitstream using a direction of inverse scanning based on a type of a second subband corresponding to the second bitstream to generate the second subband (e.g., HL, LH, or HH subband), and wavelet synthesis filtering may be performed on the first and second subbands to generate a reconstructed image. Furthermore, an inverse scanning pattern (e.g., diagonal, horizontal, or vertical) corresponding to the second bitstream may be determined based on a scanning pattern indicator in the scalable bitstream. In an embodiment, the second subband is an LH subband, the direction of inverse scanning is generating a block from a bottom-left corner to a top-right corner and the scanning pattern is diagonal or vertical. In an embodiment, the second subband is an HL subband, the direction of inverse scanning is generating a block from a top-right corner to a bottom-left corner and the scanning pattern is diagonal or horizontal. In an embodiment, the second subband is an HH subband, the direction of inverse scanning is generating a block from a bottom-right corner to a top-left corner and the scanning pattern is diagonal.

As discussed, wavelet based decomposition based processing may be combined with prediction and transform based intra coding using ISO MPEG AVC or HEVC (or slightly modified versions thereof). Discussion now turns to combining a wavelet decomposition based approach with VP9, VP10, or Alliance for Open Media (AOM) prediction and transform based intra coding.

Figure 27:
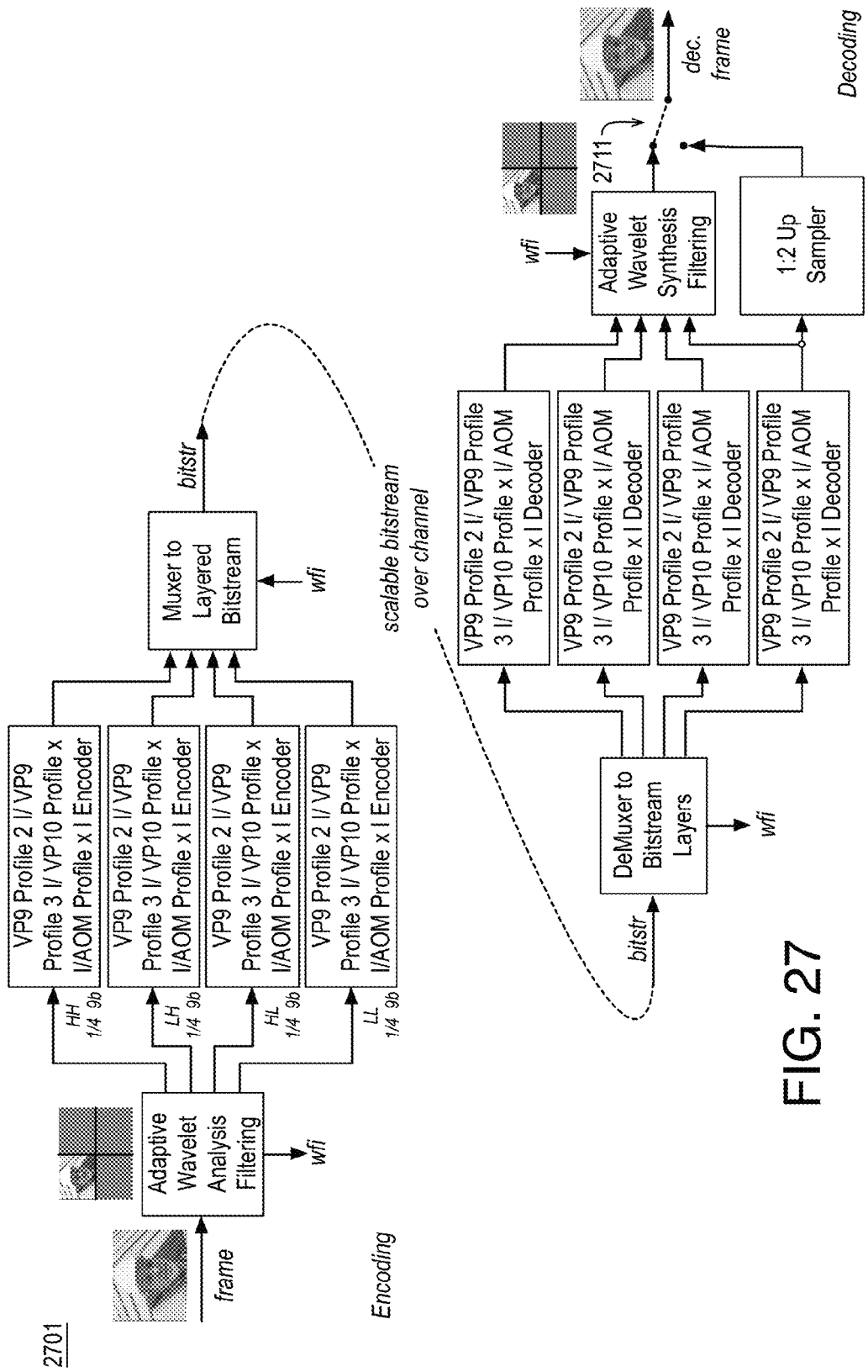
FIG. 27 is a block diagram of an example Adaptive Wavelet VP9 (AWVP9) coder.

FIG. 27 is a block diagram of an example Adaptive Wavelet VP9 (AWVP9), VP10 (AWVP10), or AOM (AWAOM) coder 2701, arranged in accordance with at least some implementations of the present disclosure. For example, FIG. 27 may provide an AWVP9, AWVP10, or AWAOM Intra Encoder and Decoder that may use adaptive wavelet analysis/synthesis filtering and a VP9 Profile 2 I/VP9 Profile 3 I/VP10 Profile x I/AOM Profile x I Encoder and Decoder. As shown, from a single coded bitstream, 2 different decoded versions: one of lower resolution and one of full resolution/higher quality may be extracted at the decoder side. As shown, at the encoding side, an input video (or image) YUV frame (frame) may undergo adaptive wavelet decomposition using a filter set from a codebook of filter-sets with selection of filter based on application (e.g., resolution, content, and bitrate). Using the selected filter set, the process of analysis filtering may performed for one level decomposition that may convert the frame into LL, HL, LH, and HH subbands, each of which are one-quarter in size and with bit depth of 9 bits (assuming 8 bit input video or image). The LL subband may be encoded by a VP9 Profile 2 I/VP9 Profile 3 I/VP10 Profile x I/AOM Profile x I encoder (e.g., "VP9 Profile 2 I/VP9 Profile 3 I/VP10 Profile x I/AOM Profile x I Encoder"). Furthermore, the HL, LH, and HH subbands may be encoded with the same VP9 Profile 2 I/VP9 Profile 3 I/VP10 Profile x I/AOM Profile x I encoders (e.g., "VP9 Profile 2 I/VP9 Profile 3 I/VP10 Profile x I/AOM Profile x I Encoder"). The outcome of the encoding process includes four individual bitstreams such as an LL bitstream, an HL bitstream, an LH bitstream, and an HH bitstream that may be multiplexed by a "Muxer to Layered Bitstream" into a single scalable bitstream (bitstr) along with headers including that which carries index of selected wavelet filter set (wfi).

As also shown in FIG. 27, at the decoding side, a bitstream (bitstr) may be received, from which headers including an index of the selected wavelet filter set may be decoded and the bitstream may demultiplexed into individual LL, HL, LH, and HH bitstreams by a "DeMuxer to Bitstream Layers". The demultiplexed LL bitstream may be provided to to a VP9 Profile 2 I/VP9 Profile 3 I/VP10 Profile x I/AOM Profile x I decoder (e.g., "VP9 Profile 2 I/VP9 Profile 3 I/VP10 Profile x I/AOM Profile x I Decoder"), and depending on user or system input such as an output selection (e.g., that may include a low resolution selection or a full resolution selection) implemented by switch 2711, a low resolution decoded video (or image) frame after upsampling by 2 in each dimension by a "1:2 Up Sampler" may be provided for display (dec. frame). However, if the user or system selects a full resolution video (or image) frame for presentment, the remaining 3 (HL, LH and HH) bands may be provided to VP9 Profile 2 I/VP9 Profile 3 I/VP10 Profile x I/AOM Profile x I decoder(s) (e.g., "VP9 Profile 2 I/VP9 Profile 3 I/VP10 Profile x I/AOM Profile x I Decoder") and all four, quarter size decoded subbands may be combined using a matching filter set (indicated by the index decoded from the bitstream). The process of combination of bands may be characterized as synthesis filtering and may be performed may an "Adaptive Wavelet Synthesis Filtering" module resulting in a full resolution/size final reconstructed video (or image) frame (dec. frame) for display.

Figure 28:
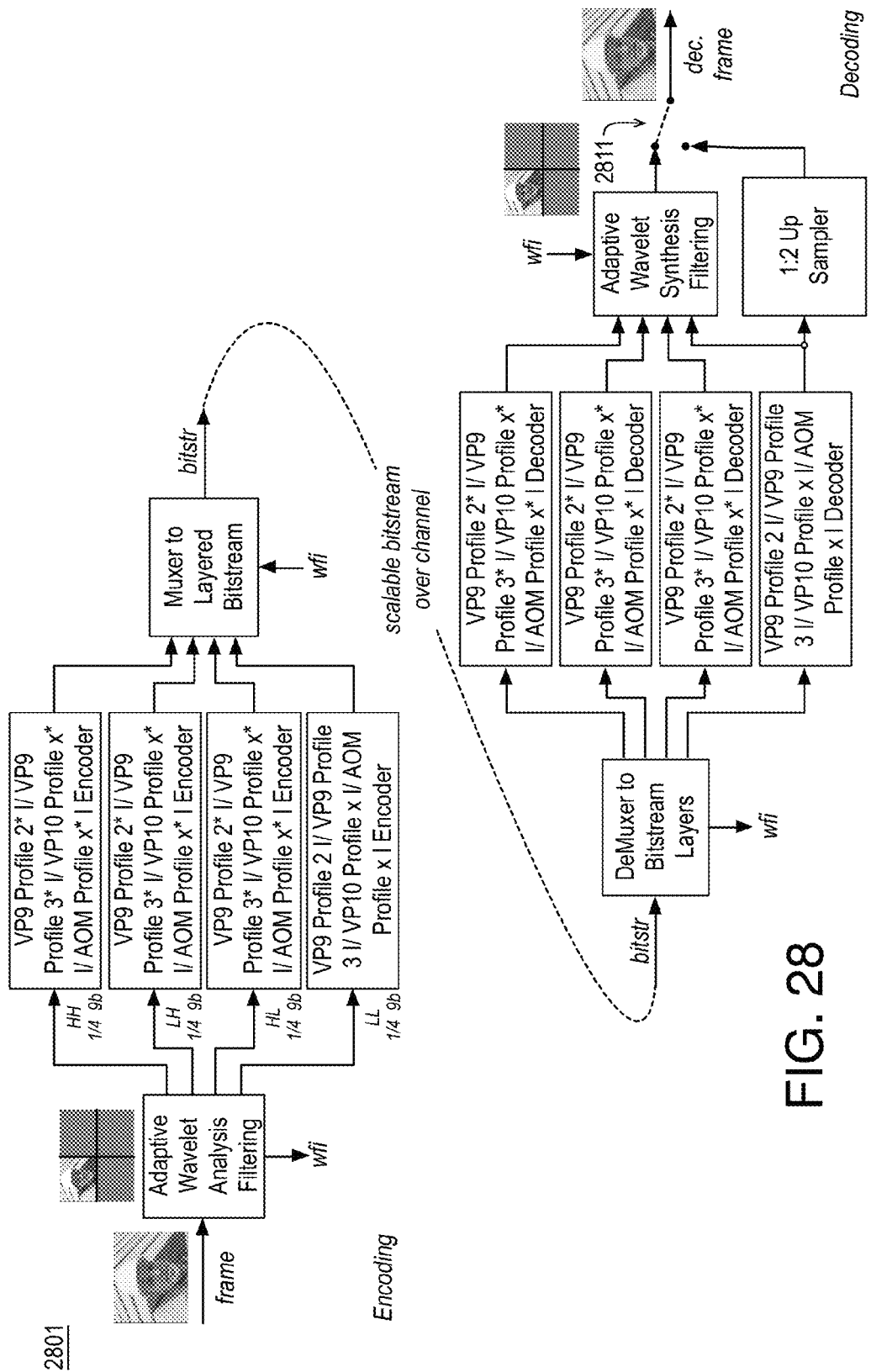
FIG. 28 is a block diagram of an example Adaptive Wavelet Modified VP9 (AWMVP9), VP10 (AWMVP10), or AOM (AWMAOM) coder.

FIG. 28 is a block diagram of an example Adaptive Wavelet Modified VP9 (AWMVP9), VP10 (AWMVP10), or AOM (AWMAOM) coder 2801, arranged in accordance with at least some implementations of the present disclosure. For example, FIG. 28 may provide an AWMVP9, AWMVP10, or AWMAOM Intra Encoder and Decoder that may use adaptive wavelet analysis/synthesis filtering and a VP9 Profile 2 I/VP9 Profile 3 I/VP10 Profile x I/AOM Profile x I (or their slightly modified versions VP9 Profile 2* I/VP9 Profile 3* I/VP10 Profile x* I/AOM Profile x*) Encoder and Decoder. As shown, from a single coded bitstream, 2 different decoded versions: one of lower resolution and one of full resolution/higher quality may be extracted. As shown, at the encoding side, an input video (or image) YUV frame (frame) may undergo adaptive wavelet decomposition using a filter set from a codebook of filter-sets with selection of filter based on application (e.g., resolution, content, and bitrate) by an "Adaptive Wavelet Analysis Filtering" module. Using the selected filter set, the process of analysis filtering may be performed for one level decomposition that may convert the frame into LL, HL, LH, and HH subbands, each of which are one-quarter in size and with bit depth of 9 bits (assuming 8 bit input video or image). The LL subband may be encoded by a VP9 Profile 2 I/VP9 Profile 3 I/VP10 Profile x I/AOM Profile x I encoder (e.g., "VP9 Profile 2 I/VP9 Profile 3 I/VP10 Profile x I/AOM Profile x I Encoder") and the HL, LH, and HH subbands may be encoded with individual customized VP9 Profile 2* I/VP9 Profile 3* I/VP10 Profile x* I/AOM Profile x* I encoders (that are intra prediction disabled and scan adapted to directionality of each subband) (e.g., "VP9 Profile 2* I/VP9 Profile 3* I/VP10 Profile x* I/AOM Profile x* I Encoder") versions of VP9 Profile 2 I/VP9 Profile 3 I/VP10 Profile x I/AOM Profile x I encoders. The outcome of the encoding process may include four individual bitstreams such as an LL bitstream, an HL bitstream, an LH bitstream, and an HH bitstream that may be multiplexed by a "Muxer to Layered Bitstream" into a single scalable bitstream (bitstr) along with headers including an index of the selected wavelet filter set.

As also shown in FIG. 28, at the decoding side, a bitstream (bitstr) may be received, from which headers including an index of the selected wavelet filter set may be decoded and the bitstream may be demultiplexed into individual LL, HL, LH, and HH bitstreams by a "DeMuxer to Bitstream Layers". The demultiplexed LL bitstream may be provided to a VP9 Profile 2 I/VP9 Profile 3 I/VP10 Profile x I/AOM Profile x I decoder (e.g., "VP9 Profile 2 I/VP9 Profile 3 I/VP10 Profile x I/AOM Profile x I Decoder") and, depending on the user input or system selection or the like such as an output selection (e.g., that may include a low resolution selection or a full resolution selection) implemented by switch 2811, a low resolution decoded video (or image) frame after upsampling by 2 in each dimension by a "1:2 Up Sampler" may be provided for display (dec. frame). If the user or system selects a full resolution video (or image) frame, the remaining 3 (HL, LH and HH) bands may be provided to corresponding custom VP9 Profile 2* I/VP9 Profile 3* I/VP10 Profile x* I/AOM Profile x* I decoders (that are intra prediction disabled and scan adapted to directionality of each subband) versions of VP9 Profile 2 I/VP9 Profile 3 I/VP10 Profile x I/AOM Profile x I decoders (e.g., "VP9 Profile 2* I/VP9 Profile 3* I/VP10 Profile x* I/AOM Profile x* I Decoder"). The four, quarter size decoded subbands may be combined using a matching filter set (indicated by the index decoded from the bitstream). The process of combination of bands may be characterized as synthesis filtering and may be performed by an "Adaptive Wavelet Synthesis Filtering" module resulting in a full resolution/size final reconstructed video (or image) frame (dec. frame) for display.

For example, at an encoder, wavelet decomposition of an image or frame may be performed to generate multiple subbands, each of the multiple subbands may be encoded with a VP9 compliant encoder, a VP10 compliant encoder or an Alliance for Open Media (AOM) compliant encoder to generate multiple VP9, VP10, or AOM compliant bitstreams each corresponding to a subband of the multiple subbands, and the bitstreams may be multiplexed to generate a scalable bitstream. Furthermore, a wavelet analysis filter set may be selected for performing the wavelet decomposition. In an embodiment, the image or frame has a bit depth of 8 bits and each of the subbands has a bit depth of 9 bits. In an embodiment, performing the wavelet decomposition comprises single level wavelet analysis filtering and the multiple subbands include four subbands: an LL subband, an LH subband, an HL subband, and an HH subband.

Furthermore, at a decoder, a scalable bitstream may be demultiplexed, such that at least portions of the scalable bitstream are VP9 compliant, VP10 compliant, or Alliance for Open Media (AOM) compliant, to provide multiple bitstreams each corresponding to a subband of multiple wavelet subbands, at least one of the multiple bitstreams may be decoded with an a VP9 compliant decoder, a VP10 compliant decoder, or an AOM compliant decoder, and an image or frame may be reconstructed based on the decoding. Furthermore, an output selection corresponding to the image or frame may be determined such that the output selection is low resolution or full resolution and reconstructing the image or frame is responsive to the output selection. If the output selection is low resolution, reconstructing the image or frame may include decoding only an LL subband with the VP9 compliant decoder, the VP10 compliant decoder, or the AOM compliant decoder. If the output selection is full resolution, reconstructing the image or frame may include decoding multiple bitstreams each corresponding to a subband of the multiple wavelet subbands with at least the VP9 compliant decoder, the VP10 compliant decoder, or the AOM compliant decoder to generate multiple decoded subbands and performing wavelet synthesis filtering on the multiple decoded subbands to generate the original image or frame at full resolution.

As discussed, techniques discussed herein may provide efficient wavelet based image/video-intra coding that scalable and forward compatible with AVC video Intra (or I) coding. For example, when 1 level (fixed or adaptive) wavelet analysis filtering is performed on input resulting in 4 wavelet bands and AVC High 10 Intra encoding is employed for coding each band, the technique generates a single, efficient, scalable and compatible bitstream. At the decoder, from this single bitstream using AVC High 10 Intra decoder either the LL band may be decoded resulting in a one-quarter resolution image/video frame that with or without upsampling to full size can be displayed and/or all 3 remaining bands (HL, LH, and HH) may be decoded with AVC High 10 Intra decoding and along with already decoded LL band combined via (fixed or adaptive) synthesis filtering into a full resolution image/video frame that can then be displayed.

Furthermore, techniques discussed herein may provide efficient wavelet based image/video-intra coding that highly scalable and forward compatible with AVC video Intra (or I) coding. When 2 level (fixed or adaptive) wavelet analysis filtering is performed on input resulting in 7 wavelet bands and AVC High 10 Intra encoding may be employed for coding each band to generate a single, efficient, highly scalable and compatible bitstream. At the decoder, from this single bitstream using AVC High 10 Intra decoder either the $LL_2$ band may be decoded resulting in a one-sixteenth resolution image/video frame that with or without upsampling can be displayed and/or 3 additional bands ($HL_2$, $LH_2$, and $HH_2$) may be decoded also by AVC High 10 Intra decoder and along with decoded $LL_2$ band combined via (fixed or adaptive) synthesis filtering into one-quarter resolution image/video frame that with or without upsampling to full size may be displayed and/or 3 additional bands ($HL_1$, $LH_1$, and MO may be decoded also by AVC High 10 Intra decoding and along with already decoded $LL_2$, $HL_2$, $LH_2$, and $HH_2$ bands combined via (fixed or adaptive) synthesis filtering into a full resolution image/video frame that may be displayed.

Furthermore, techniques discussed herein may provide a slightly modified AVC High 10 Intra Encoder/Decoder defined as an AVC High10 Intra Encoder/Decoder with DC prediction turned off at both encoder and decoder that uses modified zigzag scanning for 4×4/8×8 blocks in which the starting point of the scan as well as direction of scanning depending on the wavelet band type (HL or LH or HH) being encoded.

Furthermore, techniques discussed herein may provide highly efficient wavelet based image/video-intra coding that is higher in efficiency and scalable and partially compatible with AVC video Intra (or I) coding. When 1 level (fixed or adaptive) wavelet analysis filtering is performed on input resulting in 4 wavelet bands and AVC High 10 Intra coding is employed for coding LL band and slightly modified AVC High 10 (AVC High 10*) Intra encoding is employed for coding HL, LH and HH bands, the technique generates a single, highly efficient, scalable and partially compatible bitstream. At the decoder, from this single bitstream using AVC High 10 Intra decoder the LL band may be decoded resulting in a one-quarter resolution image/video frame that with or without upsampling to full size may be displayed and/or all 3 remaining bands (HL, LH, and HH) may be decoded with AVC High 10* Intra decoder and combined with LL band via (fixed or adaptive) synthesis filtering into a full resolution image/video frame that can then be displayed.

Furthermore, techniques discussed herein may provide efficient wavelet based image/video-intra coding that is higher in coding efficiency and scalable and also partially compatible with AVC video Intra (or I) coding. When 2 level (fixed or adaptive) wavelet analysis filtering is performed on input resulting in 7 wavelet bands and AVC High 10 Intra encoding is employed for coding LL band and AVC High 10* Intra encoding is employed for other 6 bands, the technique generates a single, efficient, highly scalable and compatible bitstream. At the decoder, from this single bitstream using AVC High 10 Intra decoder either the $LL_2$ band can be decoded resulting in a one-sixteenth resolution image/video frame that with or without upsampling can be displayed and/or 3 additional bands ($HL_2$, $LH_2$, and $HH_2$) can be decoded by AVC High 10* Intra decoder and combined with decoded $LL_2$ band via (fixed or adaptive) synthesis filtering into a one-quarter resolution image/video frame that with or without upsampling to full size may be displayed and/or 3 additional bands ($HL_1$, $LH_1$, and MO may be decoded also by AVC High 10* Intra decoding and combined with already decoded $LL_2$, $HL_2$, $LH_2$, and $HH_2$ bands via (fixed or adaptive) synthesis filtering into a full resolution image/video frame that may be displayed.

Furthermore, techniques discussed herein may provide efficient wavelet based image/video-intra coding that is scalable and forward compatible with AVC video Intra (or I) coding as well as AVC spatial/SNR scalable video Intra (or I) coding. Input image/video frame may first downsampled by 2 in each dimension and encoded with normal AVC Main or High Intra encoder and locally decoded image/video frame may be used as prediction in scalable encoding as per AVC scalable High 10 Intra (or I) encoding of the LL band obtained from 1 level (fixed or adaptive) wavelet analysis filtering of input. At the encoder the remaining 3 bands (HL, LH, and HH) also obtained from the same 1 level analysis filtering may be encoded with AVC High 10 Intra (or I) Encoder. The resulting scalable, and compatible bitstream is correspondingly decoded at the decoder using AVC Main or High Intra Decoder, AVC Scalable Intra Decoder, and AVC High 10 Intra decoder. At the output, one of the three or all of the three choices are available such as lower quality ¼ resolution image/video frame which can be used as is or upsampled for display, full quality ¼ resolution LL band version of image/video frame that can also be used as is or upsampled for display, and 3 remaining bands (HL, LH, and HH) that are decoded with AVC High 10 Intra decoder and combined with full quality LL band via (fixed or adaptive) synthesis filtering resulting in a full resolution image/video frame that can then be displayed.

Furthermore, techniques discussed herein may provide slightly modified HEVC Main 10 I or HEVC Main 4:2:2 10 Intra or HEVC Main 12 Intra (aka, HEVC Main 10* I or HEVC Main 4:2:2 10* Intra or HEVC Main 12 Intra*) Encoder/Decoder that turns off DC prediction, includes modified zigzag scanning for 4×4 blocks (or TUs) in which the starting point of the scan as well as direction of scanning depend on the wavelet band (HL or LH or HH), and divides larger TU such as 16×16 coefficient block into 4×4 sub-blocks with each 4×4 sub-block zigzag scanned with the starting point of the scan and direction of scan depending on the band and further the 4×4 array of sub-blocks (that forms the 16×16 block) also zigzag scanned similarly depending on the band.

Furthermore, techniques discussed herein may provide highly efficient wavelet based image/video-intra coding that is higher in efficiency and scalable and partially compatible with HEVC video Intra (or I) coding. When 1 level (fixed or adaptive) wavelet analysis filtering is performed resulting in 4 wavelet bands and HEVC Main 10 I or HEVC Main 4:2:2 10 Intra or HEVC Main 12 Intra is used for encoding LL band and HEVC Main 10* I or HEVC Main 4:2:2 10* Intra or HEVC Main 12* Intra encoding is employed for coding HL, LH and HH bands, the technique generates a single, highly efficient, scalable and partially compatible bitstream. At the decoder, from this single bitstream using the corresponding HEVC Main 10 I or HEVC Main 4:2:2 10 Intra or HEVC Main 12 Intra decoder the LL band can be decoded resulting in a one-quarter resolution image/video frame that with or without upsampling to full size can be displayed, and/or, the 3 remaining bands (HL, LH, and HH) can be decoded with HEVC Main 10* I or HEVC Main 4:2:2 10* Intra or HEVC Main 12* Intra decoder and combined with LL band via (fixed or adaptive) synthesis filtering results in a full resolution image/video frame that can then be displayed.

Furthermore, techniques discussed herein may provide a combination of Wavelet and VP9 Profile 2 I/VP9 Profile 3 I/VP10 Profile x I/AOM Profile x I Encoder/Decoder, which may provide a fully compatible solution. Furthermore, techniques discussed herein may provide a combination of Wavelet and VP9 Profile 2 I/VP9 Profile 3 I/VP10 Profile x I/AOM Profile x I (and slightly modified VP9 Profile 2* I/VP9 Profile 3* I/VP10 Profile x* I/AOM Profile x* I) Encoder/Decoder, which may provide a mostly compatible solution.

Figure 29:
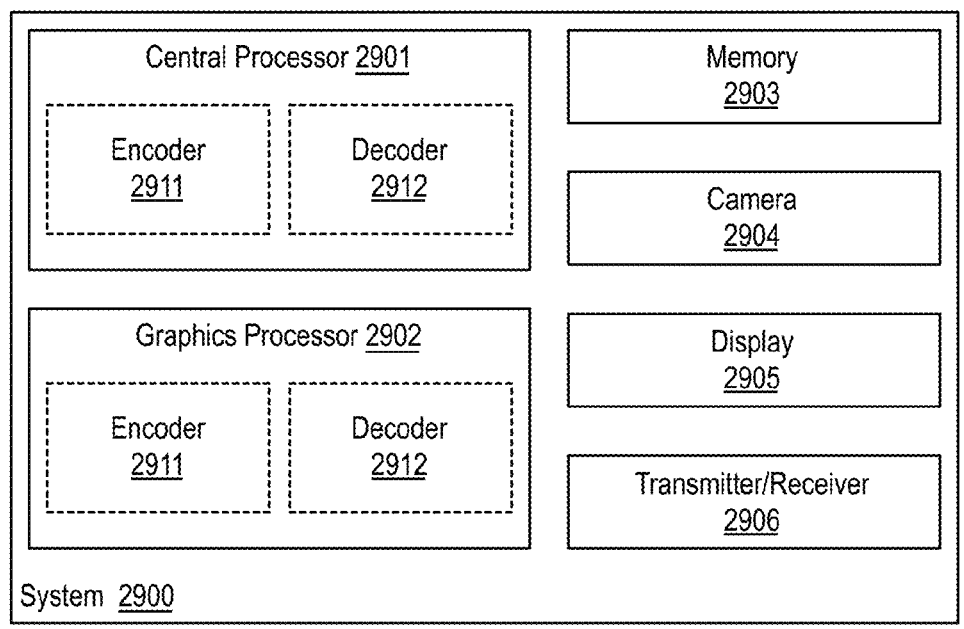
FIG. 29 is an illustrative diagram of an example system for encoding and/or decoding.

FIG. 29 is an illustrative diagram of an example system 2900 for encoding and/or decoding, arranged in accordance with at least some implementations of the present disclosure. As shown in FIG. 29, system 2900 may include a central processor 2901, a graphics processor 2902, a memory 2903, a camera 2904, a display 2905, and a transmitter/receiver 2906. In some embodiments system 2900 may not include camera 2904, display 2905, and/or transmitter/receiver 2906. As shown central processor 2901 and/or graphics processor 2902 may implement an encoder 2911 and/or decoder 2912. Encoder 2911 and decoder 2912 may include any encoder or decoder as discussed herein or combinations thereof. In some embodiments, system 2900 may not implement encoder 2911 or decoder 2902. In the example of system 2900, memory 2903 may store frame data, image data, or bitstream data or any related data such as any other data discussed herein.

As shown, in some embodiments, encoder and/or decoder 2912 may be implemented via central processor 2901. In other embodiments, one or more or portions of encoder and/or decoder 2912 may be implemented via graphics processor 2902. In yet other embodiments, encoder and/or decoder 2912 may be implemented by an image processing unit, an image processing pipeline, a video processing pipeline, or the like. In some embodiments, encoder and/or decoder 2912 may be implemented in hardware as a system-on-a-chip (SoC).

Graphics processor 2902 may include any number and type of graphics processing units that may provide the operations as discussed herein. Such operations may be implemented via software or hardware or a combination thereof. For example, graphics processor 2902 may include circuitry dedicated to manipulate and/or analyze images or frames obtained from memory 2903. Central processor 2901 may include any number and type of processing units or modules that may provide control and other high level functions for system 2900 and/or provide any operations as discussed herein. Memory 2903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 2903 may be implemented by cache memory. In an embodiment, one or more or portions of encoder and/or decoder 2912 may be implemented via an execution unit (EU) of graphics processor 2902 or another processor. The EU may include, for example, programmable logic or circuitry such as a logic core or cores that may provide a wide array of programmable logic functions. In an embodiment, one or more or portions of encoder and/or decoder 2912 may be implemented via dedicated hardware such as fixed function circuitry or the like. Fixed function circuitry may include dedicated logic or circuitry and may provide a set of fixed function entry points that may map to the dedicated logic for a fixed purpose or function. Camera 2904 may be any suitable camera or device that may obtain image or frame data for processing such as encode processing as discussed herein. Display 2905 may be any display or device that may present image or frame data such as decoded images or frames as discussed herein. Transmitter/receiver 2906 may include any suitable transmitter and/or receiver that may transmit or receive bitstream data as discussed herein.

System 2900 may implement any devices, systems, encoders, decoders, modules, units, or the like as discussed herein. Furthermore, system 2900 may implement any processes, operations, or the like as discussed herein.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding FIG.s. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry conFIG.d to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 30:
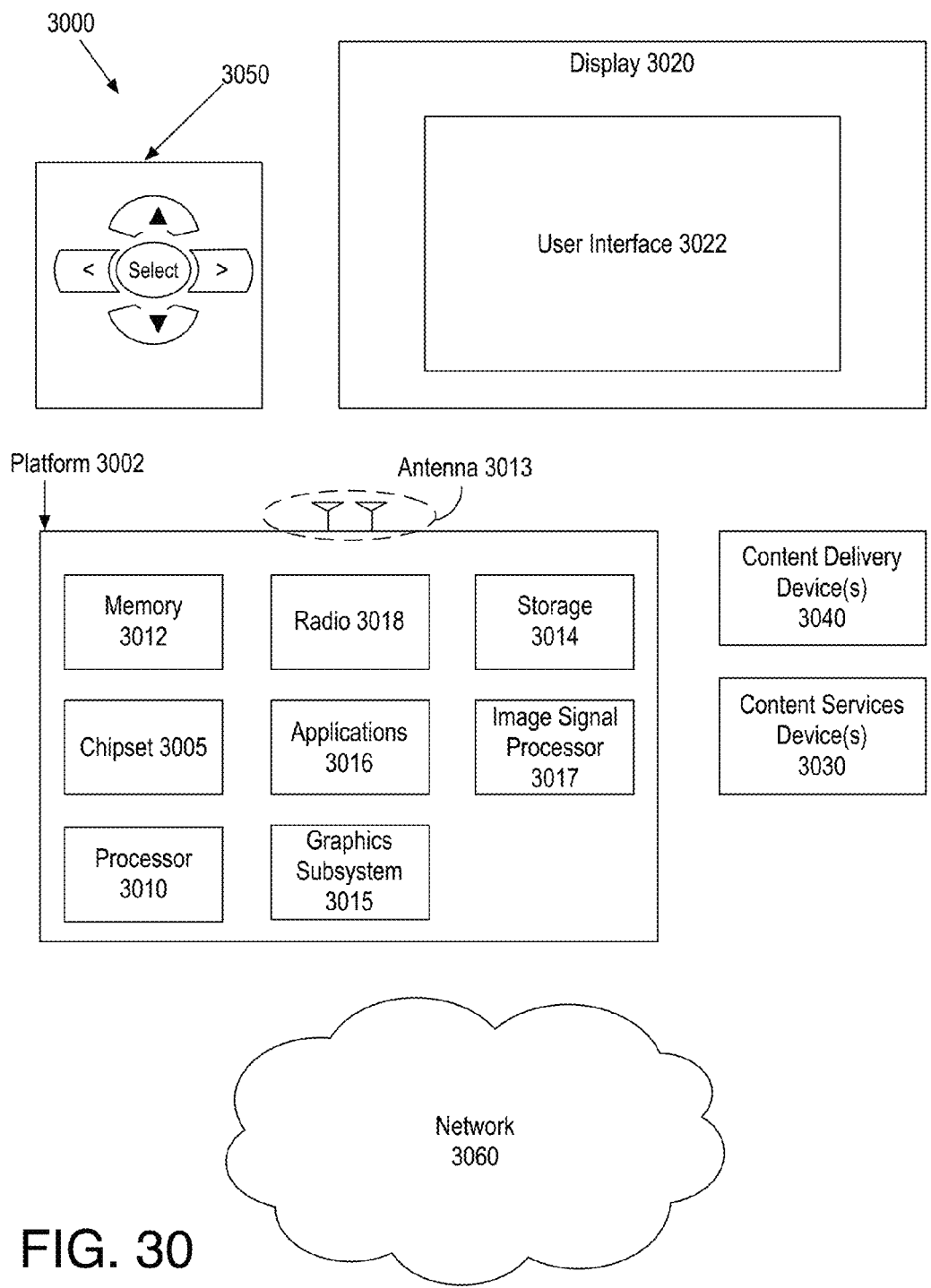
FIG. 30 is an illustrative diagram of an example system.

FIG. 30 is an illustrative diagram of an example system 3000, arranged in accordance with at least some implementations of the present disclosure. In various implementations, system 3000 may be a mobile device system although system 3000 is not limited to this context. For example, system 3000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 3000 includes a platform 3002 coupled to a display 3020. Platform 3002 may receive content from a content device such as content services device(s) 3030 or content delivery device(s) 3040 or other content sources such as image sensors 3019. For example, platform 3002 may receive image data as discussed herein from image sensors 3019 or any other content source. A navigation controller 3050 including one or more navigation features may be used to interact with, for example, platform 3002 and/or display 3020. Each of these components is described in greater detail below.

In various implementations, platform 3002 may include any combination of a chipset 3005, processor 3010, memory 3011, antenna 3013, storage 3014, graphics subsystem 3015, applications 3016, image signal processor 3017 and/or radio 3018. Chipset 3005 may provide intercommunication among processor 3010, memory 3011, storage 3014, graphics subsystem 3015, applications 3016, image signal processor 3017 and/or radio 3018. For example, chipset 3005 may include a storage adapter (not depicted) capable of providing intercommunication with storage 3014.

Processor 3010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 3010 may be dual-core processor(s), dual-core mobile processor(s), and so forth.

Memory 3011 may be implemented as a volatile memory device such as, but not limited to, a Random Access Memory (RAM), Dynamic Random Access Memory (DRAM), or Static RAM (SRAM).

Storage 3014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 3014 may include technology to increase the storage performance enhanced protection for valuable digital media when multiple hard drives are included, for example.

Image signal processor 3017 may be implemented as a specialized digital signal processor or the like used for image processing. In some examples, image signal processor 3017 may be implemented based on a single instruction multiple data or multiple instruction multiple data architecture or the like. In some examples, image signal processor 3017 may be characterized as a media processor. As discussed herein, image signal processor 3017 may be implemented based on a system on a chip architecture and/or based on a multi-core architecture.

Graphics subsystem 3015 may perform processing of images such as still or video for display. Graphics subsystem 3015 may be a graphics processing unit (GPU) or a visual processing unit (VPU), for example. An analog or digital interface may be used to communicatively couple graphics subsystem 3015 and display 3020. For example, the interface may be any of a High-Definition Multimedia Interface, DisplayPort, wireless HDMI, and/or wireless HD compliant techniques. Graphics subsystem 3015 may be integrated into processor 3010 or chipset 3005. In some implementations, graphics subsystem 3015 may be a stand-alone device communicatively coupled to chipset 3005.

The image and/or video processing techniques described herein may be implemented in various hardware architectures. For example, image and/or video functionality may be integrated within a chipset. Alternatively, a discrete graphics and/or video processor may be used. As still another implementation, the image and/or video functions may be provided by a general purpose processor, including a multi-core processor. In further embodiments, the functions may be implemented in a consumer electronics device.

Radio 3018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 3018 may operate in accordance with one or more applicable standards in any version.

In various implementations, display 3020 may include any television type monitor or display. Display 3020 may include, for example, a computer display screen, touch screen display, video monitor, television-like device, and/or a television. Display 3020 may be digital and/or analog. In various implementations, display 3020 may be a holographic display. Also, display 3020 may be a transparent surface that may receive a visual projection. Such projections may convey various forms of information, images, and/or objects. For example, such projections may be a visual overlay for a mobile augmented reality (MAR) application. Under the control of one or more software applications 3016, platform 3002 may display user interface 3022 on display 3020.

In various implementations, content services device(s) 3030 may be hosted by any national, international and/or independent service and thus accessible to platform 3002 via the Internet, for example. Content services device(s) 3030 may be coupled to platform 3002 and/or to display 3020. Platform 3002 and/or content services device(s) 3030 may be coupled to a network 3060 to communicate (e.g., send and/or receive) media information to and from network 3060. Content delivery device(s) 3040 also may be coupled to platform 3002 and/or to display 3020.

Image sensors 3019 may include any suitable image sensors that may provide image data based on a scene. For example, image sensors 3019 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 3019 may include any device that may detect information of a scene to generate image data.

In various implementations, content services device(s) 3030 may include a cable television box, personal computer, network, telephone, Internet enabled devices or appliance capable of delivering digital information and/or content, and any other similar device capable of uni-directionally or bi-directionally communicating content between content providers and platform 3002 and/display 3020, via network 3060 or directly. It will be appreciated that the content may be communicated uni-directionally and/or bi-directionally to and from any one of the components in system 3000 and a content provider via network 3060. Examples of content may include any media information including, for example, video, music, medical and gaming information, and so forth.

Content services device(s) 3030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 3002 may receive control signals from navigation controller 3050 having one or more navigation features. The navigation features of navigation controller 3050 may be used to interact with user interface 3022, for example. In various embodiments, navigation controller 3050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 3050 may be replicated on a display (e.g., display 3020) by movements of a pointer, cursor, focus ring, or other visual indicators displayed on the display. For example, under the control of software applications 3016, the navigation features located on navigation controller 3050 may be mapped to virtual navigation features displayed on user interface 3022, for example. In various embodiments, navigation controller 3050 may not be a separate component but may be integrated into platform 3002 and/or display 3020. The present disclosure, however, is not limited to the elements or in the context shown or described herein.

In various implementations, drivers (not shown) may include technology to enable users to instantly turn on and off platform 3002 like a television with the touch of a button after initial boot-up, when enabled, for example. Program logic may allow platform 3002 to stream content to media adaptors or other content services device(s) 3030 or content delivery device(s) 3040 even when the platform is turned "off." In addition, chipset 3005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 3000 may be integrated. For example, platform 3002 and content services device(s) 3030 may be integrated, or platform 3002 and content delivery device(s) 3040 may be integrated, or platform 3002, content services device(s) 3030, and content delivery device(s) 3040 may be integrated, for example. In various embodiments, platform 3002 and display 3020 may be an integrated unit. Display 3020 and content service device(s) 3030 may be integrated, or display 3020 and content delivery device(s) 3040 may be integrated, for example. These examples are not meant to limit the present disclosure.

In various embodiments, system 3000 may be implemented as a wireless system, a wired system, or a combination of both. When implemented as a wireless system, system 3000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 3000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 3002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 30.

Figure 31:
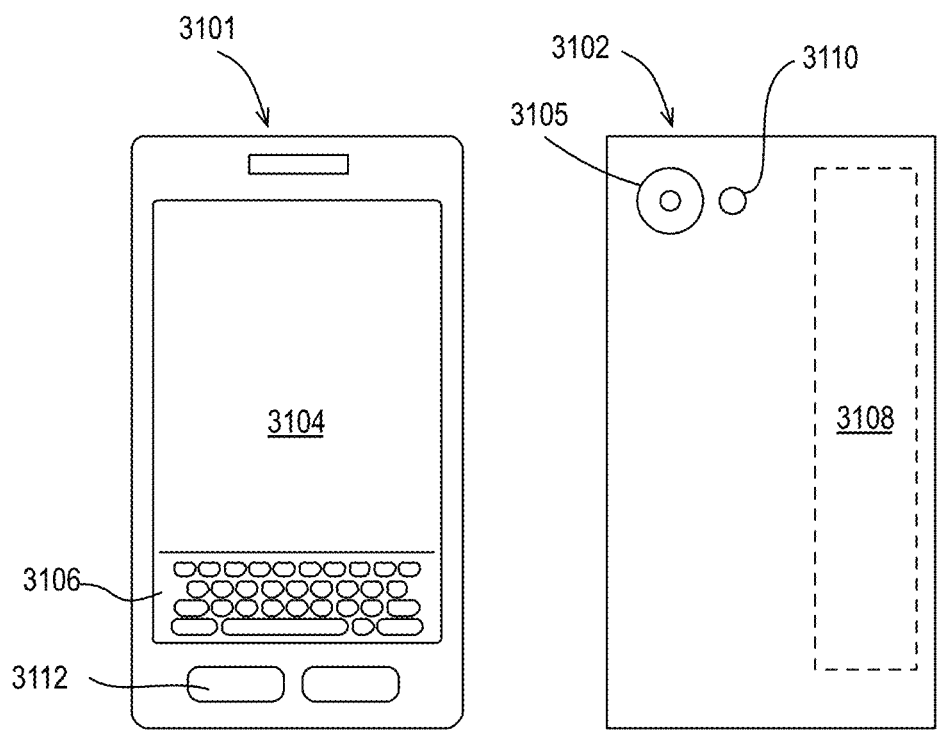
FIG. 31 illustrates an example small form factor device, all arranged in accordance with at least some implementations of the present disclosure.

As described above, system 3000 may be embodied in varying physical styles or form factors. FIG. 31 illustrates an example small form factor device 3100, arranged in accordance with at least some implementations of the present disclosure. In some examples, system 3000 may be implemented via device 3100. In various embodiments, for example, device 3100 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 31, device 3100 may include a housing with a front 3101 and a back 3102. Device 3100 includes a display 3104, an input/output (I/O) device 3106, and an integrated antenna 3108. Device 3100 also may include navigation features 3111. I/O device 3106 may include any suitable I/O device for entering information into a mobile computing device. Examples for I/O device 3106 may include an alphanumeric keyboard, a numeric keypad, a touch pad, input keys, buttons, switches, microphones, speakers, voice recognition device and software, and so forth. Information also may be entered into device 3100 by way of microphone (not shown), or may be digitized by a voice recognition device. As shown, device 3100 may include a camera 3105 (e.g., including a lens, an aperture, and an imaging sensor) and a flash 3110 integrated into back 3102 (or elsewhere) of device 3100. In other examples, camera 3105 and/or flash 3110 may be integrated into front 3101 of device 3100 and/or additional cameras (e.g., such that device 3100 has front and back cameras) may be provided.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer implemented method for image or video coding comprises performing wavelet decomposition of an image or frame to generate a plurality of subbands, encoding each of the plurality of subbands with an Advanced Video Coding (AVC) compliant encoder to generate a plurality of AVC compliant bitstreams each corresponding to a subband of the plurality of subbands, and multiplexing the plurality of subbands to generate a scalable bitstream.

Further to the first embodiments, the method further comprises selecting a wavelet analysis filter set for performing the wavelet decomposition.

Further to the first embodiments, the image or frame has a bit depth of 8 bits and each of the subbands has a bit depth of 9 bits.

Further to the first embodiments, the AVC compliant encoder comprises a 10 bit intra profile encoder.

Further to the first embodiments, performing the wavelet decomposition comprises single level wavelet analysis filtering and the plurality of subbands comprise four subbands.

Further to the first embodiments, performing the wavelet decomposition comprises single level wavelet analysis filtering and the plurality of subbands comprise four subbands and the plurality of subbands comprise an LL subband, an LH subband, an HL subband, and an HH subband.

Further to the first embodiments, performing the wavelet decomposition comprises multiple level wavelet analysis filtering.

Further to the first embodiments, performing the wavelet decomposition comprises multiple level wavelet analysis filtering and the plurality of subbands comprise seven subbands.

In one or more second embodiments, a system for image or video coding comprises a memory to store an image or frame and a processor coupled to the memory, the processor to perform wavelet decomposition of the image or frame to generate a plurality of subbands, encode each of the plurality of subbands with an Advanced Video Coding (AVC) compliant encoder to generate a plurality of AVC compliant bitstreams each corresponding to a subband of the plurality of subbands, and multiplex the plurality of subbands to generate a scalable bitstream.

Further to the second embodiments, the processor is further to select a wavelet analysis filter set for performing the wavelet decomposition.

Further to the second embodiments, the processor to perform the wavelet decomposition comprises the processor to perform single level wavelet analysis filtering and the plurality of subbands comprise four subbands.

Further to the second embodiments, the processor to perform the wavelet decomposition comprises the processor to perform single level wavelet analysis filtering and the plurality of subbands comprise four subbands and the plurality of subbands comprise an LL subband, an LH subband, an HL subband, and an HH subband.

Further to the second embodiments, the processor to perform the wavelet decomposition comprises the processor to perform multiple level wavelet analysis filtering.

In one or more third embodiments, a computer-implemented method for image or video decoding comprises demultiplexing a scalable bitstream, wherein at least portions of the scalable bitstream are Advanced Video Coding (AVC) compliant, to provide a plurality of bitstreams each corresponding to a subband of a plurality of wavelet subbands, decoding at least one of the plurality of bitstreams with an AVC compliant decoder, and reconstructing an image or frame based on the decoding.

Further to the third embodiments, the method further comprises determining an output selection corresponding to the image or frame, wherein the output selection comprises at least one of low resolution or full resolution, and wherein reconstructing the image or frame is responsive to the output selection.

Further to the third embodiments, the method further comprises determining an output selection corresponding to the image or frame, wherein the output selection comprises at least one of low resolution or full resolution, and wherein reconstructing the image or frame is responsive to the output selection and the output selection comprises low resolution and reconstructing the image or frame comprises decoding only an LL subband with the AVC compliant decoder.

Further to the third embodiments, the method further comprises determining an output selection corresponding to the image or frame, wherein the output selection comprises at least one of low resolution or full resolution, and wherein reconstructing the image or frame is responsive to the output selection and the output selection comprises low resolution and reconstructing the image or frame comprises decoding only an LL subband with the AVC compliant decoder and reconstructing the image or frame further comprises at least one of applying a bit depth limiter or performing upsampling.

Further to the third embodiments, the method further comprises determining an output selection corresponding to the image or frame, wherein the output selection comprises at least one of low resolution or full resolution, and wherein reconstructing the image or frame is responsive to the output selection and the output selection comprises full resolution and reconstructing the image or frame comprises decoding multiple bitstreams each corresponding to a subband of the plurality of wavelet subbands with at least the AVC compliant decoder to generate a plurality of decoded subbands and performing wavelet synthesis filtering on the plurality of decoded subbands to generate the image or frame at full resolution.

Further to the third embodiments, the method further comprises determining an output selection corresponding to the image or frame, wherein the output selection comprises at least one of low resolution, medium resolution, or full resolution, and wherein reconstructing the image or frame is responsive to the output selection.

Further to the third embodiments, the method further comprises determining an output selection corresponding to the image or frame, wherein the output selection comprises at least one of low resolution, medium resolution, or full resolution, and wherein reconstructing the image or frame is responsive to the output selection and the output selection comprises low resolution and reconstructing the image or frame comprises decoding only an $LL_2$ subband with the AVC compliant decoder.

Further to the third embodiments, the method further comprises determining an output selection corresponding to the image or frame, wherein the output selection comprises at least one of low resolution, medium resolution, or full resolution, and wherein reconstructing the image or frame is responsive to the output selection and the output selection comprises low resolution and reconstructing the image or frame comprises decoding only an $LL_2$ subband with the AVC compliant decoder and reconstructing the image or frame further comprises applying a bit depth limiter and performing 1:4 upsampling.

Further to the third embodiments, the method further comprises determining an output selection corresponding to the image or frame, wherein the output selection comprises at least one of low resolution, medium resolution, or full resolution, and wherein reconstructing the image or frame is responsive to the output selection and the output selection comprises medium resolution and reconstructing the image or frame comprises decoding multiple bitstreams each corresponding to a subband of the plurality of wavelet subbands with at least the AVC compliant decoder to generate a plurality of decoded subbands, wherein the multiple bitstreams comprise a subset of the plurality of bitstreams and performing single level wavelet synthesis filtering on the plurality of decoded subbands to generate the image or frame.

Further to the third embodiments, the method further comprises determining an output selection corresponding to the image or frame, wherein the output selection comprises at least one of low resolution, medium resolution, or full resolution, and wherein reconstructing the image or frame is responsive to the output selection and the output selection comprises medium resolution and reconstructing the image or frame comprises decoding multiple bitstreams each corresponding to a subband of the plurality of wavelet subbands with at least the AVC compliant decoder to generate a plurality of decoded subbands, wherein the multiple bitstreams comprise a subset of the plurality of bitstreams and performing single level wavelet synthesis filtering on the plurality of decoded subbands to generate the image or frame and reconstructing the image or frame further comprises applying a bit depth limiter and performing 1:2 upsampling.

Further to the third embodiments, the method further comprises determining an output selection corresponding to the image or frame, wherein the output selection comprises at least one of low resolution, medium resolution, or full resolution, and wherein reconstructing the image or frame is responsive to the output selection and the output selection comprises full resolution and reconstructing the image or frame comprises decoding multiple bitstreams each corresponding to a subband of the plurality of wavelet subbands with at least the AVC compliant decoder to generate a plurality of decoded subbands, wherein the multiple bitstreams comprise all of the plurality of bitstreams and performing multiple level wavelet synthesis filtering on the plurality of decoded subbands to generate the image or frame at full resolution.

In one or more fourth embodiments, a system for image or video decoding comprises a memory to store scalable bitstream, wherein at least portions of the scalable bitstream are Advanced Video Coding (AVC) compliant and a processor coupled to the memory, the processor to demultiplex the scalable bitstream to provide a plurality of bitstreams each corresponding to a subband of a plurality of wavelet subbands, decode at least one of the plurality of bitstreams with an AVC compliant decoder, and reconstruct an image or frame based on the decode.

Further to the fourth embodiments, the processor is further to determine an output selection corresponding to the image or frame, wherein the output selection comprises at least one of low resolution or full resolution, and wherein reconstructing the image or frame is responsive to the output selection.

Further to the fourth embodiments, the processor is further to determine an output selection corresponding to the image or frame, wherein the output selection comprises at least one of low resolution or full resolution, and wherein reconstructing the image or frame is responsive to the output selection and the output selection comprises low resolution and the processor to reconstruct the image or frame comprises the processor to decode only an LL subband with the AVC compliant decoder.

Further to the fourth embodiments, the processor is further to determine an output selection corresponding to the image or frame, wherein the output selection comprises at least one of low resolution or full resolution, and wherein reconstructing the image or frame is responsive to the output selection and the output selection comprises full resolution and the processor to reconstruct the image or frame comprises the processor to decode multiple bitstreams each corresponding to a subband of the plurality of wavelet subbands with at least the AVC compliant decoder to generate a plurality of decoded subbands and to perform wavelet synthesis filtering on the plurality of decoded subbands to generate the image or frame at full resolution.

Further to the fourth embodiments, the processor is further to determine an output selection corresponding to the image or frame, wherein the output selection comprises at least one of low resolution, medium resolution, or full resolution, and wherein reconstructing the image or frame is responsive to the output selection.

Further to the fourth embodiments, the processor is further to determine an output selection corresponding to the image or frame, wherein the output selection comprises at least one of low resolution, medium resolution, or full resolution, and wherein reconstructing the image or frame is responsive to the output selection and the output selection comprises low resolution and the processor to reconstruct the image or frame comprises the processor to decode only an $LL_2$ subband with the AVC compliant decoder.

Further to the fourth embodiments, the processor is further to determine an output selection corresponding to the image or frame, wherein the output selection comprises at least one of low resolution, medium resolution, or full resolution, and wherein reconstructing the image or frame is responsive to the output selection and the output selection comprises medium resolution and the processor to reconstruct the image or frame comprises the processor to decode multiple bitstreams each corresponding to a subband of the plurality of wavelet subbands with at least the AVC compliant decoder to generate a plurality of decoded subbands, wherein the multiple bitstreams comprise a subset of the plurality of bitstreams, and to perform single level wavelet synthesis filtering on the plurality of decoded subbands to generate the image or frame.

Further to the fourth embodiments, the processor is further to determine an output selection corresponding to the image or frame, wherein the output selection comprises at least one of low resolution, medium resolution, or full resolution, and wherein reconstructing the image or frame is responsive to the output selection and the output selection comprises full resolution and the processor to reconstruct the image or frame comprises the processor to decode multiple bitstreams each corresponding to a subband of the plurality of wavelet subbands with at least the AVC compliant decoder to generate a plurality of decoded subbands, wherein the multiple bitstreams comprise all of the plurality of bitstreams, and to perform multiple level wavelet synthesis filtering on the plurality of decoded subbands to generate the image or frame at full resolution.

In one or more fifth embodiments, a computer-implemented method for image or video coding comprises performing wavelet decomposition on an original image or frame to generate a plurality of wavelet subbands, receiving a non-LL wavelet subband of the original image or frame for coding, partitioning the received wavelet subband into a plurality of transform partitions, performing a transform on at least a first transform partition of the plurality of transform partitions to generate a block transform coefficients, quantizing the block transform coefficients, scanning the quantized block of transform coefficients of the first transform partition, wherein a direction of the scanning is based on a type of the received wavelet subband, and entropy coding the scanned quantized transform coefficients with an Advanced Video Coding (AVC) compliant entropy encoder into a bitstream.

Further to the fifth embodiments, the type of the received wavelet subband and the direction of scanning the quantized block of transform coefficients comprise at least one of an LH subband and from a top-right corner to a bottom-left corner, an HL subband and from a bottom-left corner to a top-right corner, or an HH subband and from a top-left corner to a bottom-right corner.

Further to the fifth embodiments, the partitioning and the transform are Advanced Video Coding (AVC) compliant.

Further to the fifth embodiments, the method further comprises encoding a second subband of the plurality of subbands with an AVC compliant encoder into a second bitstream and multiplexing at least the bitstream and the second bitstream to generate a scalable bitstream, wherein at least a portion of the scalable bitstream is AVC compliant.

Further to the fifth embodiments, the method further comprises encoding a second subband of the plurality of subbands with an AVC compliant encoder into a second bitstream and multiplexing at least the bitstream and the second bitstream to generate a scalable bitstream, wherein at least a portion of the scalable bitstream is AVC compliant and encoding third and fourth subbands of the plurality of subbands using scanning directions based on a type of the third and fourth subbands, wherein the plurality of subbands comprise four subbands.

Further to the fifth embodiments, the second subband comprises an LL subband and the received wavelet subband comprises at least one of an LH, an HL, or an HH subband.

Further to the fifth embodiments, the plurality of subbands comprise seven subbands and the method further comprises encoding third through seventh subbands of the plurality of subbands using scanning directions based on a type of the third through seventh subbands.

Further to the fifth embodiments, the plurality of subbands comprise seven subbands and the method further comprises encoding third through seventh subbands of the plurality of subbands using scanning directions based on a type of the third through seventh subbands and the second subband comprises an $LL_2$ subband and the wavelet subband comprises at least one of an $HH_1$, an $LH_1$, an $HL_1$, an $HH_2$, an $LH_2$, or an $HL_2$ subband.

In one or more sixth embodiments, system for image or video coding comprises a memory to store an original image or frame and a processor coupled to the memory, the processor to perform wavelet decomposition on the original image or frame to generate a plurality of wavelet subbands, receive a non-LL wavelet subband of the original image or frame for coding, partition the received wavelet subband into a plurality of transform partitions, perform a transform on at least a first transform partition of the plurality of transform partitions to generate a block transform coefficients, quantize the block transform coefficients, scan the quantized block of transform coefficients of the first transform partition, wherein a direction of the scanning is based on a type of the received wavelet subband, and entropy code the scanned quantized transform coefficients with an Advanced Video Coding (AVC) compliant entropy encoder into a bitstream.

Further to the sixth embodiments, the type of the received wavelet subband and the direction of scanning the quantized block of transform coefficients comprise at least one of an LH subband and from a top-right corner to a bottom-left corner, an HL subband and from a bottom-left corner to a top-right corner, or an HH subband and from a top-left corner to a bottom-right corner.

Further to the sixth embodiments, the processor is further to encode a second subband of the plurality of subbands with an AVC compliant encoder into a second bitstream and multiplex at least the bitstream and the second bitstream to generate a scalable bitstream, wherein at least a portion of the scalable bitstream is AVC compliant.

Further to the sixth embodiments, the processor is further to encode a second subband of the plurality of subbands with an AVC compliant encoder into a second bitstream and multiplex at least the bitstream and the second bitstream to generate a scalable bitstream, wherein at least a portion of the scalable bitstream is AVC compliant and the second subband comprises an LL subband and the received wavelet subband comprises at least one of an LH, an HL, or an HH subband.

Further to the sixth embodiments, the plurality of subbands comprise seven subbands, and the processor is further to encode third through seventh subbands of the plurality of subbands using scanning directions based on a type of the third through seventh subbands.

In one or more seventh embodiments, a computer-implemented method for image or video decoding comprises demultiplexing a scalable bitstream to provide a plurality of bitstreams each corresponding to a subband of a plurality of wavelet subbands, entropy decoding, via an Advanced Video Coding (AVC) compliant decoder, a bitstream corresponding to a first subband of a plurality of wavelet subbands, inverse scanning the decoded bitstream to generate decoded transform coefficients, wherein a direction of scanning of the inverse scanning is based on a type of the first subband, and performing an inverse quantization, an inverse transform, and a block assembly based at least in part on the decoded transform coefficients to generate a reconstructed wavelet subband block.

Further to the seventh embodiments, the type of the wavelet subband and the direction of scanning comprise at least one of an LH subband and generating a block from a bottom-left corner to a top-right corner, an HL subband and generating a block from a top-right corner to a bottom-left corner, or an HH subband and generating a block from a bottom-right corner to a top-left corner.

Further to the seventh embodiments, the decoding, the inverse quantization, the inverse transform, and the block assembly are AVC compliant.

Further to the seventh embodiments, the method further comprises decoding a second bitstream of the plurality of bitstreams with an AVC compliant decoder to generate a second subband of the plurality of subbands and reconstructing an image or frame based on the second subband and the reconstructed wavelet subband block.

Further to the seventh embodiments, reconstructing an image or frame based on the second subband and the reconstructed wavelet subband block and decoding the third and fourth bitstreams corresponding to third and fourth subbands of the plurality of subbands using inverse scanning directions based on a type of the third and fourth subbands, wherein the plurality of subbands comprise four subbands.

Further to the seventh embodiments, the method further comprises decoding a second bitstream of the plurality of bitstreams with an AVC compliant decoder to generate a second subband of the plurality of subbands and reconstructing an image or frame based on the second subband and the reconstructed wavelet subband block and the second subband comprises an LL subband and the wavelet subband comprises at least one of an LH, an HL, or an HH subband.

Further to the seventh embodiments, the method further comprises decoding a second bitstream of the plurality of bitstreams with an AVC compliant decoder to generate a second subband of the plurality of subbands and reconstructing an image or frame based on the second subband and the reconstructed wavelet subband block and decoding third through seventh bitstreams corresponding to third through seventh subbands of the plurality of subbands using inverse scanning directions based on a type of the third through seventh subbands, wherein the plurality of subbands comprise seven subbands.

Further to the seventh embodiments, the method further comprises decoding a second bitstream of the plurality of bitstreams with an AVC compliant decoder to generate a second subband of the plurality of subbands and reconstructing an image or frame based on the second subband and the reconstructed wavelet subband block and decoding third through seventh bitstreams corresponding to third through seventh subbands of the plurality of subbands using inverse scanning directions based on a type of the third through seventh subbands, wherein the plurality of subbands comprise seven subbands and the second subband comprises an $LL_2$ subband and the wavelet subband comprises at least one of an $HH_1$, an $LH_1$, an $HL_1$, an $HH_2$, an $LH_2$, or an $HL_2$ subband.

In one or more eighth embodiments, a system for image or video decoding comprises a memory to store a scalable bitstream and a processor coupled to the memory, the processor to demultiplex the scalable bitstream to provide a plurality of bitstreams each corresponding to a subband of a plurality of wavelet subbands, entropy decode, via an Advanced Video Coding (AVC) compliant decoder, a bitstream corresponding to a first subband of a plurality of wavelet subbands, inverse scan the decoded bitstream to generate decoded transform coefficients, wherein a direction of scanning of the inverse scanning is based on a type of the first subband, and perform an inverse quantization, an inverse transform, and a block assembly based at least in part on the decoded transform coefficients to generate a reconstructed wavelet subband block.

Further to the eighth embodiments, the type of the wavelet subband and the direction of scanning comprise at least one of an LH subband and generating a block from a bottom-left corner to a top-right corner, an HL subband and generating a block from a top-right corner to a bottom-left corner, or an HH subband and generating a block from a bottom-right corner to a top-left corner.

Further to the eighth embodiments, the processor is further to decode a second bitstream of the plurality of bitstreams with an AVC compliant decoder to generate a second subband of the plurality of subbands and reconstruct an image or frame based on the second subband and the reconstructed wavelet subband block.

Further to the eighth embodiments, the processor is further to decode a second bitstream of the plurality of bitstreams with an AVC compliant decoder to generate a second subband of the plurality of subbands and reconstruct an image or frame based on the second subband and the reconstructed wavelet subband block and the plurality of subbands comprise seven subbands, and the processor is further to decode third through seventh bitstreams corresponding to third through seventh subbands of the plurality of subbands using inverse scanning directions based on a type of the third through seventh subbands.

In one or more ninth embodiments, a computer-implemented method for image or video coding comprises performing wavelet decomposition on an original image or frame to generate a plurality of subbands, downsampling the original image or frame to generate a downsampled image, encoding the downsampled image with an Advanced Video Coding (AVC) compliant encoder to provide an inter layer prediction, encoding at least one subband of the plurality of subbands based on the inter layer prediction using an AVC compliant scalable encoder to generate a bitstream corresponding to the subband, encoding remaining subbands of the plurality of subbands to generate one or more second bitstreams, and multiplexing at least the bitstream corresponding to the subband and the second bitstreams to generate a scalable bitstream.

Further to the ninth embodiments, encoding the remaining subbands comprise AVC compliant encoding and the scalable bitstream is AVC compliant.

Further to the ninth embodiments, encoding the remaining subbands comprises encoding the blocks of quantized transform coefficients of remaining subbands using a direction of scanning based on a type of the remaining subbands.

Further to the ninth embodiments, the downsampling comprises a downsampling by two in both a horizontal and a vertical dimension In one or more tenth embodiments, a system for image or video coding comprises a memory to store an original image or frame and a processor coupled to the memory, the processor to perform wavelet decomposition on the original image or frame to generate a plurality of subbands, downsample the original image or frame to generate a downsampled image, encode the downsampled image with an Advanced Video Coding (AVC) compliant encoder to provide an inter layer prediction, encode at least one subband of the plurality of subbands based on the inter layer prediction using an AVC compliant scalable encoder to generate a bitstream corresponding to the subband, encode remaining subbands of the plurality of subbands to generate one or more second bitstreams and multiplex at least the bitstream corresponding to the subband and the second bitstreams to generate a scalable bitstream.

Further to the tenth embodiments, the processor to encode the remaining subbands comprise the processor to perform AVC compliant encoding and the scalable bitstream is AVC compliant.

Further to the tenth embodiments, the processor to encode the remaining subbands comprises the processor to encode the blocks of quantized transform coefficients of remaining subbands using a direction of scanning based on a type of the remaining subbands.

In one or more eleventh embodiments, computer-implemented method for image or video coding comprises demultiplexing a scalable bitstream to provide a plurality of bitstreams each corresponding to a subband of a plurality of wavelet subbands and a second bitstream corresponding to a downsampled image, decoding the second bitstream with an Advanced Video Coding (AVC) compliant decoder to generate the downsampled image, upsampling the downsampled image, decoding a first bitstream of the plurality of bitstreams using an AVC compliant scalable decoder and based on inter layer prediction using the upsampled image to generate a first subband of the plurality of wavelet subbands, decoding remaining bitstreams of the plurality of bitstreams to generate remaining subbands of the plurality of wavelet subbands, and reconstructing an image or frame based on the decoding.

Further to the eleventh embodiments, the method further comprises determining an output selection corresponding to the image or frame, wherein the output selection comprises at least one of low resolution, medium resolution, or full resolution, and wherein reconstructing the image or frame is responsive to the output selection.

Further to the eleventh embodiments, determining an output selection corresponding to the image or frame, wherein the output selection comprises at least one of low resolution, medium resolution, or full resolution, and wherein reconstructing the image or frame is responsive to the output selection and the output selection comprises low resolution and the reconstructed the image or frame comprises the downsampled image.

Further to the eleventh embodiments, determining an output selection corresponding to the image or frame, wherein the output selection comprises at least one of low resolution, medium resolution, or full resolution, and wherein reconstructing the image or frame is responsive to the output selection and the output selection comprises medium resolution and the reconstructed image or frame comprises the first subband.

Further to the eleventh embodiments, determining an output selection corresponding to the image or frame, wherein the output selection comprises at least one of low resolution, medium resolution, or full resolution, and wherein reconstructing the image or frame is responsive to the output selection and the output selection comprises medium resolution and the reconstructed image or frame comprises the first subband and reconstructing the image or frame comprises at least one of bit depth limiting the first subband or upsampling the first subband.

Further to the eleventh embodiments, determining an output selection corresponding to the image or frame, wherein the output selection comprises at least one of low resolution, medium resolution, or full resolution, and wherein reconstructing the image or frame is responsive to the output selection and the output selection comprises full resolution and reconstructing the image or frame comprises performing wavelet recomposition on the first subband and the remaining subbands to generate the reconstructed image or frame at full resolution.

In one or more twelfth embodiments, a system for image or video decoding comprises a memory to store scalable bitstream and a processor coupled to the memory, the processor to demultiplex the scalable bitstream to provide a plurality of bitstreams each corresponding to a subband of a plurality of wavelet subbands and a second bitstream corresponding to a downsampled image, decode the second bitstream with an Advanced Video Coding (AVC) compliant decoder to generate the downsampled image, upsample the downsampled image, decode a first bitstream of the plurality of bitstreams using an AVC compliant scalable decoder and based on inter layer prediction using the upsampled image to generate a first subband of the plurality of wavelet subbands, decode remaining bitstreams of the plurality of bitstreams to generate remaining subbands of the plurality of wavelet subbands, and reconstruct an image or frame based on the decoding.

Further to the twelfth embodiments, the processor is further to determine an output selection corresponding to the image or frame, wherein the output selection comprises at least one of low resolution, medium resolution, or full resolution, and wherein reconstructing the image or frame is responsive to the output selection.

Further to the twelfth embodiments, the processor is further to determine an output selection corresponding to the image or frame, wherein the output selection comprises at least one of low resolution, medium resolution, or full resolution, and wherein reconstructing the image or frame is responsive to the output selection and the output selection comprises low resolution and the reconstructed the image or frame comprises the downsampled image.

Further to the twelfth embodiments, the processor is further to determine an output selection corresponding to the image or frame, wherein the output selection comprises at least one of low resolution, medium resolution, or full resolution, and wherein reconstructing the image or frame is responsive to the output selection and the output selection comprises medium resolution and the reconstructed image or frame comprises the first subband.

Further to the twelfth embodiments, the processor is further to determine an output selection corresponding to the image or frame, wherein the output selection comprises at least one of low resolution, medium resolution, or full resolution, and wherein reconstructing the image or frame is responsive to the output selection and the output selection comprises full resolution and the processor to reconstruct the image or frame comprises the processor to perform wavelet recomposition on the first subband and the remaining subbands to generate the reconstructed image or frame at full resolution.

In one or more thirteenth embodiments, a computer-implemented method for image or video coding comprises performing wavelet decomposition on an original image or frame to generate a plurality of subbands, encoding a first subband of the plurality of subbands with a High Efficiency Video Coding (HEVC) compliant encoder to generate a first bitstream, encoding a second subband of the plurality of subbands including scanning a quantized transform coefficient block of the second subband using a direction of scanning based on a type of the second subband to generate a second bitstream, and multiplexing at least the first and second bitstreams to generate a scalable bitstream.

Further to the thirteenth embodiments, encoding the second subband comprises disabling intra prediction.

Further to the thirteenth embodiments, the first subband comprises an LL subband and the second subband comprises at least one of an LH, an HL, or an HH subband.

Further to the thirteenth embodiments, the method further comprises selecting a scanning pattern for the second subband.

Further to the thirteenth embodiments, the method further comprises selecting a scanning pattern for the second subband and the second subband comprises an LH subband, the direction of scanning comprises from a top-right corner to a bottom-left corner and the scanning pattern comprises at least one of diagonal or vertical.

Further to the thirteenth embodiments, the method further comprises selecting a scanning pattern for the second subband and the second subband comprises an HL subband, the direction of scanning comprises from a bottom-left corner to a top-right corner and the scanning pattern comprises at least one of diagonal or horizontal.

Further to the thirteenth embodiments, the method further comprises selecting a scanning pattern for the second subband and the second subband comprises an HH subband, the direction of scanning comprises from a top-left corner to a bottom-right corner and the scanning pattern comprises diagonal.

Further to the thirteenth embodiments, the method further comprises dividing a transform unit of the second subband into sub-blocks, selecting a scanning pattern for the second subband, and scanning the transform unit by applying the scanning pattern to the sub-blocks of the transform unit.

In one or more fourteenth embodiments, a system for image or video coding comprises a memory to store an original image or frame and a processor coupled to the memory, the processor to perform wavelet decomposition on the original image or frame to generate a plurality of subbands, encode a first subband of the plurality of subbands with a High Efficiency Video Coding (HEVC) compliant encoder to generate a first bitstream, encode a second subband of the plurality of subbands including scanning a quantized transform coefficient block of the second subband using a direction of scanning based on a type of the second subband to generate a second bitstream, and multiplex at least the first and second bitstreams to generate a scalable bitstream.

Further to the fourteenth embodiments, the processor is further to select a scanning pattern for the second subband.

Further to the fourteenth embodiments, the processor is further to select a scanning pattern for the second subband and the second subband comprises an LH subband, the direction of scanning comprises from a top-right corner to a bottom-left corner and the scanning pattern comprises at least one of diagonal or vertical.

Further to the fourteenth embodiments, the processor is further to select a scanning pattern for the second subband and the second subband comprises an HL subband, the direction of scanning comprises from a bottom-left corner to a top-right corner and the scanning pattern comprises at least one of diagonal or horizontal.

Further to the fourteenth embodiments, the processor is further to select a scanning pattern for the second subband and the second subband comprises an HH subband, the direction of scanning comprises from a top-left corner to a bottom-right corner and the scanning pattern comprises diagonal.

Further to the fourteenth embodiments, the processor is further divide a transform unit of the second subband into sub-blocks, select a scanning pattern for the second subband, and scan the transform unit by applying the scanning pattern to the sub-blocks of the transform unit.

In one or more fifteenth embodiments, a computer-implemented method for image or video decoding comprises demultiplexing a scalable bitstream to provide a plurality of bitstreams each corresponding to a subband of a plurality of wavelet subbands, decoding a first bitstream of the plurality of bitstreams with a High Efficiency Video Coding (HEVC) compliant decoder to generate a first subband of the plurality of wavelet subbands, decoding a second bitstream of the plurality of bitstreams including inverse scanning the second bitstream using a direction of inverse scanning based on a type of a second subband corresponding to the second bitstream to generate the second subband, and performing wavelet synthesis filtering on at least the first and second subbands to generate a reconstructed image.

Further to the fifteenth embodiments, the first subband comprises an LL subband and the second subband comprises at least one of an LH, an HL, or an HH subband.

Further to the fifteenth embodiments, the method further comprises determining an inverse scanning pattern corresponding to the second bitstream based on a scanning pattern indicator in the scalable bitstream.

Further to the fifteenth embodiments, the method further comprises determining an inverse scanning pattern corresponding to the second bitstream based on a scanning pattern indicator in the scalable bitstream and the scanning pattern comprises at least one of diagonal, horizontal, or vertical.

Further to the fifteenth embodiments, the method further comprises determining an inverse scanning pattern corresponding to the second bitstream based on a scanning pattern indicator in the scalable bitstream and the second subband comprises an LH subband, the direction of inverse scanning comprises generating a block from a bottom-left corner to a top-right corner and the scanning pattern comprises at least one of diagonal or vertical.

Further to the fifteenth embodiments, the method further comprises determining an inverse scanning pattern corresponding to the second bitstream based on a scanning pattern indicator in the scalable bitstream and the second subband comprises an HL subband, the direction of inverse scanning comprises generating a block from a top-right corner to a bottom-left corner and the scanning pattern comprises at least one of diagonal or horizontal.

Further to the fifteenth embodiments, the method further comprises determining an inverse scanning pattern corresponding to the second bitstream based on a scanning pattern indicator in the scalable bitstream and the second subband comprises an HH subband, the direction of inverse scanning comprises generating a block from a bottom-right corner to a top-left corner and the scanning pattern comprises diagonal.

In one or more sixteenth embodiments, a system for image or video decoding comprises a memory to store a scalable bitstream and a processor coupled to the memory, the processor to demultiplex the scalable bitstream to provide a plurality of bitstreams each corresponding to a subband of a plurality of wavelet subbands, decode a first bitstream of the plurality of bitstreams with a High Efficiency Video Coding (HEVC) compliant decoder to generate a first subband of the plurality of wavelet subbands, decode a second bitstream of the plurality of bitstreams including inverse scanning the second bitstream using a direction of inverse scanning based on a type of a second subband corresponding to the second bitstream to generate the second subband, and perform wavelet synthesis filtering on at least the first and second subbands to generate a reconstructed image.

Further to the sixteenth embodiments, the processor is further to determine an inverse scanning pattern corresponding to the second bitstream based on a scanning pattern indicator in the scalable bitstream.

Further to the sixteenth embodiments, the processor is further to determine an inverse scanning pattern corresponding to the second bitstream based on a scanning pattern indicator in the scalable bitstream and the second subband comprises an LH subband, the direction of inverse scanning comprises generating a block from a bottom-left corner to a top-right corner and the scanning pattern comprises at least one of diagonal or vertical.

Further to the sixteenth embodiments, the processor is further to determine an inverse scanning pattern corresponding to the second bitstream based on a scanning pattern indicator in the scalable bitstream and the second subband comprises an HL subband, the direction of inverse scanning comprises generating a block from a top-right corner to a bottom-left corner and the scanning pattern comprises at least one of diagonal or horizontal.

Further to the sixteenth embodiments, the processor is further to determine an inverse scanning pattern corresponding to the second bitstream based on a scanning pattern indicator in the scalable bitstream and the second subband comprises an HH subband, the direction of inverse scanning comprises generating a block from a bottom-right corner to a top-left corner and the scanning pattern comprises diagonal.

In one or more seventeenth embodiments, a computer implemented method for image or video coding comprises performing wavelet decomposition of an image or frame to generate a plurality of subbands, encoding each of the plurality of subbands with a VP9 compliant encoder, a VP10 compliant encoder, or an Alliance for Open Media (AOM) compliant encoder to generate a plurality of VP9, VP10, or AOM compliant bitstreams each corresponding to a subband of the plurality of subbands, and multiplexing the plurality of bitstreams to generate a scalable bitstream.

Further to the seventeenth embodiments, the method further comprises selecting a wavelet analysis filter set for performing the wavelet decomposition.

Further to the seventeenth embodiments, the image or frame has a bit depth of 8 bits and each of the subbands has a bit depth of 9 bits.

Further to the seventeenth embodiments, performing the wavelet decomposition comprises single level wavelet analysis filtering and the plurality of subbands comprise four subbands.

Further to the seventeenth embodiments, performing the wavelet decomposition comprises single level wavelet analysis filtering and the plurality of subbands comprise four subbands and the plurality of subbands comprise an LL subband, an LH subband, an HL subband, and an HH subband.

In one or more eighteenth embodiments, a system for image or video coding comprises a memory to store an image or frame and a processor coupled to the memory, the processor to perform wavelet decomposition of the image or frame to generate a plurality of subbands, encode each of the plurality of subbands with a VP9 compliant encoder, a VP10 compliant encoder, or an Alliance for Open Media (AOM) compliant encoder to generate a plurality of VP9, VP10, or AOM compliant bitstreams each corresponding to a subband of the plurality of subbands, and multiplex the plurality of bitstreams to generate a scalable bitstream.

Further to the eighteenth embodiments, the processor is further to select a wavelet analysis filter set for performing the wavelet decomposition.

Further to the eighteenth embodiments, the processor to perform the wavelet decomposition comprises the processor to perform single level wavelet analysis filtering and the plurality of subbands comprise four subbands.

Further to the eighteenth embodiments, the processor to perform the wavelet decomposition comprises the processor to perform single level wavelet analysis filtering and the plurality of subbands comprise four subbands and the plurality of subbands comprise an LL subband, an LH subband, an HL subband, and an HH subband.

In one or more nineteenth embodiments, a computer-implemented method for image or video decoding comprises demultiplexing a scalable bitstream, wherein at least portions of the scalable bitstream are VP9 compliant, VP10 compliant, or Alliance for Open Media (AOM) compliant, to provide a plurality of bitstreams each corresponding to a subband of a plurality of wavelet subbands, decoding at least one of the plurality of bitstreams with an a VP9 compliant decoder, a VP10 compliant decoder, or an AOM compliant decoder, and reconstructing an image or frame based on the decoding.

Further to the nineteenth embodiments, the method further comprises determining an output selection corresponding to the image or frame, wherein the output selection comprises at least one of low resolution or full resolution, and wherein reconstructing the image or frame is responsive to the output selection.

Further to the nineteenth embodiments, the method further comprises determining an output selection corresponding to the image or frame, wherein the output selection comprises at least one of low resolution or full resolution, and wherein reconstructing the image or frame is responsive to the output selection and the output selection comprises low resolution and reconstructing the image or frame comprises decoding only an LL subband with the VP9 compliant decoder, the VP10 compliant decoder, or the AOM compliant decoder.

Further to the nineteenth embodiments, the method further comprises determining an output selection corresponding to the image or frame, wherein the output selection comprises at least one of low resolution or full resolution, and wherein reconstructing the image or frame is responsive to the output selection and the output selection comprises low resolution and reconstructing the image or frame comprises decoding only an LL subband with the VP9 compliant decoder, the VP10 compliant decoder, or the AOM compliant decoder and reconstructing the image or frame further comprises at least one of applying a bit depth limiter or performing upsampling.

Further to the nineteenth embodiments, the method further comprises determining an output selection corresponding to the image or frame, wherein the output selection comprises at least one of low resolution or full resolution, and wherein reconstructing the image or frame is responsive to the output selection and the output selection comprises full resolution and reconstructing the image or frame comprises decoding multiple bitstreams each corresponding to a subband of the plurality of wavelet subbands with at least the VP9 compliant decoder, the VP10 compliant decoder, or the AOM compliant decoder to generate a plurality of decoded subbands and performing wavelet synthesis filtering on the plurality of decoded subbands to generate the original image or frame at full resolution.

In one or more twentieth embodiments, a system for image or video decoding comprises a memory to store a scalable bitstream and a processor coupled to the memory, the processor to demultiplex the scalable bitstream, wherein at least portions of the scalable bitstream are VP9 compliant, VP10 compliant, or Alliance for Open Media (AOM) compliant, to provide a plurality of bitstreams each corresponding to a subband of a plurality of wavelet subbands, decode at least one of the plurality of bitstreams with an a VP9 compliant decoder, a VP10 compliant decoder, or an AOM compliant decoder, and reconstruct an image or frame based on the decoding.

Further to the twentieth embodiments, the processor is further to determine an output selection corresponding to the image or frame, wherein the output selection comprises at least one of low resolution or full resolution, and wherein reconstructing the image or frame is responsive to the output selection.

Further to the twentieth embodiments, the processor is further to determine an output selection corresponding to the image or frame, wherein the output selection comprises at least one of low resolution or full resolution, and wherein reconstructing the image or frame is responsive to the output selection and the output selection comprises low resolution and the processor to reconstruct the image or frame comprises the processor to decode only an LL subband with the VP9 compliant decoder, the VP10 compliant decoder, or the AOM compliant decoder.

Further to the twentieth embodiments, the processor is further to determine an output selection corresponding to the image or frame, wherein the output selection comprises at least one of low resolution or full resolution, and wherein reconstructing the image or frame is responsive to the output selection and the output selection comprises full resolution and the processor to reconstruct the image or frame comprises the processor to decode multiple bitstreams each corresponding to a subband of the plurality of wavelet subbands with at least the VP9 compliant decoder, the VP10 compliant decoder, or the AOM compliant decoder to generate a plurality of decoded subbands and perform wavelet synthesis filtering on the plurality of decoded subbands to generate the original image or frame at full resolution.

In one or more twenty-first embodiments, at least one machine readable medium may include a plurality of instructions that, in response to being executed on a computing device, cause the computing device to perform a method according to any one of the above embodiments.

In one or more twenty-second embodiments, an apparatus or a system may include means for performing a method or any functions according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer implemented method for image or video coding comprising:
    performing wavelet decomposition of an image or frame to generate a plurality of subbands comprising an LL subband;
    encoding the LL subband with an Advanced Video Coding (AVC) compliant encoder having intra prediction enabled for the LL subband to generate a first AVC compliant bitstream;
    encoding each of the remaining subbands with an AVC compliant encoder having intra prediction disabled for the entirety of each of the remaining subbands to generate a plurality of second AVC compliant bitstreams; and
    multiplexing the first AVC compliant bitstream and the plurality of second AVC compliant bitstreams to generate a scalable bitstream.

2. The method of claim 1, further comprising:
    selecting a particular wavelet analysis filter set from a plurality of wavelet analysis filter sets for performing the wavelet decomposition based on an application corresponding to the video coding, a resolution of the image or frame, and whether the image or frame is high contrast or blurry content.

3. The method of claim 1, wherein the image or frame has a bit depth of 8 bits and each of the subbands has a bit depth of 9 bits.

4. The method of claim 1, wherein the AVC compliant encoder comprises a 10 bit intra profile encoder.

5. The method of claim 1, wherein performing the wavelet decomposition comprises single level wavelet analysis filtering, and the plurality of subbands comprise four subbands comprising the LL subband, an LH subband, an HL subband, and an HH subband.

6. The method of claim 5, wherein encoding the LL subband comprises:
    selecting a first scanning pattern for scanning blocks of transform coefficients of the LL subband, wherein the first scanning pattern comprises a zigzag pattern from bottom-right corners of the blocks of transform coefficients of the LL subband to top-left corners of the blocks of transform coefficients of the LL subband; and
    scanning the blocks of transform coefficients of the LL subband according to the first scanning pattern.

7. The method of claim 6, wherein encoding each of the remaining subbands comprises:
    selecting a second scanning pattern for scanning blocks of transform coefficients of the HL subband, wherein the second scanning pattern comprises a zigzag pattern from top-right corners of the blocks of transform coefficients of the HL subband to bottom-left corners of the blocks of transform coefficients of the HL subband;
    selecting a third scanning pattern for scanning blocks of transform coefficients of the LH subband, wherein the third scanning pattern comprises a zigzag pattern from bottom-left corners of the blocks of transform coefficients of the LH subband to top-right corners of the blocks of transform coefficients of the LH subband;
    selecting a fourth scanning pattern for scanning blocks of transform coefficients of the HH subband, wherein the fourth scanning pattern comprises a zigzag pattern from top-left corners of the blocks of transform coefficients of the HH subband to bottom-right corners of the blocks of transform coefficients of the HH subband; and
    scanning the blocks of transform coefficients of the HL, LH, and HH subbands according to the second, third, and fourth scanning patterns, respectively.

8. The method of claim 1, wherein performing the wavelet decomposition comprises multiple level wavelet analysis filtering.

9. At least one non-transitory machine readable medium comprising a plurality of instructions that, in response to being executed on a device, cause the device to perform image or video coding by:
    performing wavelet decomposition of an image or frame to generate a plurality of subbands comprising an LL subband;
    encoding the LL subband with an Advanced Video Coding (AVC) compliant encoder having intra prediction enabled for the LL subband to generate a first AVC compliant bitstream;
    encoding each of the remaining subbands with an AVC compliant encoder having intra prediction disabled for the entirety of each of the remaining subbands to generate a plurality of second AVC compliant bitstreams; and
    multiplexing the first AVC compliant bitstream and the plurality of second AVC compliant bitstreams to generate a scalable bitstream.

10. The machine readable medium of claim 9, further comprising a plurality of instructions that, in response to being executed on the device, cause the device to perform image or video coding by:
    selecting a particular wavelet analysis filter set from a plurality of wavelet analysis filter sets for performing the wavelet decomposition based on an application corresponding to the video coding, a resolution of the image or frame, and whether the image or frame is high contrast or blurry content.

11. The machine readable medium of claim 9, wherein performing the wavelet decomposition comprises single level wavelet analysis filtering, and the plurality of subbands comprise four subbands comprising the LL subband, an LH subband, an HL subband, and an HH subband.

12. The machine readable medium of claim 11, wherein encoding the LL subband comprises:
    selecting a first scanning pattern for scanning blocks of transform coefficients of the LL subband, wherein the first scanning pattern comprises a zigzag pattern from bottom-right corners of the blocks of transform coefficients of the LL subband to top-left corners of the blocks of transform coefficients of the LL subband; and
scanning the blocks of transform coefficients of the LL subband according to the first scanning pattern.

13. The machine readable medium of claim 12, wherein encoding each of the remaining subbands comprises:
selecting a second scanning pattern for scanning blocks of transform coefficients of the HL subband, wherein the second scanning pattern comprises a zigzag pattern from top-right corners of the blocks of transform coefficients of the HL subband to bottom-left corners of the blocks of transform coefficients of the HL subband;
selecting a third scanning pattern for scanning blocks of transform coefficients of the LH subband, wherein the third scanning pattern comprises a zigzag pattern from bottom-left corners of the blocks of transform coefficients of the LH subband to top-right corners of the blocks of transform coefficients of the LH subband;
selecting a fourth scanning pattern for scanning blocks of transform coefficients of the HH subband, wherein the fourth scanning pattern comprises a zigzag pattern from top-left corners of the blocks of transform coefficients of the HH subband to bottom-right corners of the blocks of transform coefficients of the HH subband; and
scanning the blocks of transform coefficients of the HL, LH, and HH subbands according to the second, third, and fourth scanning patterns, respectively.

14. A computer-implemented method for image or video decoding comprising:
demultiplexing a scalable bitstream, wherein at least portions of the scalable bitstream are Advanced Video Coding (AVC) compliant, to provide a plurality of bitstreams each corresponding to a subband of a plurality of wavelet subbands, wherein a first bitstream of the plurality of bitstreams corresponds to an LL subband of the plurality of wavelet subbands;
decoding the first bitstream with an AVC compliant decoder having intra prediction enabled for the first bitstream to generate the LL subband;
decoding each of the remaining bitstreams with an AVC compliant decoder having intra prediction disabled for the entirety of each of the remaining bitstreams to generate remaining subbands of the plurality of wavelet subbands; and
reconstructing an image or frame based on the decoding of the first bitstream and the remaining bitstreams.

15. The method of claim 14, further comprising:
determining an output selection corresponding to the image or frame, wherein the output selection comprises at least one of low resolution or full resolution, and wherein reconstructing the image or frame is responsive to the output selection.

16. The method of claim 15, wherein the output selection comprises low resolution and reconstructing the image or frame comprises reconstructing the image or frame using only the decoded LL subband.

17. The method of claim 16, wherein reconstructing the image or frame further comprises applying a bit depth limiter and performing upsampling.

18. The method of claim 15, wherein the output selection comprises full resolution and reconstructing the image or frame comprises:
performing wavelet synthesis filtering on the LL subband decoded from the first bitstream and the remaining subbands to generate the image or frame at full resolution.

19. The method of claim 14, further comprising:
determining an output selection corresponding to the image or frame, wherein the output selection comprises at least one of low resolution, medium resolution, or full resolution, and wherein reconstructing the image or frame is responsive to the output selection.

20. The method of claim 19, wherein the output selection comprises medium resolution and reconstructing the image or frame comprises:
performing single level wavelet synthesis filtering on the LL subband and a subset of the remaining subbands to generate the image or frame.

21. The method of claim 20, wherein reconstructing the image or frame further comprises applying a bit depth limiter and performing 1:2 upsampling.

22. The method of claim 19, wherein the output selection comprises full resolution and reconstructing the image or frame comprises:
performing multiple level wavelet synthesis filtering on the LL subband and all of the remaining subbands to generate the image or frame at full resolution.

23. The method of claim 14, wherein decoding the first bitstream comprises:
selecting a first scanning pattern to generate blocks of transform coefficients of the LL subband from the first bitstream, wherein the first scanning pattern comprises a zigzag pattern from top-left corners of the blocks of transform coefficients of the LL subband to bottom-right corners of the blocks of transform coefficients of the LL subband; and
scanning the first bitstream to generate blocks of transform coefficients of the LL subband according to the first scanning pattern.

24. The method of claim 23, wherein decoding each of the remaining bitstreams comprises:
selecting a second scanning pattern to generate blocks of transform coefficients of an HL subband from a second bitstream of the remaining bitstreams, wherein the second scanning pattern comprises a zigzag pattern from bottom-left corners of the blocks of transform coefficients of the HL subband to top-right corners of the blocks of transform coefficients of the HL subband;
selecting a third scanning pattern to generate blocks of transform coefficients of an LH subband from a third bitstream of the remaining bitstreams, wherein the third scanning pattern comprises a zigzag pattern from top-right corners of the blocks of transform coefficients of the LH subband to bottom-left corners of the blocks of transform coefficients of the LH subband;
selecting a fourth scanning pattern to generate blocks of transform coefficients of an HH subband from a fourth bitstream of the remaining bitstreams, wherein the fourth scanning pattern comprises a zigzag pattern from bottom-right corners of the blocks of transform coefficients of the HH subband to top-left corners of the blocks of transform coefficients of the HH subband; and
scanning the second, third, and fourth bitstreams to generate blocks of transform coefficients of the HL, LH, and HH subband according to the second, third, and fourth scanning patterns, respectively.

25. A system for image or video decoding comprising:
a memory to store a scalable bitstream, wherein at least portions of the scalable bitstream are Advanced Video Coding (AVC) compliant; and
a processor coupled to the memory, the processor to demultiplex the scalable bitstream to provide a plurality of bitstreams each corresponding to a subband of a plurality of wavelet subbands, wherein a first bitstream of the plurality of bitstreams corresponds to an LL subband of the plurality of wavelet subbands, to decode the first bitstream with an AVC compliant decoder having intra prediction enabled for the first bitstream to generate the LL subband, to decode each of the remaining bitstreams with an AVC compliant decoder having intra prediction disabled for the entirety of each of the remaining bitstreams to generate remaining subbands of the plurality of wavelet subbands, and to reconstruct an image or frame based on the decode of the first bitstream and the remaining bitstreams.

26. The system of claim 25, wherein the processor is further to determine an output selection corresponding to the image or frame, wherein the output selection comprises at least one of low resolution or full resolution, and wherein reconstructing the image or frame is responsive to the output selection.

27. The system of claim 26, wherein the output selection comprises low resolution and the processor to reconstruct the image or frame comprises the processor to reconstruct the image or frame using only the decoded LL subband.

28. The system of claim 26, wherein the output selection comprises full resolution and the processor to reconstruct the image or frame comprises the processor to perform wavelet synthesis filtering on the LL subband decoded from the first bitstream and the remaining subbands to generate the image or frame at full resolution.

29. The system of claim 25, wherein the processor to decode the first bitstream comprises the processor to select a first scanning pattern to generate blocks of transform coefficients of the LL subband from the first bitstream, wherein the first scanning pattern comprises a zigzag pattern from top-left corners of the blocks of transform coefficients of the LL subband to bottom-right corners of the blocks of transform coefficients of the LL subband, and to scanning the first bitstream to generate blocks of transform coefficients of the LL subband according to the first scanning pattern.

30. The system of claim 29, wherein the processor to decode each of the remaining bitstreams comprises the processor to select a second scanning pattern to generate blocks of transform coefficients of an HL subband from a second bitstream of the remaining bitstreams, wherein the second scanning pattern comprises a zigzag pattern from bottom-left corners of the blocks of transform coefficients of the HL subband to top-right corners of the blocks of transform coefficients of the HL subband, to select a third scanning pattern to generate blocks of transform coefficients of an LH subband from a third bitstream of the remaining bitstreams, wherein the third scanning pattern comprises a zigzag pattern from top-right corners of the blocks of transform coefficients of the LH subband to bottom-left corners of the blocks of transform coefficients of the LH subband, to select a fourth scanning pattern to generate blocks of transform coefficients of an HH subband from a fourth bitstream of the remaining bitstreams, wherein the fourth scanning pattern comprises a zigzag pattern from bottom-right corners of the blocks of transform coefficients of the HH subband to top-left corners of the blocks of transform coefficients of the HH subband, and to scan the second, third, and fourth bitstreams to generate blocks of transform coefficients of the HL, LH, and HH subband according to the second, third, and fourth scanning patterns, respectively.

31. A computer-implemented method for image or video coding comprising:
performing wavelet decomposition on an original image or frame to generate a plurality of subbands comprising at least an LL subband;
encoding the LL subband of the plurality of subbands with a High Efficiency Video Coding (HEVC) compliant encoder having intra prediction enabled for the LL subband to generate a first bitstream;
encoding each of the remaining subbands of the plurality of subbands with an encoder having intra prediction disabled for the entirety of each of the remaining subbands to generate second bitstreams, wherein the encoding includes scanning a quantized transform coefficient block of an HL subband of the remaining subbands using a scanning pattern from a top-right corner to a bottom-left corner of the quantized transform coefficient block based on the quantized transform coefficient block being in the HL subband; and
multiplexing the first bitstream and the second bitstreams to generate a scalable bitstream.

32. The method of claim 31, wherein the remaining subbands further comprise an LH subband and an HH subband.

33. The method of claim 32, wherein said encoding of the remaining subbands comprises scanning a second quantized transform coefficient block of the LH subband using a second scanning pattern from a bottom-left corner to a top-right corner of the second quantized transform coefficient block based on the second quantized transform coefficient block being in the LH subband.

34. The method of claim 33, wherein the scanning pattern comprises a vertical pattern starting from the top-right corner of the quantized transform coefficient block and extending downward to a bottom-right corner of the quantized transform coefficient block and the second scanning pattern comprises a horizontal pattern starting from the bottom-left corner of the second quantized transform coefficient block and extending laterally to a bottom-right corner of the second quantized transform coefficient block.

35. The method of claim 33, wherein said encoding of the remaining subbands comprises scanning a third quantized transform coefficient block of the HH subband using a third scanning pattern from an upper-left corner to a lower-right corner of the third quantized transform coefficient block based on the third quantized transform coefficient block being in the HH subband.

36. The method of claim 31, further comprising:
dividing a transform unit of the HL subband into sub-blocks; and
scanning each sub-block of the transform unit using the scanning pattern such that the sub-blocks are scanned in an order of top-right sub-block, bottom-right sub-block, top-left sub-block, top-left sub-block.

37. At least one non-transitory machine readable medium comprising a plurality of instructions that, in response to being executed on a device, cause the device to perform image or video coding by:
performing wavelet decomposition on an original image or frame to generate a plurality of subbands comprising at least an LL subband;
encoding the LL subband of the plurality of subbands with a High Efficiency Video Coding (HEVC) compliant encoder having intra prediction enabled for the LL subband to generate a first bitstream;
encoding each of the remaining subbands of the plurality of subbands with an encoder having intra prediction disabled for the entirety of each of the remaining subbands to generate second bitstreams, wherein the encoding includes scanning a quantized transform coefficient block of an HL subband of the remaining subbands using a scanning pattern from a top-right corner to a bottom-left corner of the quantized transform coefficient block based on the quantized transform coefficient block being in the HL subband; and multiplexing the first bitstream and the second bitstreams to generate a scalable bitstream.

38. The machine readable medium of claim 37, wherein the remaining subbands further comprise an LH subband and an HH subband and said encoding of the remaining subbands comprises scanning a second quantized transform coefficient block of the LH subband using a second scanning pattern from a bottom-left corner to a top-right corner of the second quantized transform coefficient block based on the second quantized transform coefficient block being in the LH subband.

39. The machine readable medium of claim 38, wherein the scanning pattern comprises a vertical pattern starting from the top-right corner of the quantized transform coefficient block and extending downward to a bottom-right corner of the quantized transform coefficient block and the second scanning pattern comprises a horizontal pattern starting from the bottom-left corner of the second quantized transform coefficient block and extending laterally to a bottom-right corner of the second quantized transform coefficient block.

40. The machine readable medium of claim 38, wherein said encoding of the remaining subbands comprises scanning a third quantized transform coefficient block of the HH subband using a third scanning pattern from an upper-left corner to a lower-right corner of the third quantized transform coefficient block based on the third quantized transform coefficient block being in the HH subband.

41. The machine readable medium of claim 37, further comprising a plurality of instructions that, in response to being executed on the device, cause the device to perform image or video coding by:
dividing a transform unit of the HL subband into sub-blocks; and
scanning each sub-block of the transform unit using the scanning pattern such that the sub-blocks are scanned in an order of top-right sub-block, bottom-right sub-block, top-left sub-block, top-left sub-block.

42. A computer-implemented method for image or video decoding comprising:
demultiplexing a scalable bitstream to provide a plurality of bitstreams each corresponding to a subband of a plurality of wavelet subbands, wherein a first bitstream of the plurality of bitstreams corresponds to an LL subband of the plurality of wavelet subbands;
decoding the first bitstream of the plurality of bitstreams with a High Efficiency Video Coding (HEVC) compliant decoder having intra prediction enabled for the first bitstream to generate the LL subband of the plurality of wavelet subbands;
decoding each of the remaining bitstreams of the plurality of bitstreams with a decoder having intra prediction disabled for the entirety of each of the remaining bitstreams to generate remaining subbands of the plurality of wavelet subbands, wherein the decoding includes inverse scanning a second bitstream of the remaining bitstreams corresponding to an HL subband of the remaining subbands using an inverse scanning pattern that generates a quantized transform coefficient block of the HL subband from a bottom-left corner to a top-right corner of the quantized transform coefficient block based on the quantized transform coefficient block being in the HL subband; and
performing wavelet synthesis filtering the LL subband and the remaining subbands to generate a reconstructed image.

43. The method of claim 42, wherein the remaining subbands comprise an LH subband and an HH subband.

44. The method of claim 43, wherein said decoding the remaining bitstreams comprises inverse scanning a third bitstream of the remaining bitstreams corresponding to an LH subband of the remaining subbands using a second inverse scanning pattern that generates a second quantized transform coefficient block of the LH subband from a top-right corner to a bottom-left corner of the second quantized transform coefficient block based on the second quantized transform coefficient block being in the LH subband.

45. The method of claim 44, wherein the inverse scanning pattern comprises a vertical pattern starting from the bottom-left corner of the quantized transform coefficient block and extending downward to a top-left corner of the quantized transform coefficient block and the second scanning pattern comprises a horizontal pattern starting from the top-right corner of the second quantized transform coefficient block and extending laterally to a top-left corner of the second quantized transform coefficient block.

46. The method of claim 44, wherein said decoding the remaining bitstreams comprises inverse scanning a fourth bitstream of the remaining bitstreams corresponding to an HH subband of the remaining subbands using a third inverse scanning pattern that generates a third quantized transform coefficient block of the HH subband from a bottom-right corner to a top-left corner of the third quantized transform coefficient block based on the third quantized transform coefficient block being in the HH subband.

47. A system for image or video decoding comprising:
a memory to store a scalable bitstream; and
a processor coupled to the memory, the processor to demultiplex the scalable bitstream to provide a plurality of bitstreams each corresponding to a subband of a plurality of wavelet subbands, wherein a first bitstream of the plurality of bitstreams corresponds to an LL subband of the plurality of wavelet subbands, to decode the first bitstream of the plurality of bitstreams with a High Efficiency Video Coding (HEVC) compliant decoder having intra prediction enabled for the first bitstream to generate the LL subband of the plurality of wavelet subbands, to decode each of the remaining bitstreams of the plurality of bitstreams with a decoder having intra prediction disabled for the entirety of each of the remaining bitstreams to generate remaining subbands of the plurality of wavelet subbands, wherein the processor to decode the each of the remaining bitstreams comprises the processor to inverse scan a second bitstream of the remaining bitstreams corresponding to an HL subband of the remaining subbands using an inverse scanning pattern that generates a quantized transform coefficient block of the HL subband from a bottom-left corner to a top-right corner of the quantized transform coefficient block based on the quantized transform coefficient block being in the HL subband, and to perform wavelet synthesis filtering the LL subband and the remaining subbands to generate a reconstructed image.

48. The system of claim 47, wherein the remaining subbands comprise an LH subband and an HH subband, and wherein the processor to decode the remaining bitstreams comprises the processor to inverse scan a third bitstream of the remaining bitstreams corresponding to an LH subband of the remaining subbands using a second inverse scanning pattern that generates a second quantized transform coefficient block of the LH subband from a top-right corner to a bottom-left corner of the second quantized transform coefficient block based on the second quantized transform coefficient block being in the LH subband.

49. The system of claim 48, wherein the inverse scanning pattern comprises a vertical pattern starting from the bottom-left corner of the quantized transform coefficient block and extending downward to a top-left corner of the quantized transform coefficient block and the second scanning pattern comprises a horizontal pattern starting from the top-right corner of the second quantized transform coefficient block and extending laterally to a top-left corner of the second quantized transform coefficient block.

* * * * *